US011324045B2

(12) United States Patent
Xin et al.

(10) Patent No.: US 11,324,045 B2
(45) Date of Patent: May 3, 2022

(54) DOWNLINK ORTHOGONAL FREQUENCY-DIVISION MULTIPLEXING (OFDM) BEAMFORMING SIMULTANEOUS TRANSMISSION

(71) Applicant: SONY GROUP CORPORATION, Tokyo (JP)

(72) Inventors: Liangxiao Xin, San Jose, CA (US); Mohamed Abouelseoud, San Francisco, CA (US); Qing Xia, San Jose, CA (US); Kazuyuki Sakoda, Campbell, CA (US); Hiromasa Uchiyama, Tokyo (JP); Yusuke Tanaka, Tokyo (JP); Kosuke Aio, Tokyo (JP); Ryuichi Hirata, Tokyo (JP); Ken Tanaka, Tokyo (JP); Thomas Handte, Stuttgart (DE); Dana Ciochina, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 67 days.

(21) Appl. No.: 16/945,742

(22) Filed: Jul. 31, 2020

(65) Prior Publication Data

US 2021/0307069 A1    Sep. 30, 2021

Related U.S. Application Data

(60) Provisional application No. 63/002,547, filed on Mar. 31, 2020.

(51) Int. Cl.
*H04W 74/08*   (2009.01)
*H04B 7/06*    (2006.01)
(Continued)

(52) U.S. Cl.
CPC ...... *H04W 74/0816* (2013.01); *H04B 7/0617* (2013.01); *H04W 16/28* (2013.01); *H04W 80/02* (2013.01)

(58) Field of Classification Search
CPC . H04W 74/0816; H04W 16/28; H04W 80/02; H04W 74/0825; H04W 74/0833;
(Continued)

(56) References Cited

U.S. PATENT DOCUMENTS

2017/0150493 A1*  5/2017  Seok ................. H04B 7/0452
2018/0160429 A1*  6/2018  Seok ................. H04L 1/0045
(Continued)

FOREIGN PATENT DOCUMENTS

WO    2020045891 A1    3/2020

OTHER PUBLICATIONS

Lopez-Perez, David et al., "IEEE 802.11be Extremely High Throughput: The Next Generation of Wi-Fi Technology Beyond 802.11ax", arXiv:1902.04320v1 [cs.IT] Feb. 12, 2019, pp. 1-8.

*Primary Examiner* — Mewale A Ambaye
(74) *Attorney, Agent, or Firm* — O'Banion & Ritchey LLP; John P. O'Banion

(57) ABSTRACT

A WiFi communications mechanism in which simultaneous transmission is negotiated and beamforming communications performed towards at least one station (STA), while nulling is performed towards one or more other access points (APs) to reduce interference. Omni-directional transmissions are utilized in a manner to overcome preamble interferences, which is used in combination with synchronizing symbol intervals to eliminate interference from symbol transitions. The enhanced simultaneous transmission protocol allows two APs to transmit simultaneously without interfering with one another.

20 Claims, 48 Drawing Sheets

(51) Int. Cl.
*H04W 80/02* (2009.01)
*H04W 16/28* (2009.01)

(58) Field of Classification Search
CPC .. H04W 74/0841; H04B 7/0617; H04B 7/024
See application file for complete search history.

(56) References Cited

U.S. PATENT DOCUMENTS

| | | | |
|---|---|---|---|
| 2018/0227156 A1* | 8/2018 | Papasakellariou | ............................ H04W 72/0453 |
| 2020/0007283 A1* | 1/2020 | Chen | ..................... H04B 17/327 |
| 2020/0037275 A1 | 1/2020 | Liu | |
| 2020/0045555 A1* | 2/2020 | Huang | ..................... H04W 4/06 |
| 2020/0053781 A1* | 2/2020 | Pan | ....................... H04J 11/0069 |

* cited by examiner

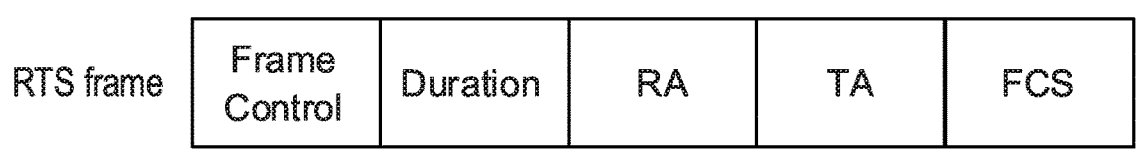
FIG. 3
(Prior Art)
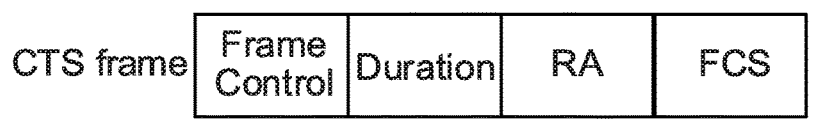
FIG. 4
(Prior Art)
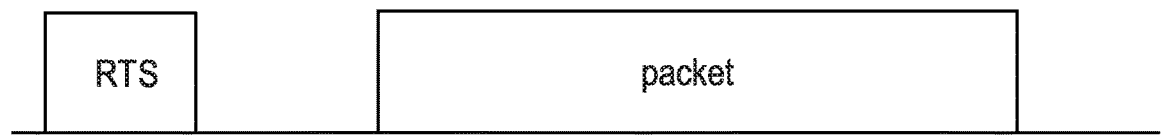
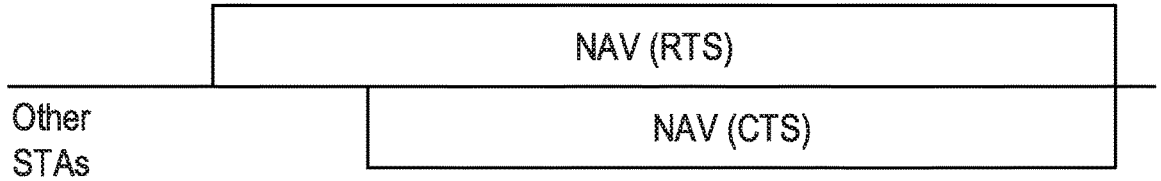
FIG. 5
(Prior Art)

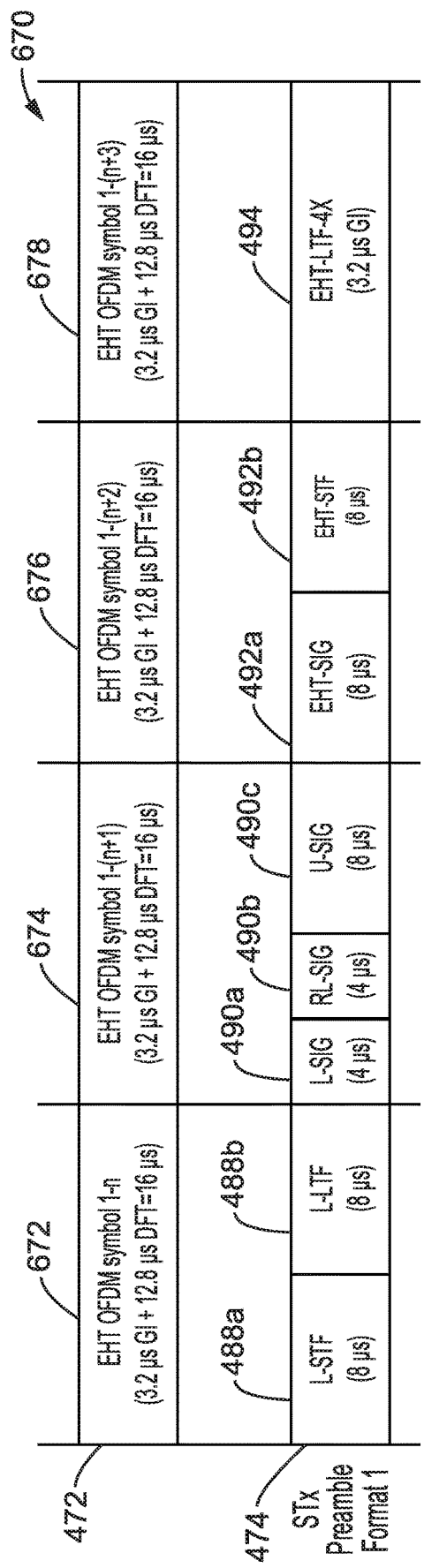
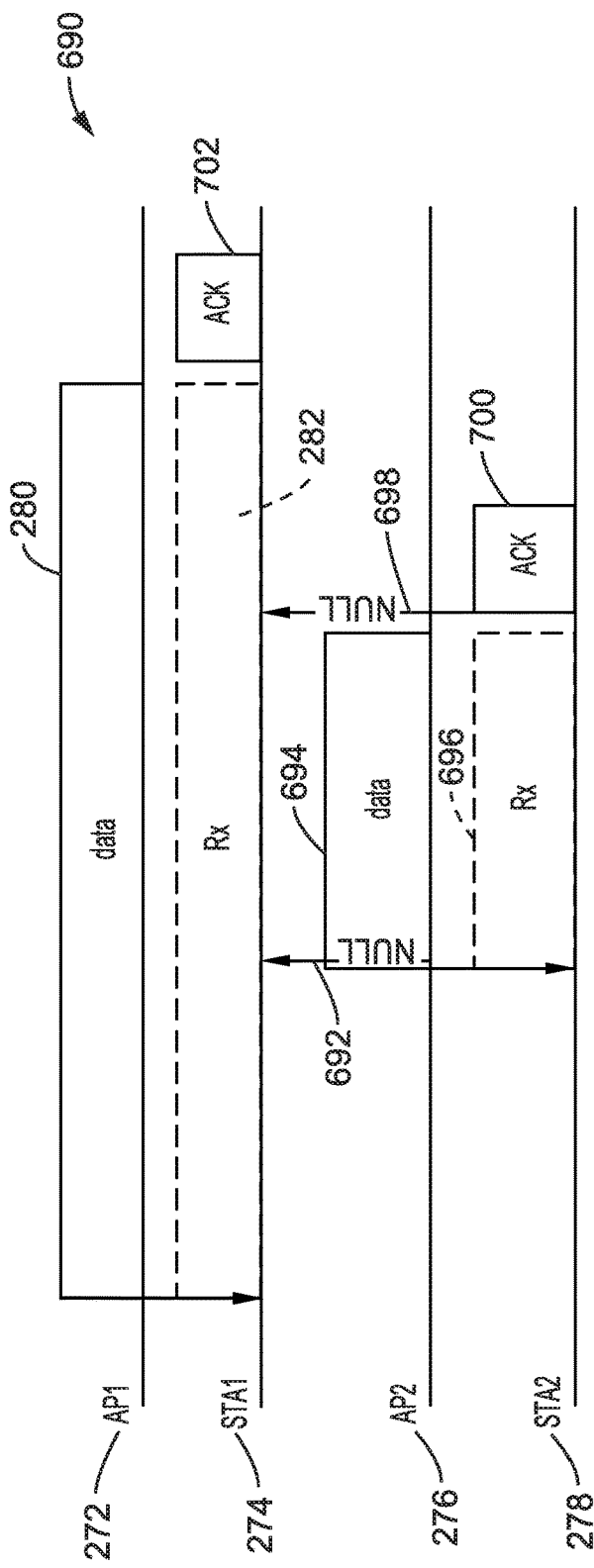
FIG. 25B
FIG. 26

S-Tx.request frameformat (950): Frame Control | Duration | RA | TA | Action | Traffic Type | Coord Start Time | Coord Periodical Time | Cood duration | Coord End Time | FCS

FIG. 33

S-Tx.reply frameformat (970): Frame Control | Duration | RA | TA | Action | Agreement indication | Coord ID | Group of STAs | Allowance Interference Level | FCS

FIG. 34

Simultaneous transmission information (990): STx Allowance Indication | Coord Duration | Packet Duration | Midamble Info | Feedback Info | GI+EHT-LTF size | Null Towards | Coord ID (Optional)

Midamble Type | Start Time | Periodic Time | ACK/BA | Timeout | Estimated Start Time | Precoded preamble (optional)

FIG. 35

DOWNLINK ORTHOGONAL FREQUENCY-DIVISION MULTIPLEXING (OFDM) BEAMFORMING SIMULTANEOUS TRANSMISSION

CROSS-REFERENCE TO RELATED APPLICATIONS

This application claims priority to, and the benefit of, U.S. provisional patent application Ser. No. 63/002,547 filed on Mar. 31, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to a simultaneous transmission in a downlink scenario for improving spatial reuse operations in WLANs.

2. Background Discussion

Due to its ease of deployment most wireless communication devices today are able to connect to the Internet through WiFi networks, with the number of WiFi users growing rapidly. Continued WiFi improvements are sought to provide Internet connectivity for more devices with improved network performance, including higher throughputs and reduced delays.

The popularity of WiFi devices increases the crowding of WiFi channels, especially during busier rush hours. Legacy WiFi networks allow only one device to access the channel in a given space and time, thus limiting utilization of the channel as well as network throughput.

The IEEE 802.11ax standard includes some provisions for spatial reuse operation, which allows for multiple stations (STAs) to access the channel and transmit simultaneously. With spatial reuse enabled WLAN networks can boost packet throughput significantly.

However, performing two packet transmissions during the same time in many cases leads to interference, as a form of interference coupling. Therefore, other techniques, such as beamforming and nulling, can be used to reduce the interference level and mitigate the coupling effect. Yet, even beamforming and nulling during simultaneous transmissions does not eliminate all the interference coupling which gives rise to reduced efficiencies and success rates for simultaneous transmissions.

Accordingly, a need exists for improved mechanisms for spatial reuse which reduces interference coupling. The present disclosure fulfills that need and provides additional benefits over previous technologies.

BRIEF SUMMARY

A simultaneous transmission mechanism is described for downlink scenarios to improve the efficiency of spatial reuse operation in WLANs. When beamforming and nulling are used in a conventional 802.11ax protocol, interference during simultaneous transmissions is primarily caused for two reasons. First, the waveform of a packet transmission includes the Physical Layer Convergence Protocol (PLCP) preamble symbols and Orthogonal Frequency-Division Multiplexing (OFDM) symbols. The PLCP preamble symbols are transmitted in an omni-directional manner when beamforming and nulling are applied. The interference due to the PLCP preamble transmissions is not reduced.

Second, when the OFDM symbols are beamformed and nulled, the energy burst still occurs periodically around the OFDM guard intervals due to OFDM symbol transitions. The energy bursts can interfere with simultaneous transmission when the OFDM symbol boundaries of the two transmissions are not synchronized.

To eliminate the interference coupling effect during simultaneous transmission, the interference sources must be avoided. The task of eliminating the interference coupling effect during simultaneous transmission is more challenging when the two transmissions start at different times.

Thus, a new transmission scheme (protocol) is described for supporting these simultaneous transmissions. The objective of the new transmission scheme is to enable simultaneous transmission in a downlink scenario while being subject to only weak interference coupling and with only minor coordination required between APs.

Beamforming and nulling techniques are utilized in the simultaneous transmissions. During simultaneous transmission, the two packet transmissions do not have to commence at the same time. This present disclosure describes apparatus and methods for eliminating the interference due to the PLCP preamble transmitted in an omni-directional manner and the interference due the use of asynchronous OFDM symbol boundaries between two APs during the simultaneous transmission.

The current WLAN protocol allows two APs, exemplified as AP1 and AP2, to exist in the same communication area (space) and time, and for these APs to transmit packets simultaneously for spatial reuse. However, when AP2 starts transmitting during the ongoing transmission of AP1, the transmission of AP2 may interfere with the transmission of AP1.

AP2 can use techniques, such as beamforming and nulling, to reduce the interference due to its simultaneous transmission. However, the waveform of the packet transmitted by AP2 consists of PLCP preamble symbol and multiple OFDM symbols. The beamforming and nulling are only applied to the OFDM symbols but not the PLCP preamble. The PLCP preamble symbol is still transmitted in an omni-directional mode. The waveform of the preamble received by AP1 and its associated STAs from AP2 is transmitted at full power. Therefore, interference results from the preamble during the simultaneous transmission and could have significant adverse impact.

When beamforming and nulling are applied to the OFDM symbols of AP2, the periodic energy bursts occur at OFDM symbol transitions, which could cause interference at the ongoing transmission of AP1. Techniques, such as beamforming and nulling, are used to reduce the interference level and mitigate the coupling effect. However, the beamforming and nulling cannot eliminate the interference during simultaneous transmissions, wherein the success rate of simultaneous transmission is diminished.

A wireless communication system, apparatus and method are described for performing packet transmissions in cases where multiple access points, e.g., AP1 and AP2, coexist. Each AP and its associated STAs encode and decode the signal in terms of OFDM symbols, the CSMA/CA, beamforming and nulling are applied to the transmission. AP2 is able to beamform towards its associated STA while nulling the received power towards one or more STAs associated with AP1. STAs associated with AP2 might have the capability to null their transmit power towards AP1 or AP1-associated STAs. This nulling can comprise: (a) AP1 starting a packet transmission and allowing other APs to transmit a packet simultaneously with AP1, which can be done through (i) prior negotiation with other APs; (ii) sending simultaneous transmission information; and/or (iii) allowing ongoing simultaneous transmissions as long as AP1 is not impacted. (b) AP2 starts the simultaneous transmissions during an ongoing transmission of AP1. (c) AP2 synchronizes its OFDM symbol boundaries with that of AP1 and creates a null towards the receiver STA of AP1. (d) AP2 finishes its transmission before the end of the transmission being performed by AP1.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 3 is a data field diagram depicting a RTS frame format.

FIG. 4 is a data field diagram depicting a CTS frame format.

FIG. 5 is a timing diagram showing channel occupancy by using RTS/CTS in CSMA/CA.

FIG. 25A and FIG. 25B are a signaling diagram of an alternative third example of using the first simultaneous transmission scheme according to at least one embodiment of the present disclosure.

FIG. 26 is a timing diagram of a second simultaneous transmission scheme according to at least one embodiment of the present disclosure.

FIG. 33 is a data field diagram of an S-Tx request frame format according to at least one embodiment of the present disclosure.

FIG. 34 is a data field diagram of an S-Tx reply frame format according to at least one embodiment of the present disclosure.

FIG. 35 is a data field diagram of simultaneous transmission information according to at least one embodiment of the present disclosure.

DETAILED DESCRIPTION

1. Introduction 802.11 WLAN Systems

Figure 1:
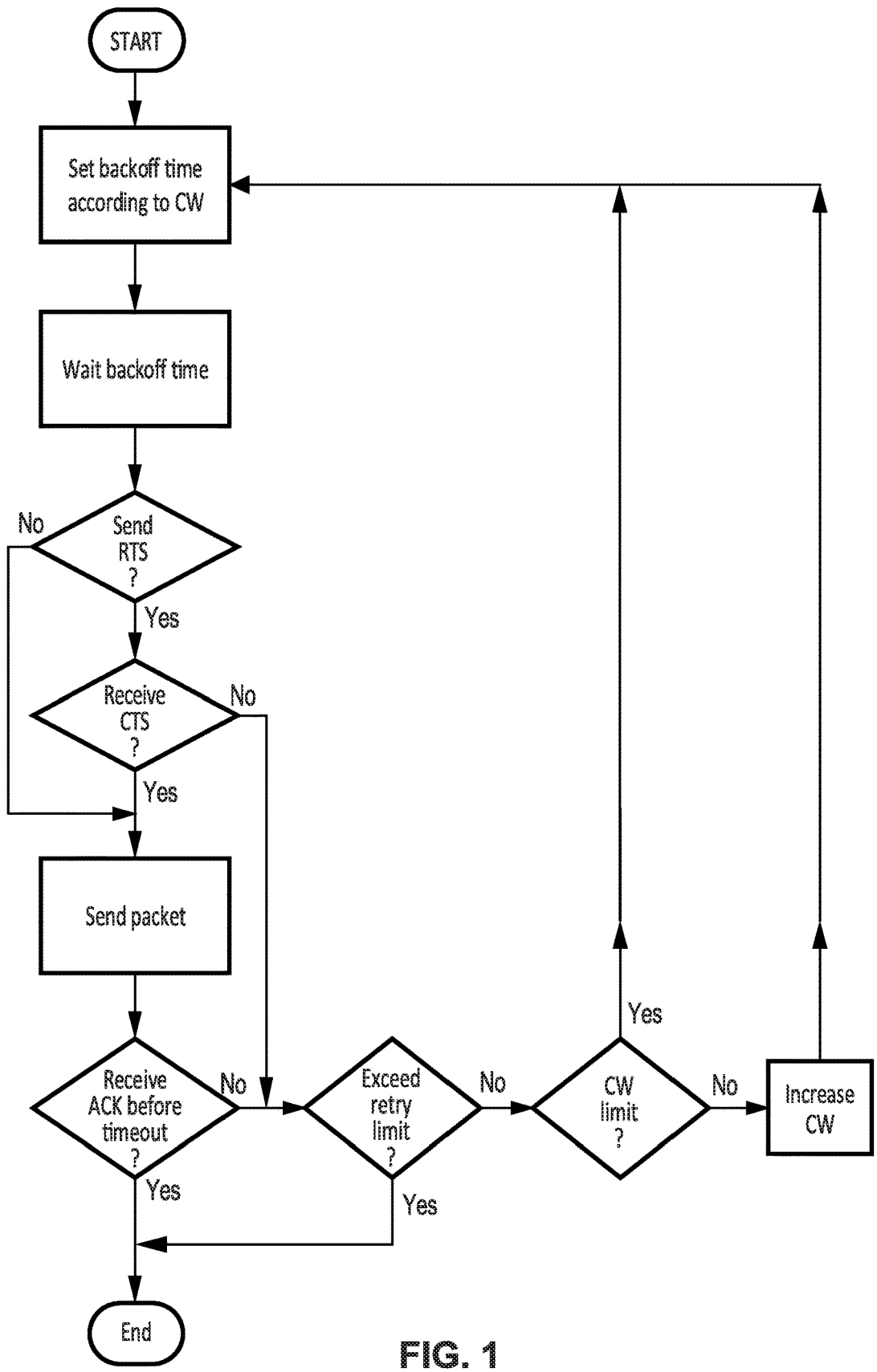
FIG. 1 is a flow diagram of conventional contention-based channel access in Carrier Sense Multiple Access (CSMA)/Collision Avoidance (CA).

FIG. 1 depicts the details of a WLAN system under IEEE 802.11 using Carrier Sense Multiple Access/Collision Avoidance (CSMA/CA) to allow stations (STAs) to have random access to the channel for packet transmission and retransmission. In a CSMA/CA system, the STA senses the channel for transmission when there is data to transmit. Before each transmission and retransmission, the STA must sense the channel and set (wait) a backoff time to contend for channel access.

The backoff time is decided by a uniform random variable between 0 and the size of contention window. After the STA waits for the backoff time and senses that the channel is idle, it decides whether to send an RTS frame to ensure the channel occupancy or not. If the STA sends an RTS frame, the channel occupancy is ensured when it receives a CTS frame, at which time the STA sends the packet. If the STA does not send an RTS frame, it sends the packet directly. The retransmission is required if the CTS frame is not received after sending RTS frame, or the STA does not receive ACK before timeout. Otherwise, if the CTS frame is received the transmission has succeeded. When retransmission is required, the STA checks the number of retransmissions of the packet, and if the number of retransmissions exceeds the retry limit, then the packet is dropped, and no retransmission is scheduled. Otherwise, the retransmission is scheduled. If the retransmission is scheduled, then another backoff time is needed to contend for channel access for retransmission. If the size of the contention window has not reached the upper limit, the STA increases it.

The STA sets another backoff time, depending on the new size of the contention window, and waits the backoff time for retransmission and this process continues.

Figure 2:
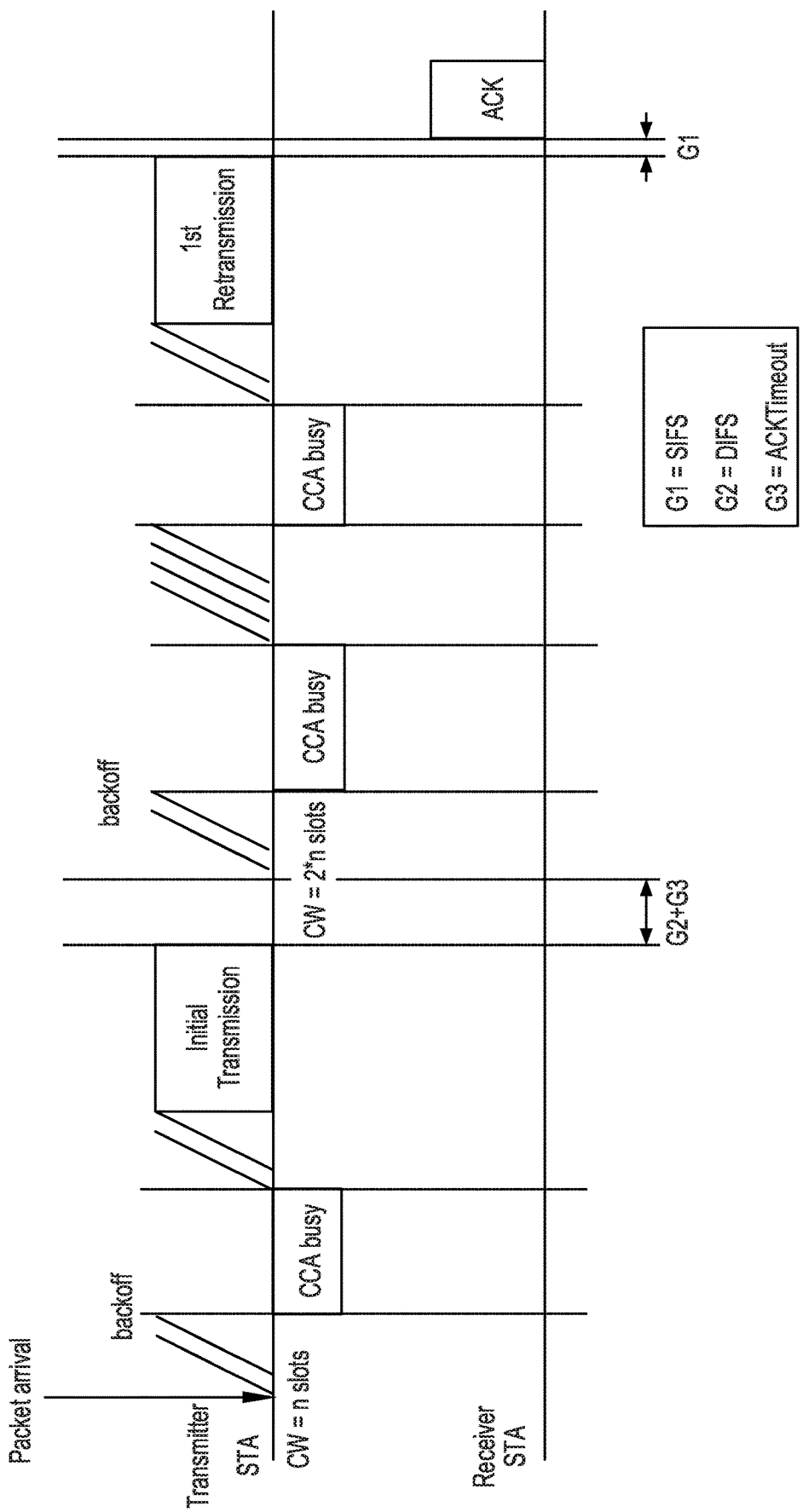
FIG. 2 is a signaling diagram showing packet transmission in CSMA/CA when ReadyToSend/ClearToSend (RTS/CTS) is disabled.

FIG. 2 illustrates an example of random channel access between a transmitting station and a receiving station under CSMA/CA in which RTS/CTS is disabled. When the MAC layer of the transmitter STA receives the data from its upper layers, it contends to gain channel access. When the transmitter STA contends for the channel, it has to wait until the backoff time, whereby the size of the contention window is "n" slots (CW=n slots), which it counts down to zero during backoff. The count-down process is interrupted (i.e., the Clear Channel Assessment (CCA) indicates busy) when another packet transmission occurs over the channel. After the transmitter STA gains the channel access for transmitting data, it packetizes the data into a packet and transmits the packet over the channel. As shown in the figure, if the initial transmission of the packet fails, a retransmission of the packet is required. The transmitter STA sets backoff time again to contend for channel access. This time, the size of the contention window is doubled, which is 2*n slots (CW=2*n slots), due to this being a retransmission. The expected backoff time is also doubled by the contention window size. When the backoff time is longer, there is an increased probability that the count-down process will be interrupted (i.e., CCA busy) by another packet transmission. The figure shows that after an initially failed transmission and then contending for the channel three times that it finally performs a $1^{st}$ retransmission which succeeds when it receives an ACK.

The figure also depicts the timing with SIFS, DIFS and ACKTimeout. G1 in the figure represents a Short Interframe Spacing (SIFS), which is the time interval required by a wireless device in between receiving a frame and responding to the frame. The DCF protocol controls access to the physical medium in which a station must sense the status of the wireless medium before transmitting. If it finds that the medium is continuously idle for a DCF Interframe Space (DIFS) duration, it is then permitted to transmit a frame. If the channel is found busy during the DIFS interval, the station should defer its transmission. The figure represents DIFS as G2. It will be noted that conventional DIFS is calculated as DIFS=SIFS+(2*Slot time). G3 represents the ACKTimeout interval which is the time allowed for the acknowledgement of transmission to be received before it is assumed a transmission error occurred.

1.1. Channel Occupancy by RTS/CTS

In CSMA/CA, a STA is able to occupy the channel by using RTS/CTS exchange. This process protects packet transmission from interference from other nodes (network stations), especially in situations in which a hidden node problem arises.

FIG. 3 illustrates the contents of the Ready To Send (RTS) frame. A Frame Control field indicates the type of frame. A Duration field contains a Network Allocation Vector (NAV) information used for CSMA/CA channel access. It will be noted that NAV information allows for using a virtual carrier-sensing mechanism with a wireless network protocol, such as IEEE 802.11. A Recipient Address (RA) field contains an address for the recipient of the frame. A Transmitter Address (TA) field contains the address of the STA that transmitted the frame. A Frame Check Sequence (FCS) field is a form of cyclic redundancy check for determining the validity of the message, and is shown in this and other messages.

FIG. 4 illustrates the contents of a Clear To Send (CTS) frame. A Frame Control field indicates the type of frame. A Duration field contains NAV information used for CSMA/CA channel access. An RA field contains an address for the recipient of the frame.

FIG. 5 depicts timing for channel occupancy using RTS/CTS under CSMA/CA between a Transmitter STA, a Receiver STA and Other STAs. The example illustrates how a STA occupies the channel by using RTS/CTS exchange in CSMA/CA. Before the transmitter STA transmits the packet, it first sends an RTS frame to request channel occupancy time for packet transmission. When the receiver STA receives the RTS frame, it sends a CTS frame back to the transmitter STA to report that the channel occupancy time is reserved for packet transmission. In response to receiving CTS the transmitter sends the packet. The other STAs, upon receiving RTS and CTS frame, will set the network allocation vector (NAV), which is NAV(RTS) and then NAV (CTS), respectively. During the period of time set by the NAV, the other STAs do not transmit any packets, with the NAV periods ending in response to the ACK after packet transmission.

1.2. Regular IEEE 802.11be PLCP preamble

Figure 6:
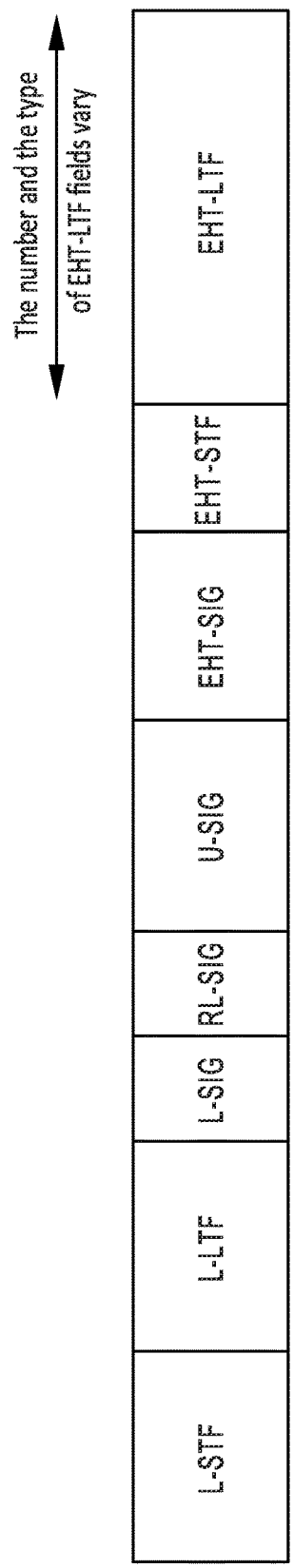
FIG. 6 is a data field diagram depicting a conventional IEEE 802.11be preamble.

FIG. 6 illustrates the regular IEEE 802.11be preamble format having the following fields. (a) An L-STF field is a non-HT Short Training Field. (b) An L-LTF field indicates the non-HT Long Training Field. (c) An L-SIG field indicates the non-HT SIGnal field. (d) An RL-SIG field indicates the repeated non-HT SIG field. (e) A U-SIG field indicates the Extreme High Throughput (EHT) universal field of IEEE 802.11be. (f) An EHT-SIG field indicates the EHT SIGNAL field. (g) An EHT-STF field indicates the EHT short training field, which can be replaced by an alternative type of signal training field. (h) An EHT-STF field indicates EHT short training field. It should be noted that the EHT-LTF field indicates an EHT long training field.

2. Problem Statement

Current WLAN protocols under 802.11 allow two APs, e.g., AP1 and AP2, in the same broadcast vicinity to transmit packets simultaneously for spatial reuse. However, when AP2 starts transmitting during the ongoing transmission of AP1, the transmission of AP2 may interfere with the transmission of AP1.

AP2 can use techniques, such as beamforming and nulling, to reduce the interference due to its simultaneous transmission. However, the waveform of the packet transmitted by AP2 consists of a PLCP preamble symbol and multiple OFDM symbols. The beamforming and nulling are only applied to the OFDM symbols but not the PLCP preamble. The PLCP preamble symbol is still transmitted in an omni-directional mode. The waveform of the preamble received by AP1 and its associated STAs from AP2 is in full power. Therefore, the interference due to the preamble cannot be neglected during the simultaneous transmission.

When beamforming and nulling are applied to the OFDM symbols of AP2, the periodic energy bursts occur at OFDM symbol transitions, which could cause interference at the ongoing transmission of AP1.

3. Contribution of the Present Disclosure

In this disclosure a simultaneous transmission scheme in a downlink scenario is described for improving spatial reuse efficiency across multiple access points for packet data transmission in WLANs, and avoiding the shortcomings with techniques, such as beamforming and nulling, to support simultaneous transmissions. Only a small amount of coordination is required for launching a simultaneous transmission between the two APs. The two packet transmissions do not have to start at the same time, but are simultaneous during a portion of their transmission. The disclosure describes methods of eliminating interference due to the PLCP preamble transmitted in an omni-directional manner and the interference due to asynchronous (non-synchronized) OFDM symbol boundaries between two APs during the simultaneous transmission.

Each access point (AP) associates with at least one station (STA) and one of the access points (AP1) starts data packet transmission to STA1 in a start time period. AP1 sends a simultaneous transmission agreement, such as an S-Tx request frame or an S-Tx preamble, to another access point (AP2). AP2 receives the S-Tx request frame which includes coordination information, and either accepts or rejects the simultaneous transmission agreement.

In other scenarios, the access point (AP1) sends a preamble in an omni-directional manner and AP2 receives the preamble information. It should be appreciated that the preamble information contains simultaneous transmission information, such as, S-Tx allowance indication field, coordination duration, OFDM symbol boundary, and optionally other fields depending on the application. The AP2 decodes the preamble information and uses the information to synchronize the OFDM symbol boundary and coordinate the duration with AP1. AP2 joins the simultaneous transmission and starts transmitting a packet to STA2 sometime during the packet transmission by AP1 and finishes its transmission before the end of the transmission by AP1.

4. Hardware Embodiment 4.1. Station (STA) Hardware Configuration

Figure 7:
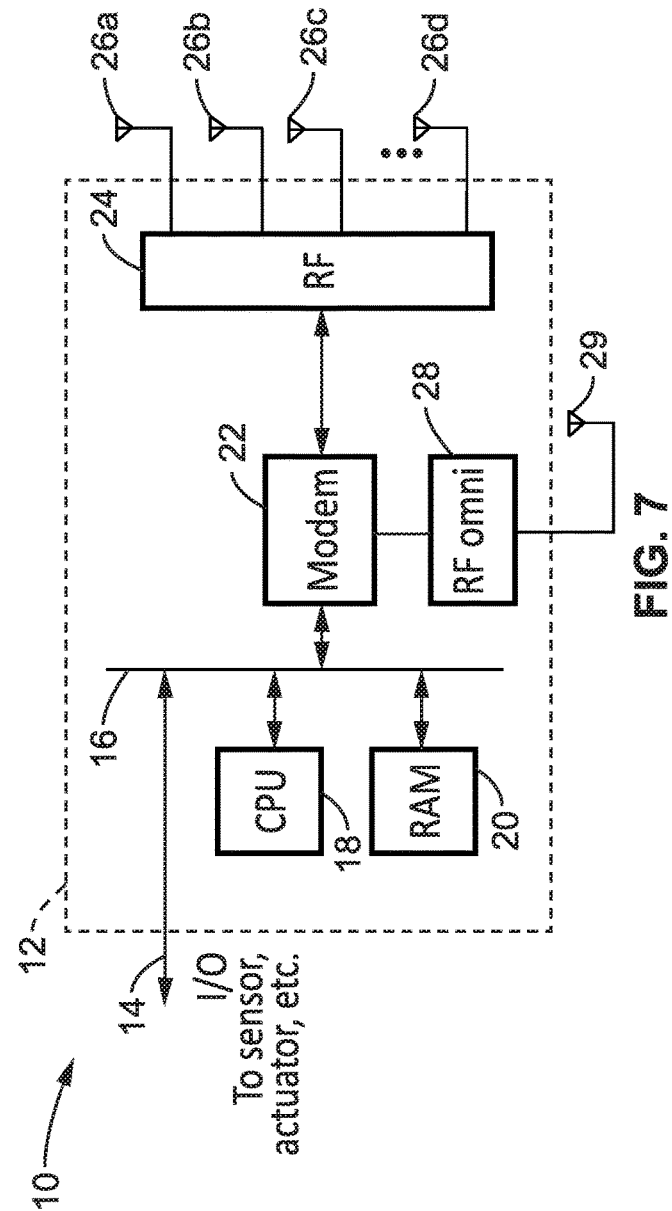
FIG. 7 is a block diagram of a wireless communication station hardware as utilized according to at least one embodiment of the present disclosure.

FIG. 7 illustrates an example embodiment 10 of a WLAN station according to the present disclosure. An I/O path 14 is shown into circuit block 12 which has a bus 16 connected to at least one computer processor (CPU) 18, memory (RAM) 20, and at least one modem 22. Bus 14 allows connecting various devices to the CPU, such as to sensors, actuators and so forth. Instructions from memory 20 are executed on processor 18 to execute a program which implements the communication protocols, which are executed to allow the STA to perform the functions of an access point (AP) station, or a regular station (STA). It should also be appreciated that the programming is configured to operate in different modes (source, intermediate, destination, first AP, other AP, stations associated with first AP, stations associated with other AP, coordinator, coordinatee and so forth), depending on what role it is playing in the current communication context.

This host machine is shown configured with at least one modem coupled to at least one radio-frequency (RF) circuit. By way of example and not limitation, the figure depicts a single modem 22 coupled to a first RF circuit 24 connecting to a plurality of antennas 26a, 26b, 26c through 26n (e.g., antenna array), and a second RF circuit 28 connecting to an omnidirectional antenna 29, both allows transmitting and receiving frames with neighboring STAs. The combination of processor, modem and RF circuits, allow beamformed (directional) communications to be supported, as well as for supporting quasi-omni (referred to herein simply as omni) mode transmissions. In addition, nulls can be generated in the directional patterns to shield select directions (sectors) and thus reduce interference between stations.

As shown in the figure, the station can have a modem with 2 RFs (or alternatively two modems each coupled to its own RF circuit). One RF is coupled to multiple antennas that can be used for directional transmission; while the other RF circuit is coupled to a single antenna that can be used for omni-directional transmission. It should be appreciated that the omni-directional transmission can also be achieved by using only one of the multiple antennas used for directional transmission. In at least one embodiment the communications are directed for use on the sub-6 GHz band.

Thus, the STA HW is shown configured with at least one modem, and associated RF circuitry for providing communication on at least one band. By way of example and not limitation the intended directional communication band is implemented with a modem and its associated RF circuitries for transmitting and receiving data. In some implementations another band can be supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

4.2. Illustrative Topology

Figure 8:
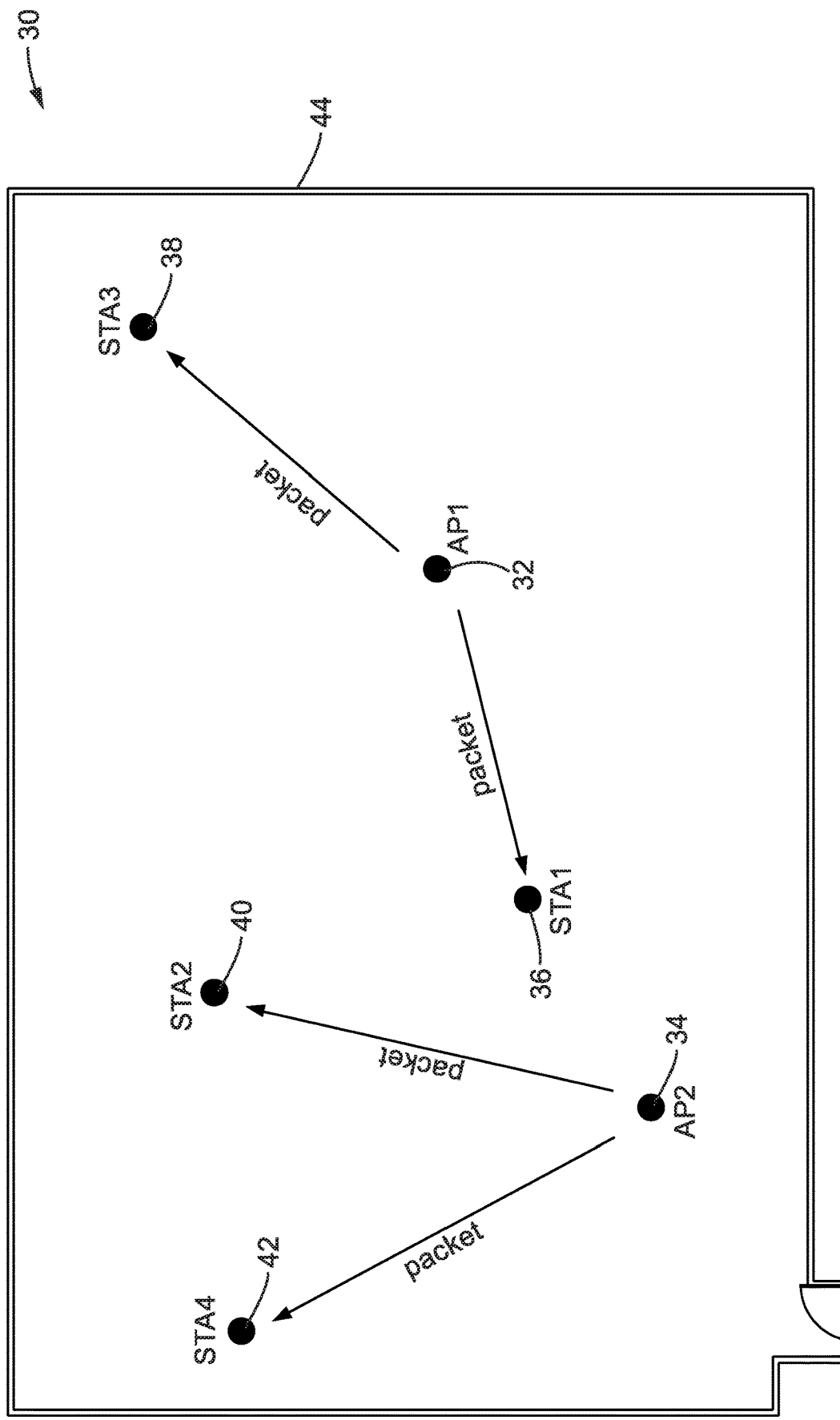
FIG. 8 is a network topology diagram of a small WLAN network having two APs, used as an example topology in the present disclosure.

FIG. 8 illustrates an example network scenario embodiment 30 for explaining the operation of the proposed technology. It should be appreciated that the present disclosure is not limited to this specific scenario, as the disclosure may be utilized in scenarios of larger networks containing more than two APs, any desired number of STAs, any relative orientations of STAs and APs, and having any arbitrary or fixed boundaries of the broadcast area. In this example scenario there is seen AP1 32, AP2 34 and four other STAs (STA1 36, STA3 38, STA2 40 and STA4 42) within two Basic Service Sets (BSSs) in a meeting room 44. It will be noted that a Basic Service Set, is a set of stations (STAs) that have successfully synchronized with an AP in the network. Each STA can communicate with the other STAs in the same BSS. All STAs use CSMA/CA for random channel access. The location of the STAs and their transmission links are as shown in the figure. STAs are assigned to their own BSS and can be a part of a set of multiple BSSs that can coordinate with each other.

4.3. Downlink OFDM Beamforming Simultaneous Transmission

The simultaneous transmission occurs when one AP starts transmitting a packet during the ongoing transmission of another AP. For example, in the network topology as shown in FIG. 8, AP1 starts to transmit the data packet to STA1. Then, AP2 starts its transmission to STA2 during the ongoing transmission of AP1. AP2 may also request an ACK back from its receiver STA2. AP1 is denoted as a coordinator and AP2 is denoted as coordinatee in these simultaneous transmissions.

AP1 can be subject to interference due to the data packet and ACK transmission of AP2. The interference can be reduced by AP2 and STA2 configuring their antenna array to create a null towards the transmission of AP1. However, the interference still occurs because: (a) the waveform of the preamble of AP2's data packet and ACK received by AP1 and STA1 is in full power; and (b) the periodic energy bursts occur at OFDM symbol transitions during AP2's transmission (including ACK), which still can cause interference at the ongoing transmission of AP1.

The goal of the proposed technology is to eliminate the interference due to the data packet and ACK transmissions of AP2 during the simultaneous transmissions. In order to achieve this, AP2 and STA2 can either: (a) transmit their preambles precoded, i.e., create a null towards AP1 or STA1 commencing at the start of their preamble, or transmit their omni-directional preambles during the midamble of AP1's data transmission to eliminate the interference due to the preamble; and/or (b) synchronize the OFDM symbol boundary with APIs to eliminate the interference due to the periodic energy bursts occurring at OFDM symbol transitions. It should be noted that to "Precode" the preamble means that the whole preamble will be transmitted in beamforming manner and this may include creating a null towards other STAs.

This section explains application of the above techniques to eliminate the interference during simultaneous transmission in a downlink scenario, with examples described in relation to the example network topology of FIG. 8 with simultaneous transmissions occurring on AP1 and AP2.

This next section introduces three possible transmission schemes (methods/procedures) for performing the simultaneous transmissions. For each transmission scheme, several examples are provided to explain the details of the transmission procedure.

4.3.1. Simultaneous Transmission Agreement

Figure 9:
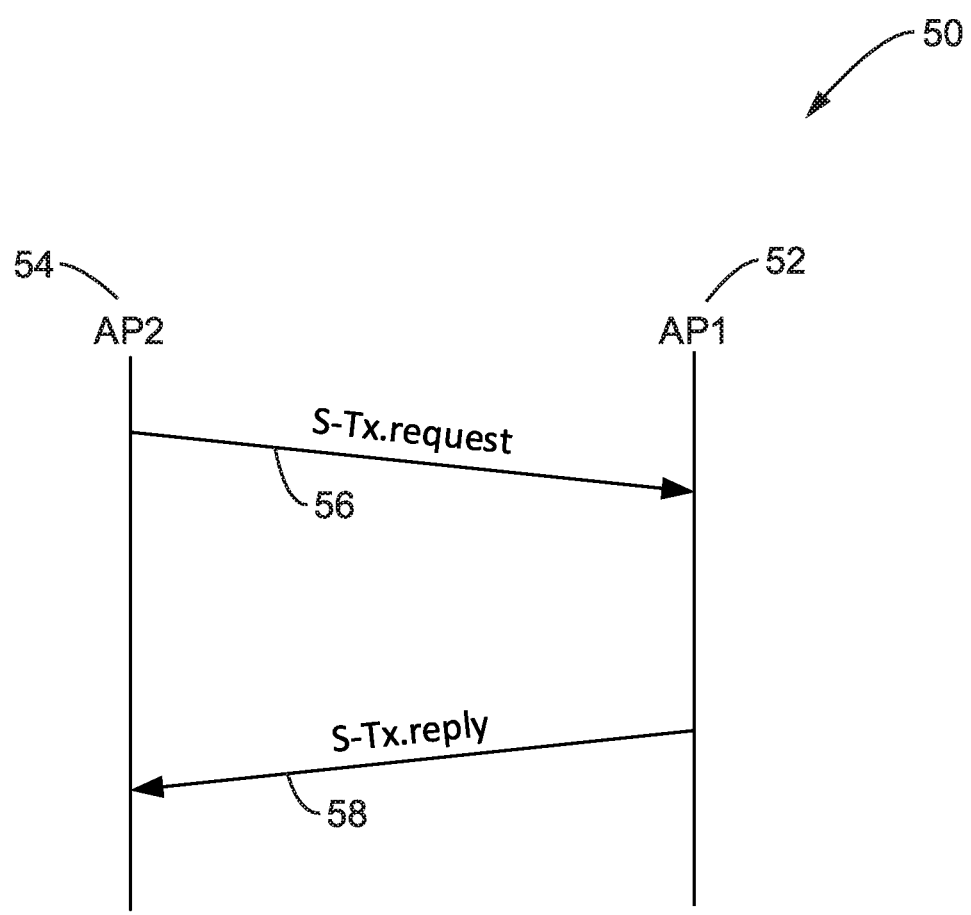
FIG. 9 is a signaling diagram between Access Points (APs) in establishing a simultaneous transmission agreement according to at least one embodiment of the present disclosure.

FIG. 9 illustrates an example embodiment 50 of a simultaneous transmission agreement procedure between AP1 52 and AP2 54. An agreement may be needed before AP1 and AP2 start simultaneous transmission in a downlink scenario. By way of example and not limitation, AP2 sends a S-Tx.request frame 56 to AP1 requesting joining the simultaneous transmission. In the request frame, AP2 indicate its traffic type and coordination scheduling. Traffic type could be any of a number of parameters or combinations, for example Access Category (AC), traffic identifier (TID), or priority of the traffic. The format of the request frame is shown in FIG. 33.

AP1 then replies by sending an S-Tx.reply frame 58 back to AP2. The format of the S-Tx.reply frame is shown in FIG.

34. AP1 can deny the request from AP2 by setting the agreement indication field to a first state (e.g., "0") in the S-Tx.reply frame. Otherwise, AP1 agrees to coordinate with AP2 and set the agreement indication field to a second state (e.g., "1") in the S-Tx.reply frame. AP1 also creates a Coordination ID (Coord ID) for AP2. AP2 can use this Coord ID to determine/estimate the start of simultaneous transmission. AP1 sends the information of the STAs in its BSSs (i.e., Group of STAs field) to AP2.

In some scenarios, AP2 can perform simultaneous transmission without prior agreement with AP1 insofar as it is not affecting AP1 transmissions. In such cases the exchange of these messages can be skipped as unnecessary. In these cases AP2 assumes AP1 is allowing simultaneous transmission all the time and AP1 is allowing simultaneous transmission without any negotiation.

4.3.2. Simultaneous Tx Agreement Process

Figure 10:
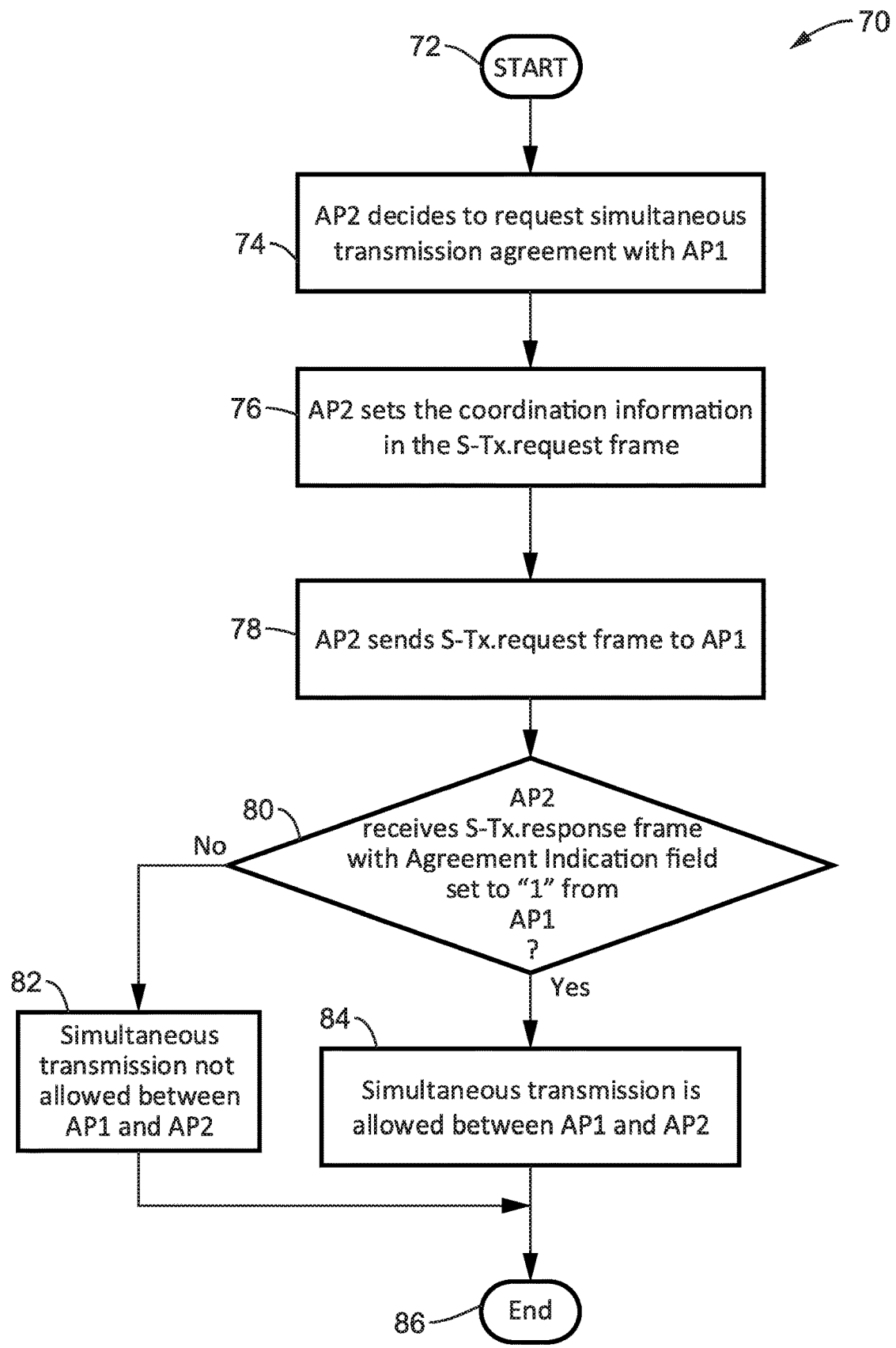
FIG. 10 is a flow diagram of an AP requesting a simultaneous transmission agreement according to at least one embodiment of the present disclosure.

FIG. 10 illustrates an example embodiment 70 for an AP, exemplified as AP2, starting a simultaneous transmission agreement as was shown in FIG. 9. The process starts 72, and when AP2 decides 74 to request a simultaneous transmission agreement with AP1, it sets 76 the coordination information, such as Traffic Type, Coord Start Time, Coord Periodical Time, Coord duration field, and Coord End Time, in the S-Tx.request frame. Then, AP2 sends 78 the S-Tx.request frame to AP1.

A check 80 is made on the response from AP1. If it is determined that S-Tx.response frame from AP1 has an Agreement Indication field set to "1", then execution reaches block 84, since the AP1 accepts the agreement and AP2 is allowed to join the simultaneous transmission with AP1. Otherwise, if the AP1 is not in agreement (S-Tx.response frame from AP1 has Agreement Indication field set to "0"), then block 82 is reached as simultaneous transmission is not allowed. In either case execution then reaches the end of the process at block 86.

Figure 11A:
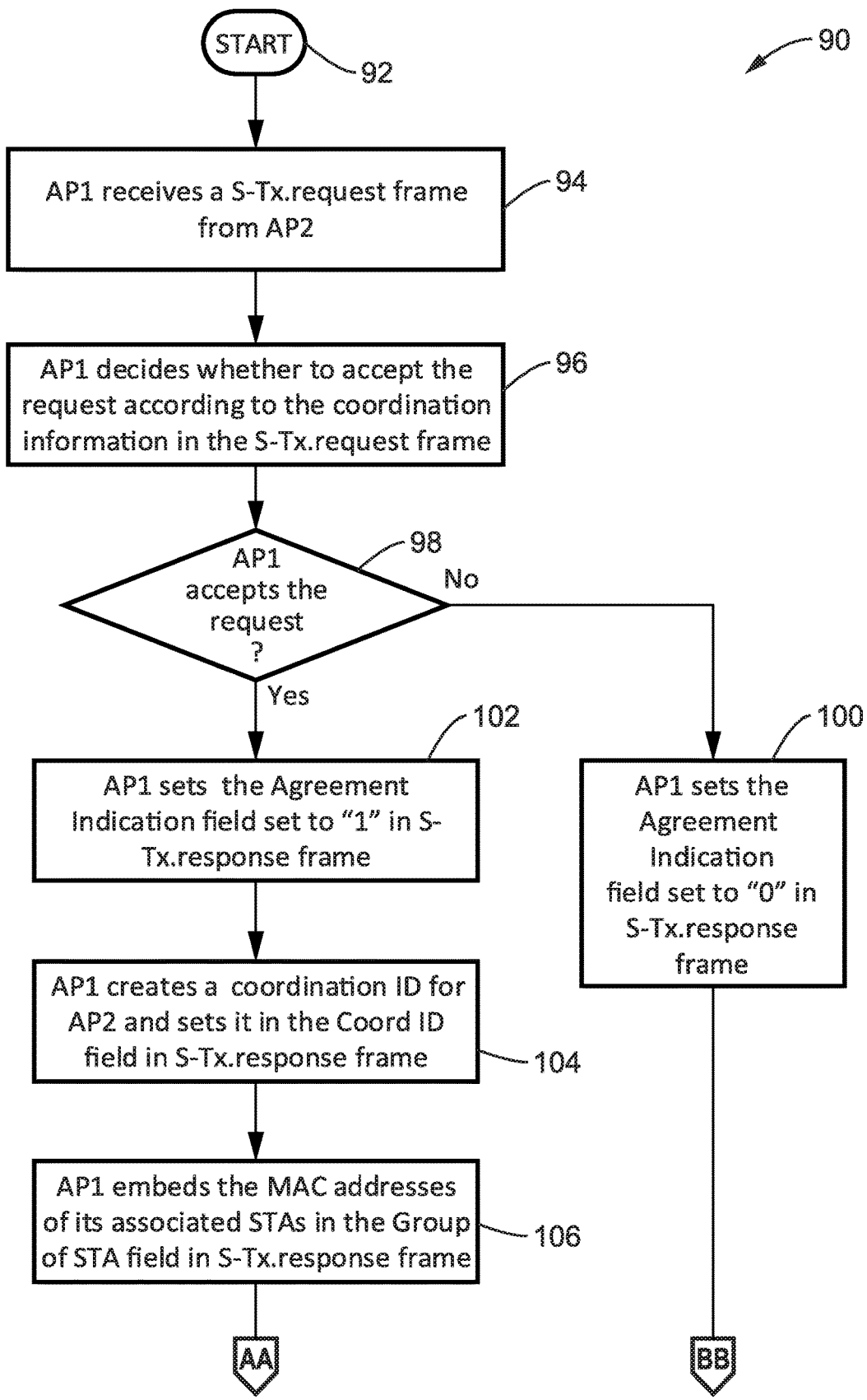
FIG. 11A and FIG. 11B are a flow diagram of an AP accepting or rejecting a simultaneous transmission agreement according to at least one embodiment of the present disclosure.
Figure 11B:
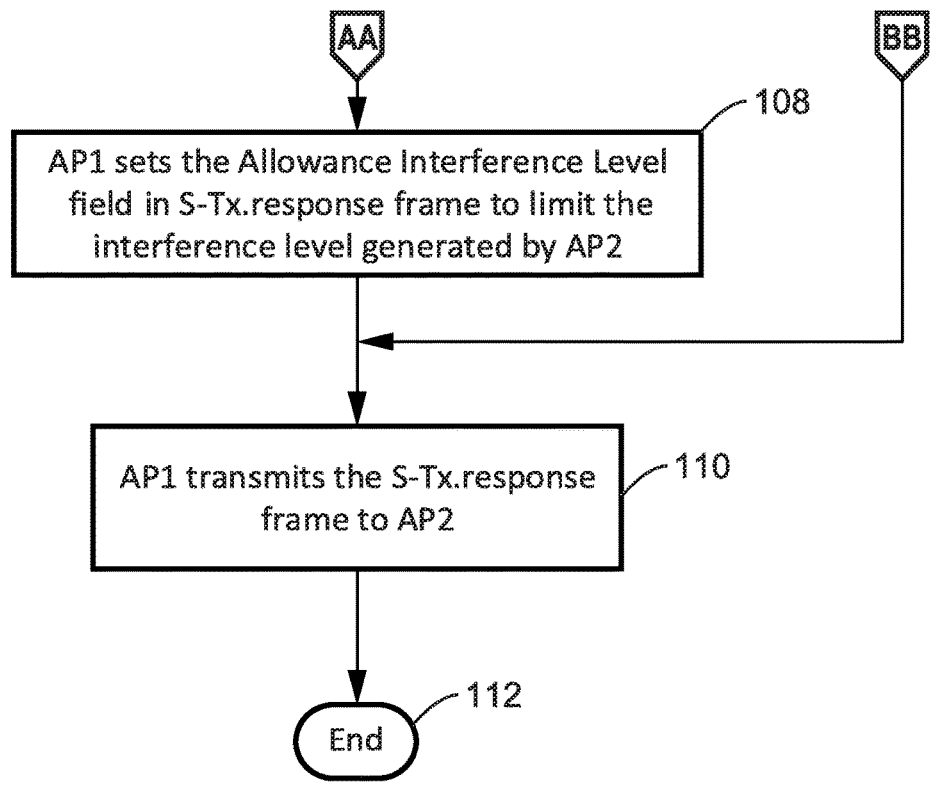

FIG. 11A and FIG. 11B illustrate an example embodiment 90 of an AP1 accepting or rejecting the simultaneous transmission agreement shown in FIG. 9. The process starts 92 in FIG. 11A with AP1 receiving 94 an S-Tx.request frame from AP2. This AP then processes 96 the information on whether to accept or reject the agreement according to the coordination information carried by the S-Tx.request frame, and the decision is made at block 98.

If AP1 rejects the agreement, then block 100 is reached with AP1 setting the Agreement Indication field to "0" in the S-Tx.response frame. The other fields in the S-Tx.response frame are reserved. Then in block 110 of FIG. 11B AP1 sends the S-Tx.response frame to AP2 to inform it of the result of the agreement, and the process ends 112.

Otherwise, if at block 98 it is seen that AP1 accepts the agreement, then block 102 is reached and AP1 sets the Agreement Indication field to "1" in the S-Tx.response frame. AP1 then creates 104 a coordination ID for AP2 and embeds it in the Coord ID field of the S-Tx.response frame. This information can be used to inform about the start of simultaneous transmission with AP2. In at least one embodiment AP1 then also embeds 106 the MAC address of its associated STAs in the Group of STA field of the S-Tx.response frame; which can be used by AP2 to know (determine) which STA is the receiver of AP1 when the simultaneous transmission occurs. In at least one embodiment AP1 then also sets 108 of FIG. 11B an Allowance interference level field to limit the interference generated by AP2 during the simultaneous transmission and protect its transmission from the interference due to AP2. Then in block 110 AP1 then sends the S-Tx.response frame to AP2 to inform the result of the agreement, and the process ends 112.

Figure 12A:
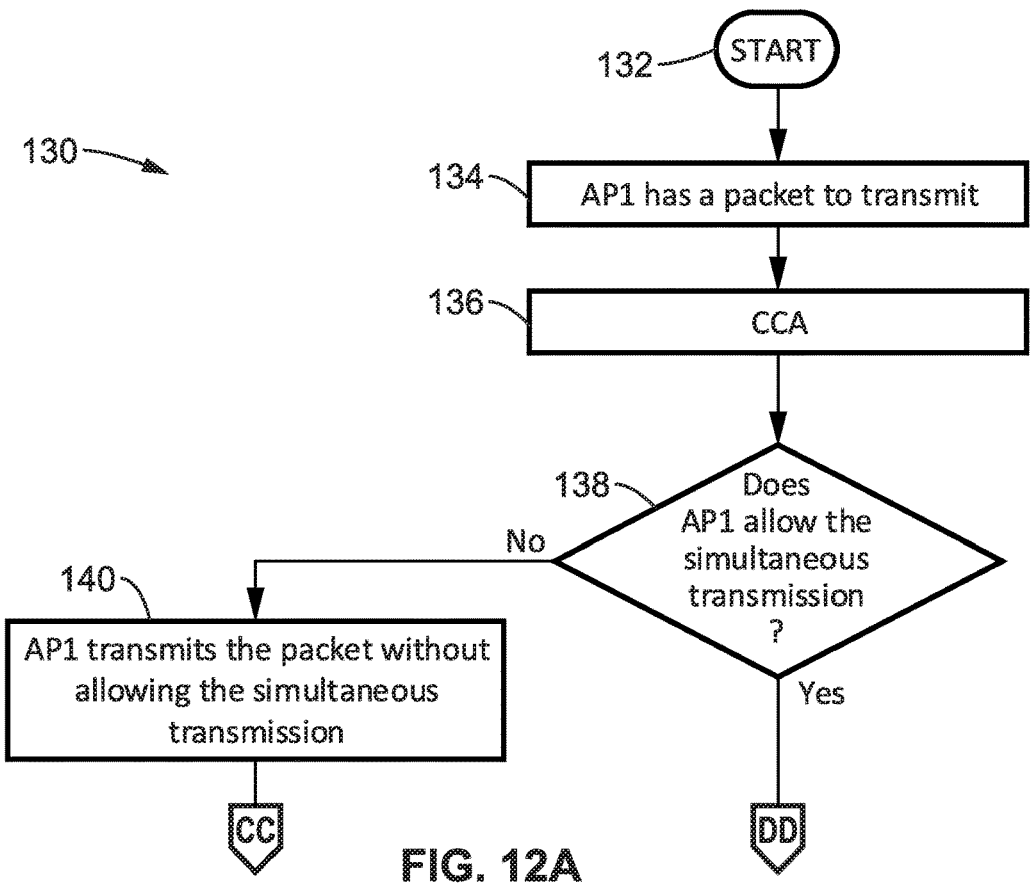
FIG. 12A and FIG. 12B are a flow diagram of an AP1 starting a simultaneous transmission according to at least one embodiment of the present disclosure.
Figure 12B:
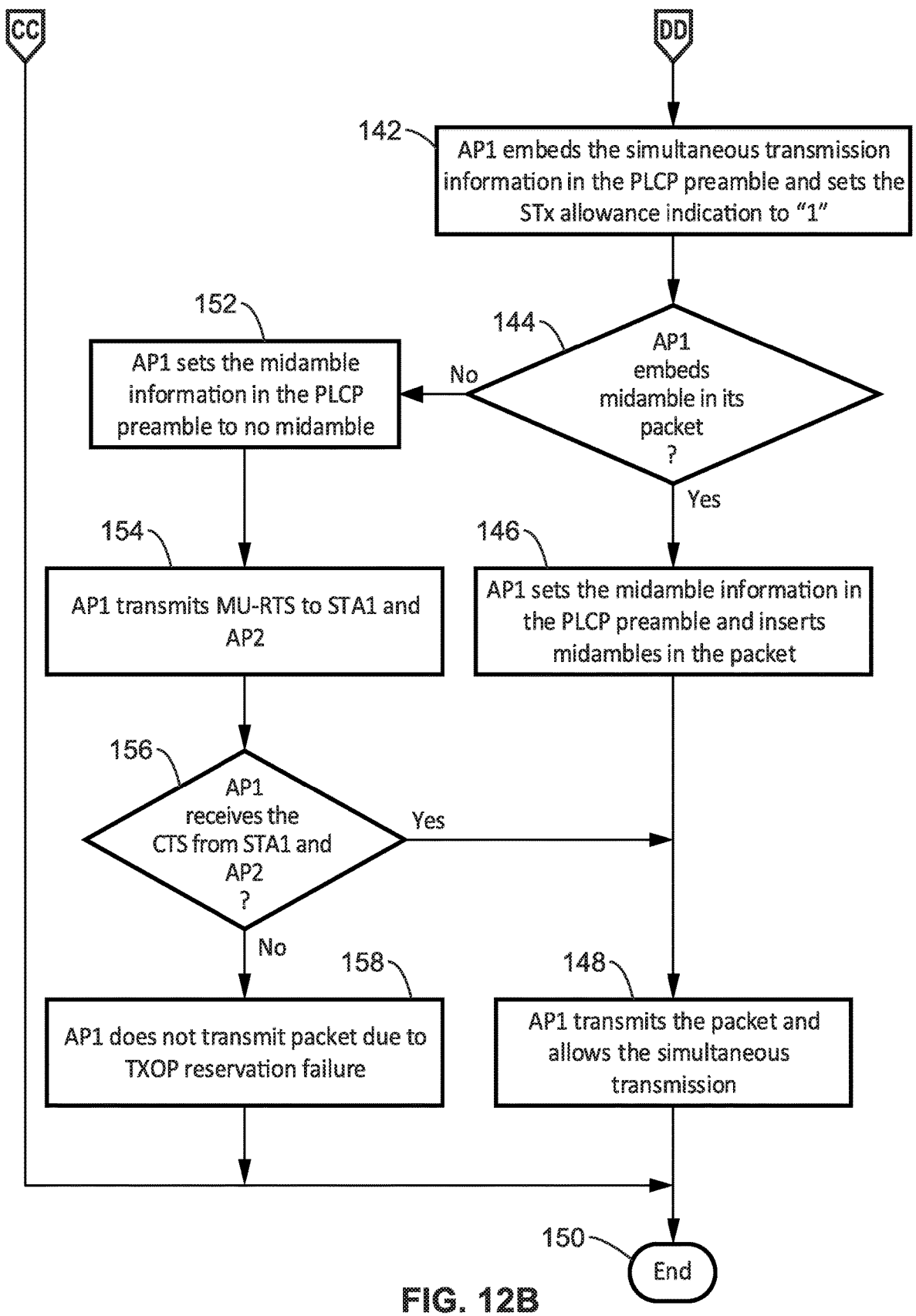

FIG. 12A and FIG. 12B illustrates an example embodiment 130 of an AP1 starting a simultaneous transmission, which is depicted later in FIG. 17. The process starts 132 in FIG. 12A when AP1 has a packet to transmit 134, it then contends 136 for the channel and gains channel access for transmitting.

Figure 36:
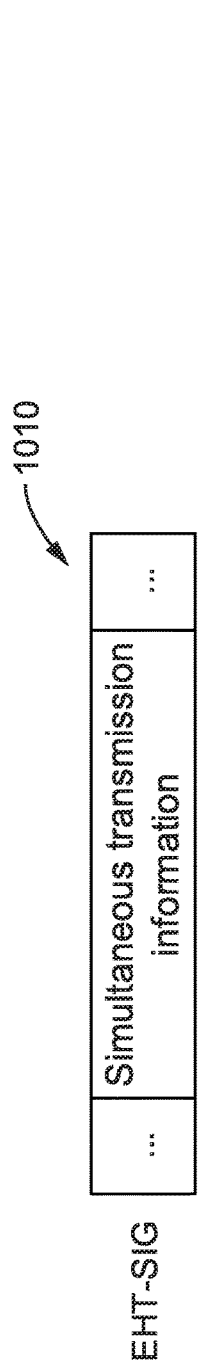
FIG. 36 is a data field diagram of simultaneous transmission information embedded in an EHT-SIG field of the PLCP preamble according to at least one embodiment of the present disclosure.

AP1 makes a decision 138 on whether to allow a simultaneous transmission with AP2. This decision can be made according to the simultaneous transmission agreement. For example, if the current time is within the coordination duration of a coordination period (as decided in the agreement), then AP1 allows the simultaneous transmission and execution reaches block 142 in FIG. 12B. If AP1 does not allow the simultaneous transmission then execution reaches block 140 in which AP1 can transmit the packet without allowing simultaneous transmission. If the packet uses the regular IEEE 802.11be as shown in FIG. 6 to carry the simultaneous transmission information as shown in FIG. 35, AP1 can set the STx allowance indication to "0" to indicate the simultaneous transmission is not allowed. It should be noted that the simultaneous transmission information can be in the EHT-SIG field of the preamble as shown in FIG. 36.

Figure 23A:
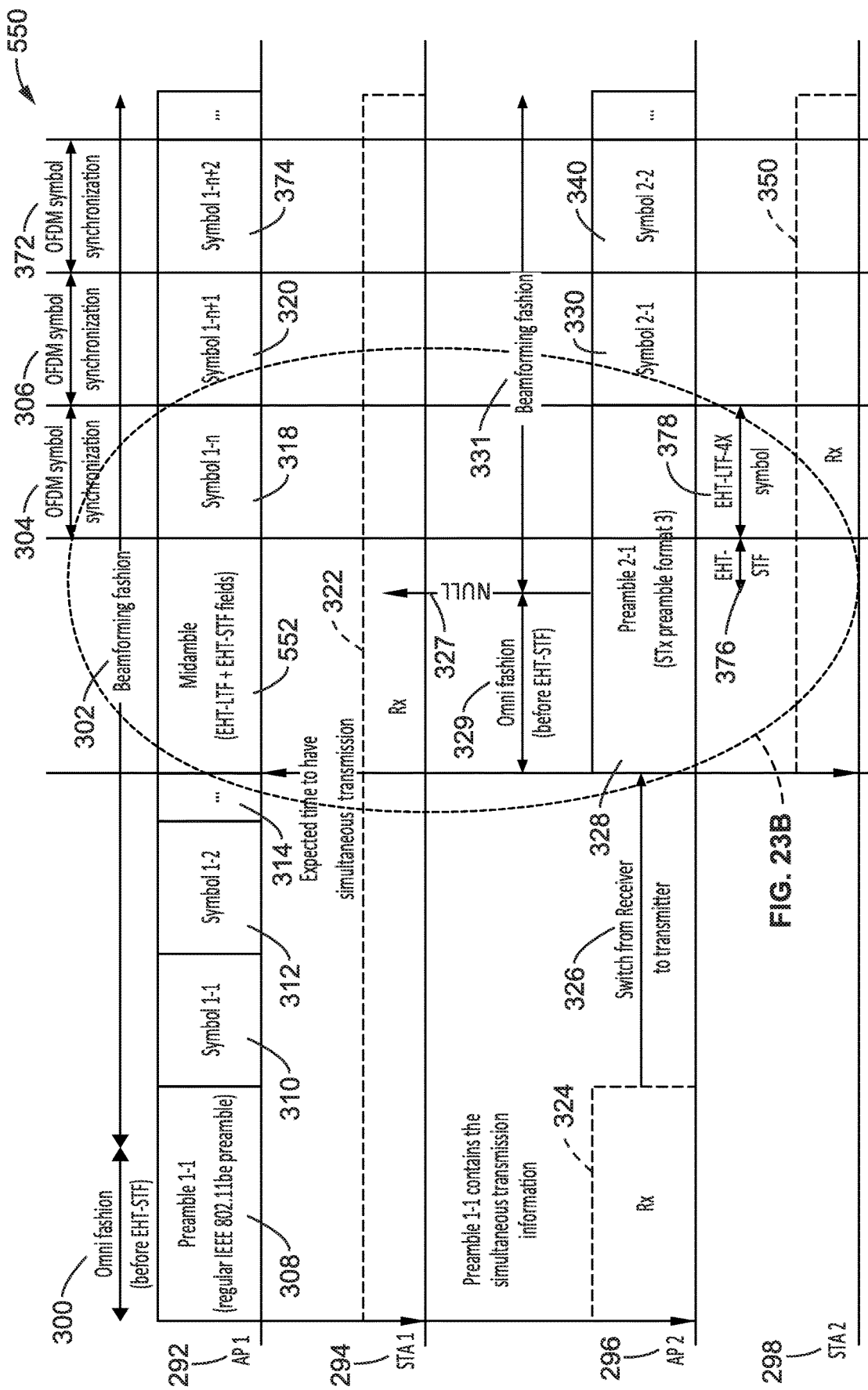
FIG. 23A and FIG. 23B are a signaling diagram of another alternative (example 2e) to the second example of using the first simultaneous transmission scheme according to at least one embodiment of the present disclosure.
Figure 23B:
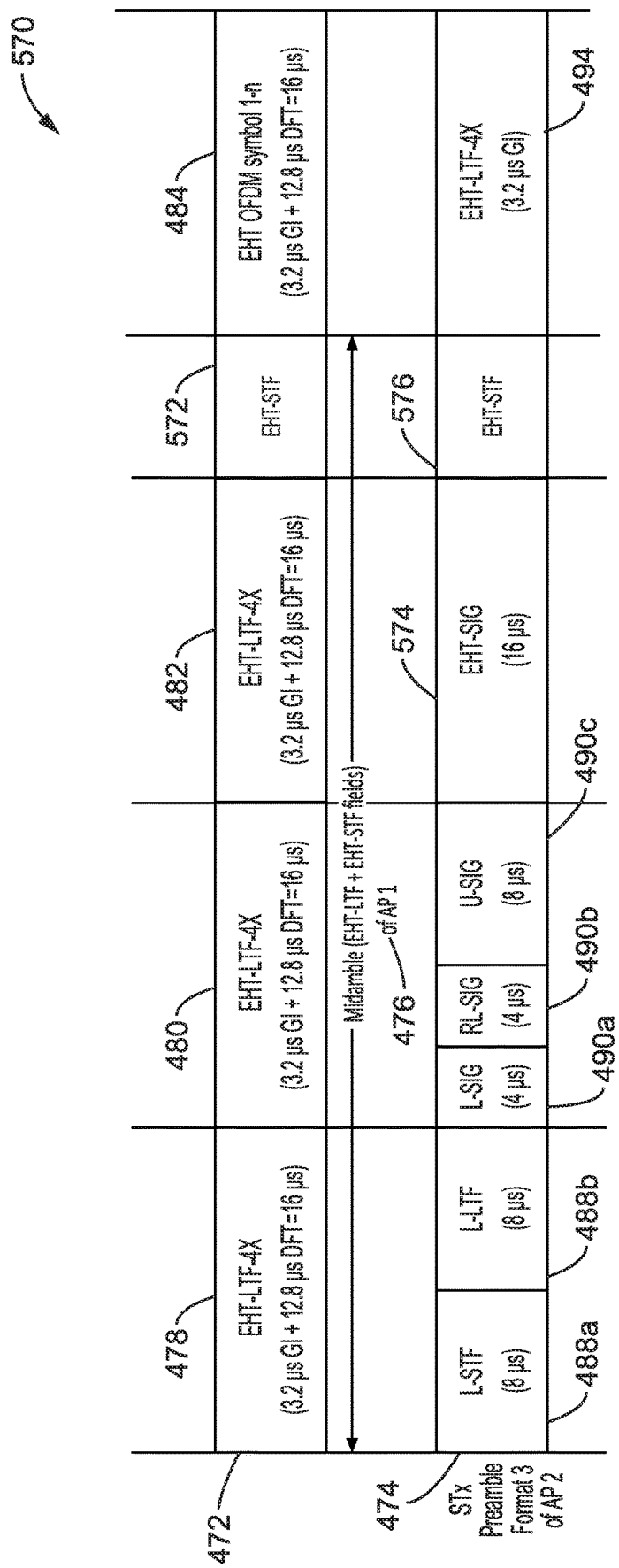

Returning now to block 142 in FIG. 12B, in the case of AP1 allowing simultaneous transmission, AP1 embeds the simultaneous transmission information in the preamble and sets the STx allowance indication to "1". The disclosed technology allows AP1 to embed a midamble in its packet and AP2 to start simultaneous transmission during the midamble. In IEEE 802.11ax, the midamble consists of EHT-LTF fields. The proposed technology allows the midamble to contain other signal training fields. One example is shown in FIG. 23A and FIG. 23B. It should be noted that the midamble can be used either for simultaneous transmission or Doppler effect. When the coordination duration for the simultaneous transmission information is not equal to 0, then the midamble is used for simultaneous transmission only. Since it does not carry data information, its loss when destroyed by the effects of interference does not need to be overcome by requiring retransmission. When AP2 joins the simultaneous transmission, the preamble of AP2 can be transmitted omni-directionally, this transmission is received by AP1 in full power. Therefore, AP1 determines 144 whether to embed midamble in its packet.

If AP1 decides to embed a midamble in its packet, block 146 is reached where it set the midamble information of the simultaneous transmission information in the preamble and inserts the midamble in its packet. Then, AP1 transmits the packet 148 with midamble and allows the simultaneous transmission before the process ends 150. AP2 is able to join the simultaneous transmission by commencing transmission of a packet during the midamble as explained in FIG. 14A and FIG. 14B.

If AP1 determines not to embed a midamble in its packet at decision block 144, then AP1 sets 152 the midamble information to no midamble. In block 154 AP1 transmits MU-RTS frame to STA1 and AP2 to reserve TXOP for simultaneous transmission. It will be appreciated that TXOP stands for Transmit Opportunity which is a Medium Access Control (MAC) layer feature in IEEE 802.11 based wireless local area networks (WLANs), with TXOP defining a time duration over which a station can send frames after it has contended and gained access of the transmission medium. A check is made 156 to determine if AP1 received a CTS frame in response to the RTS frame. If a CTS frame is received, then block 148 is reached in which AP1 transmits the packet without midamble and allows the simultaneous transmission. AP2 is still able to join the simultaneous transmission by transmitting a packet with precoded preamble as explained in FIG. 14A and FIG. 14B. Otherwise, if at block 156, a CTS was not received, then at block 158 the TXOP reservation fails and AP1 cannot transmit the packet, and execution ends 150. Since no CTS was received retransmission may then be scheduled.

It should be noted that there are two possible actions that AP2 can take when it receives the MU-RTS frame from AP1 as explained regarding block 152 of FIG. 12B: (1) AP2 can always send a CTS frame back to AP1, and (2) AP2 can decide whether to send a CTS frame back depending on its demand of performing packet transmission.

Figure 13:
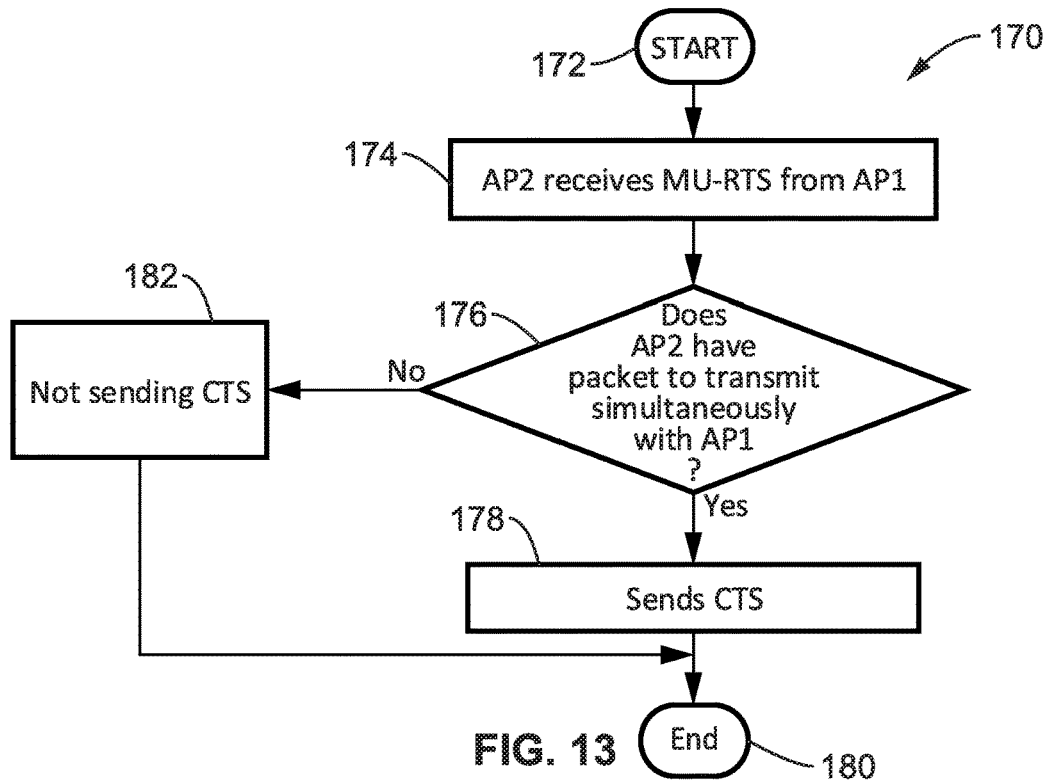
FIG. 13 is a flow diagram of actions of a second AP when it receives the MU-RTS from a first AP according to at least one embodiment of the present disclosure.

FIG. 13 illustrates an example embodiment 170 for the second possible action that AP2 can take when it receives the MU-RTS frame from AP1. Execution starts 172 when AP2 receives 174 the MU-RTS frame from AP1, it checks 176 whether it has a packet to transmit simultaneously with AP1. If AP2 does not have a packet to transmit, then execution reaches block 182 and it does not transmit a CTS back, and the process ends 180. Otherwise, if at block 176 it is determined that AP2 has a packet to transmit, then block 178 is reached and AP2 sends a CTS back to AP1, before the process ends 180.

Figure 14A:
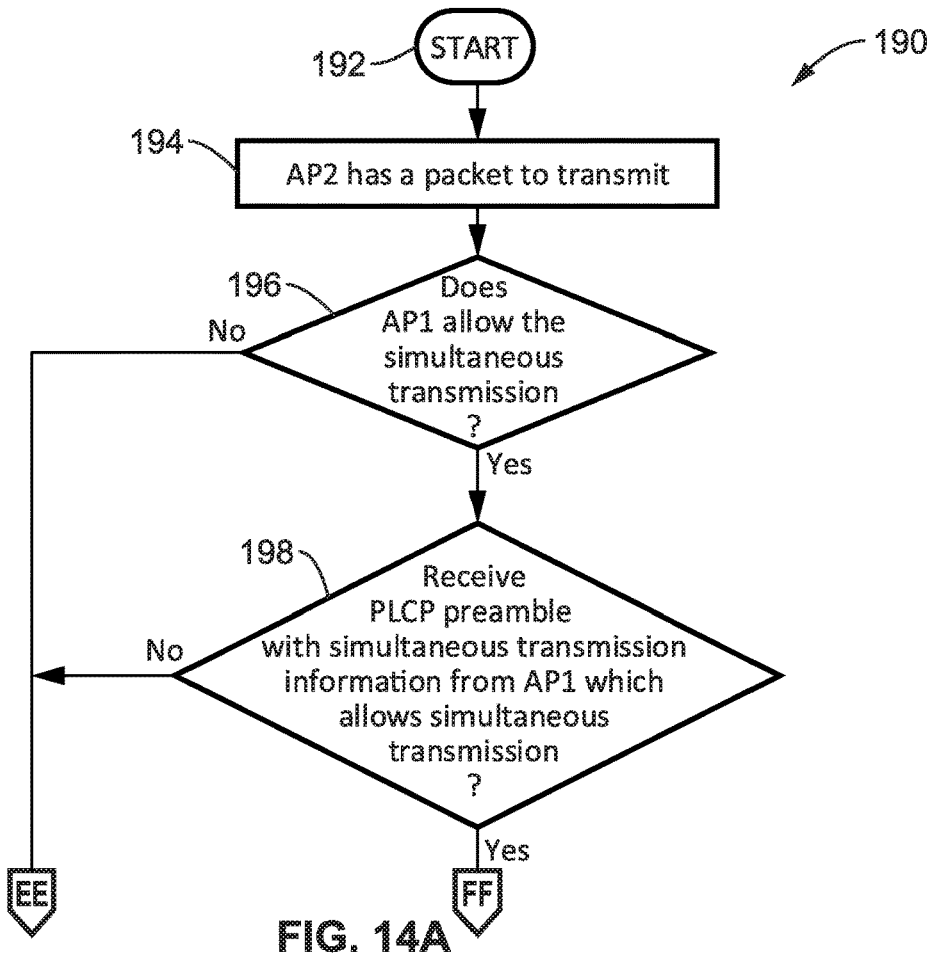
FIG. 14A and FIG. 14B are a flow diagram of a second AP joining the simultaneous transmission according to at least one embodiment of the present disclosure.
Figure 14B:
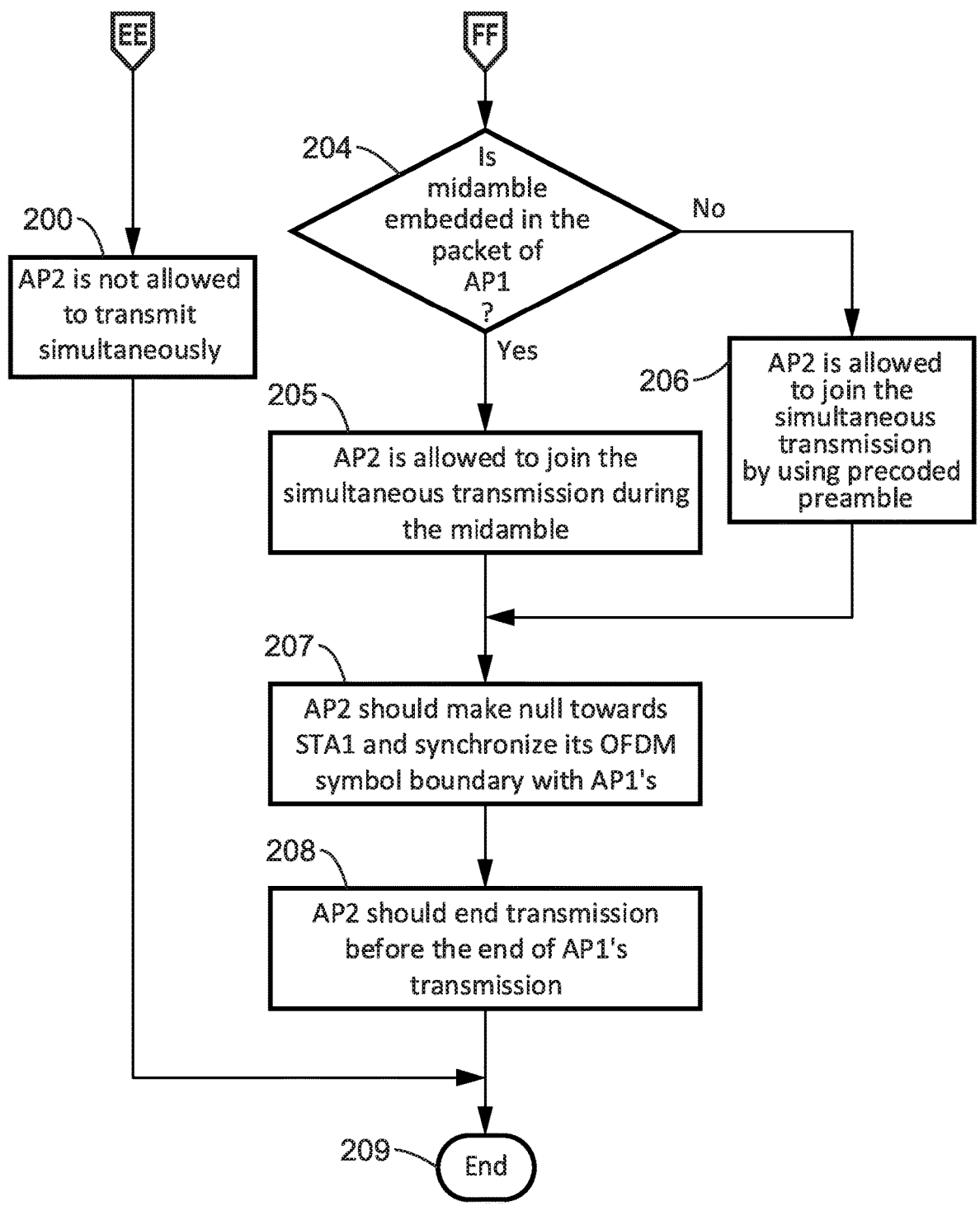

FIG. 14A and FIG. 14B illustrate an example embodiment 190 of AP2 joining a simultaneous transmission during the ongoing transmission of AP1. The process starts 192 when AP2 has a packet to transmit 194. A check 196 is then made if a simultaneous transmission agreement has been established with AP1. If the agreement is rejected by AP1, then execution reaches block 200 in FIG. 14B and AP2 is not allowed to transmit a packet simultaneously with AP1, with the process ending 209.

Otherwise, if at block 196 in FIG. 14A it is determined that the agreement was accepted by AP1, then check 198 is reached at which it is determined if AP2 has received the PLCP preamble with simultaneous transmission information from AP1. If AP1 does not allow the simultaneous transmission, then block 200 is reached in FIG. 14B and AP2 is not allowed to transmit packet simultaneously with AP1, with the process ending 209. Otherwise, if the PLCP preamble was received with the STx allowance indication set, then check 204 is reached in FIG. 14B, with AP2 checking if a midamble was embedded in the packet from AP1. Then, AP2 can determine whether the midamble is embedded in the data packet of AP1 according to the information found in the midamble information field in the PLCP preamble.

If there exists a midamble in the data packet of AP1, then execution reaches block 205 and AP2 can start simultaneous transmission during the period of midamble of AP1. The preamble of AP2 should be transmitted in omni-directional fashion.

If, however, at check 204 it is determined that a midamble does not exist in the data packet of AP1, then execution reaches block 206 and AP2 can start simultaneous transmission during any OFDM symbol of AP2's transmission and the preamble of AP2 should be precoded.

In either case execution then reaches block 207 and the AP2 starts simultaneous transmission, it should make a null (no transmissions in that direction) towards STA1 and synchronizes its OFDM symbol boundaries with that of AP1. Then in block 208 AP2 ends its transmission before AP1 finishes transmitting, and the process ends 209.

Figure 15:
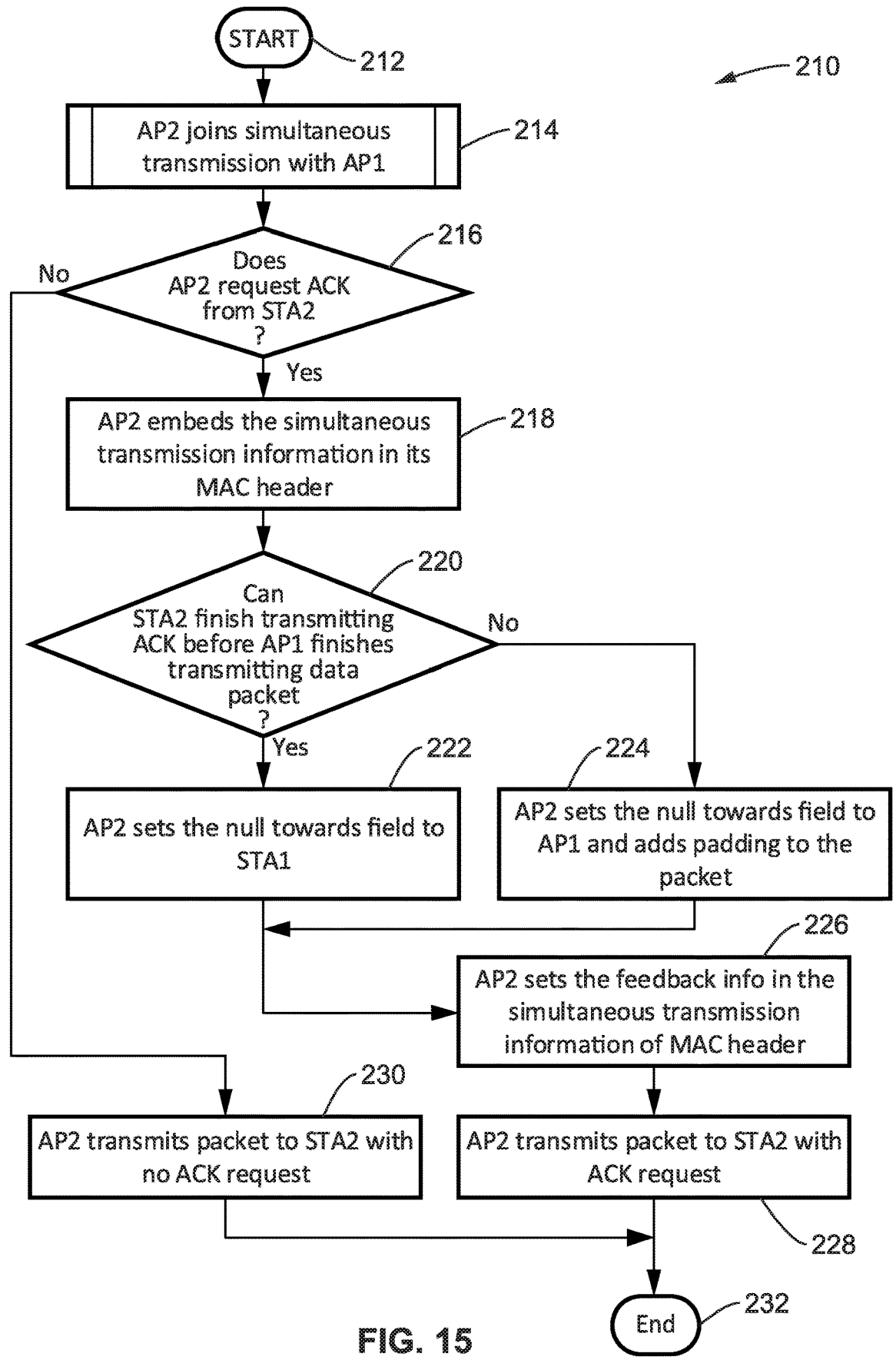
FIG. 15 is a flow diagram of the second AP requesting an acknowledgement (ACK) from a station (STA) according to at least one embodiment of the present disclosure.

FIG. 15 illustrates an example embodiment 210 of AP1 requesting an acknowledgement (ACK) from STA2 during simultaneous transmission. Process execution starts 212 and AP2 joins 214 the simultaneous transmission, whose procedure was explained in FIG. 14A and FIG. 14B. Before it starts transmitting a data packet to STA2, a check is made 216 to determine whether to request an ACK from STA2. If the ACK is not requested, then execution reaches block 230 and AP2 transmits the data packet to STA2 with no ACK after which the process ends 232.

Figure 40:
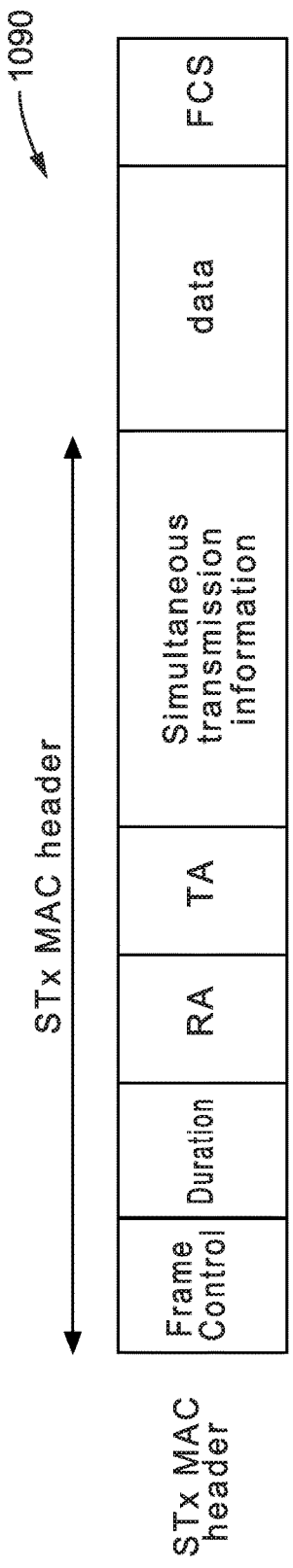
FIG. 40 is a data field diagram of simultaneous transmission information embedded in a Medium Access Control (MAC) header according to at least one embodiment of the present disclosure.

If at block 216, it is determined that the ACK is to be requested, then at block 218 AP2 embeds the simultaneous transmission information into the MAC header of its data packet (shown in FIG. 40). The Coord Duration is preferably set to the time between the start time of the data packet for AP2 and the end time of the data packet of AP1. The packet duration is preferably set to the data packet duration of AP1. The midamble info field and the G1+EHT-LTF size field should be duplicated from AP1. Feedback Info field should be the ACK request of AP2.

A check 220 is made if AP2 estimates that STA2 is able to finish transmitting an ACK before AP1 finishes transmitting its data packet. If it is determined that STA2 should finish its ACK transmission before AP1 completes its packet, then at block 222 AP2 communicates to STA2 indicating it should make a null towards STA1 by setting the Null Towards field in the MAC header to be STA1. In this case, STA2 has to finish its ACK transmission before the end of AP1's data packet transmission which is explained in FIG. 16.

If at check 220 AP2 estimates that STA2 cannot finish transmitting ACK before AP1 finishes transmitting its data packet, then AP2 directs 224 STA2 to make null towards AP1 by setting the Null Towards field in the MAC header to be AP1 and adds padding to the packet. The purpose of adding padding is to let AP1 and AP2 finish transmitting at the same time. The padding can be created using extra OFDM symbols in the end of packet, or other means as desired. In this case, STA2 and STA1 will transmit ACKs simultaneously which is explained in FIG. 16.

In either case (222, 224) block 226 is reached where AP2 can also set feedback information in the simultaneous transmission information of the MAC header. Then, AP2 transmits 228 a data packet to STA2 with and requests STA2 to send the ACK back before the process ends 232.

Figure 16:
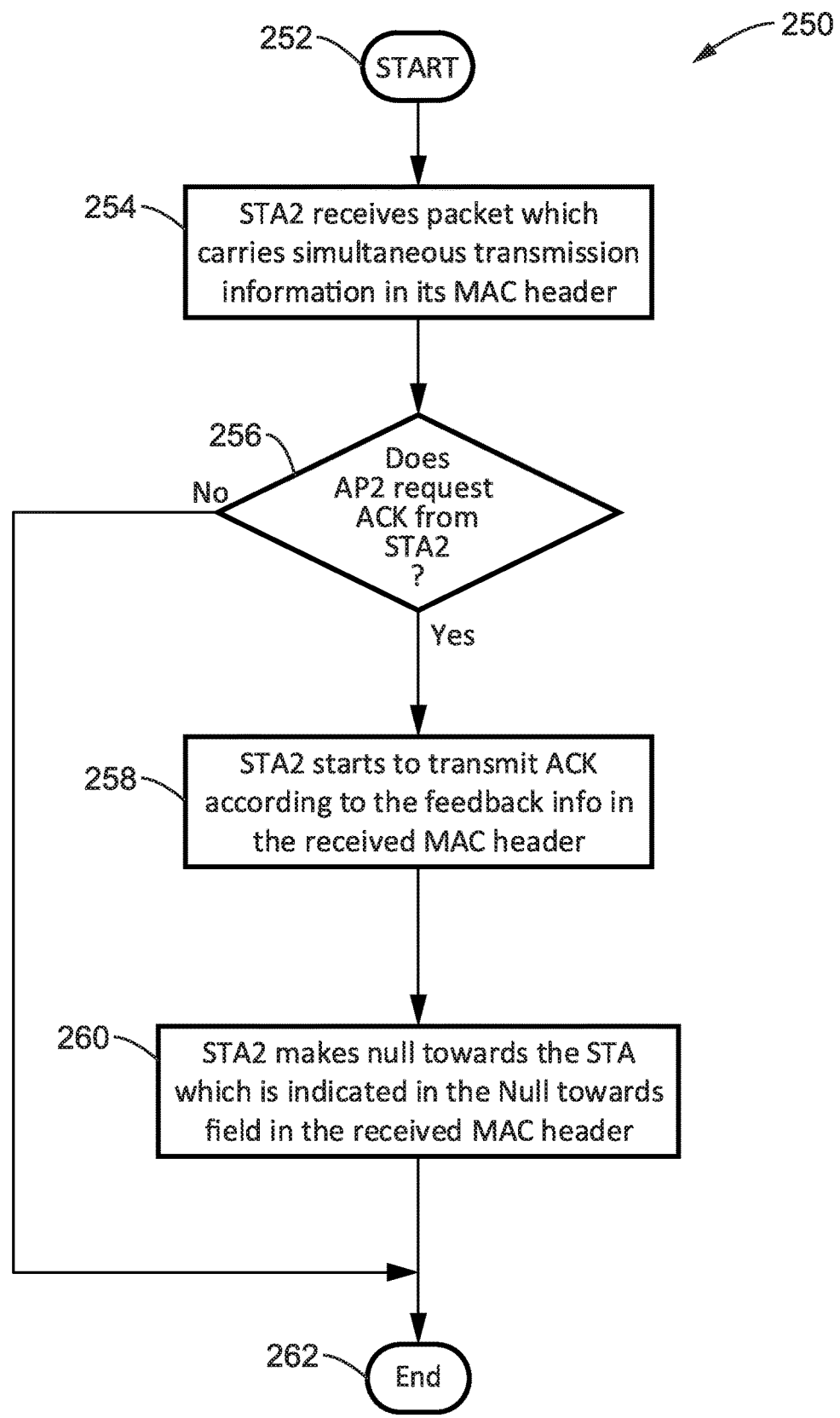
FIG. 16 is a flow diagram for a STA transmitting an ACK back to the second AP according to at least one embodiment of the present disclosure.

FIG. 16 illustrates an example embodiment 250 for STA2 sending an ACK back to AP2 during simultaneous transmission. The process starts 252 with STA2 receiving 254 a data packet from AP2. The data packet carries simultaneous transmission information in its MAC header.

Based on this information a check 256 determines if AP2 should request STA2 to send back an ACK. If an ACK is not to be requested, then the process ends 262, as STA2 does not need to do anything. If the data packet requests STA2 to send an ACK back, then at block 258 STA2 utilizes the information and starts transmitting an ACK according to the feedback information in the received MAC header. When STA2 transmits the ACK, it preferably makes a null 260 towards the STA indicated in the Null towards field in the received MAC header, before ending 262. The ACK in the flowchart can be replaced by a Block Acknowledgement (BA), in this example and the other examples in the present disclosure. This simultaneous transmission information can be passed between AP1 and AP2 or between AP2 and STA2 by setting it in the Feedback Information field of the MAC header (see FIG. 40).

4.3.3. Transmission Scheme 1

Figure 17:
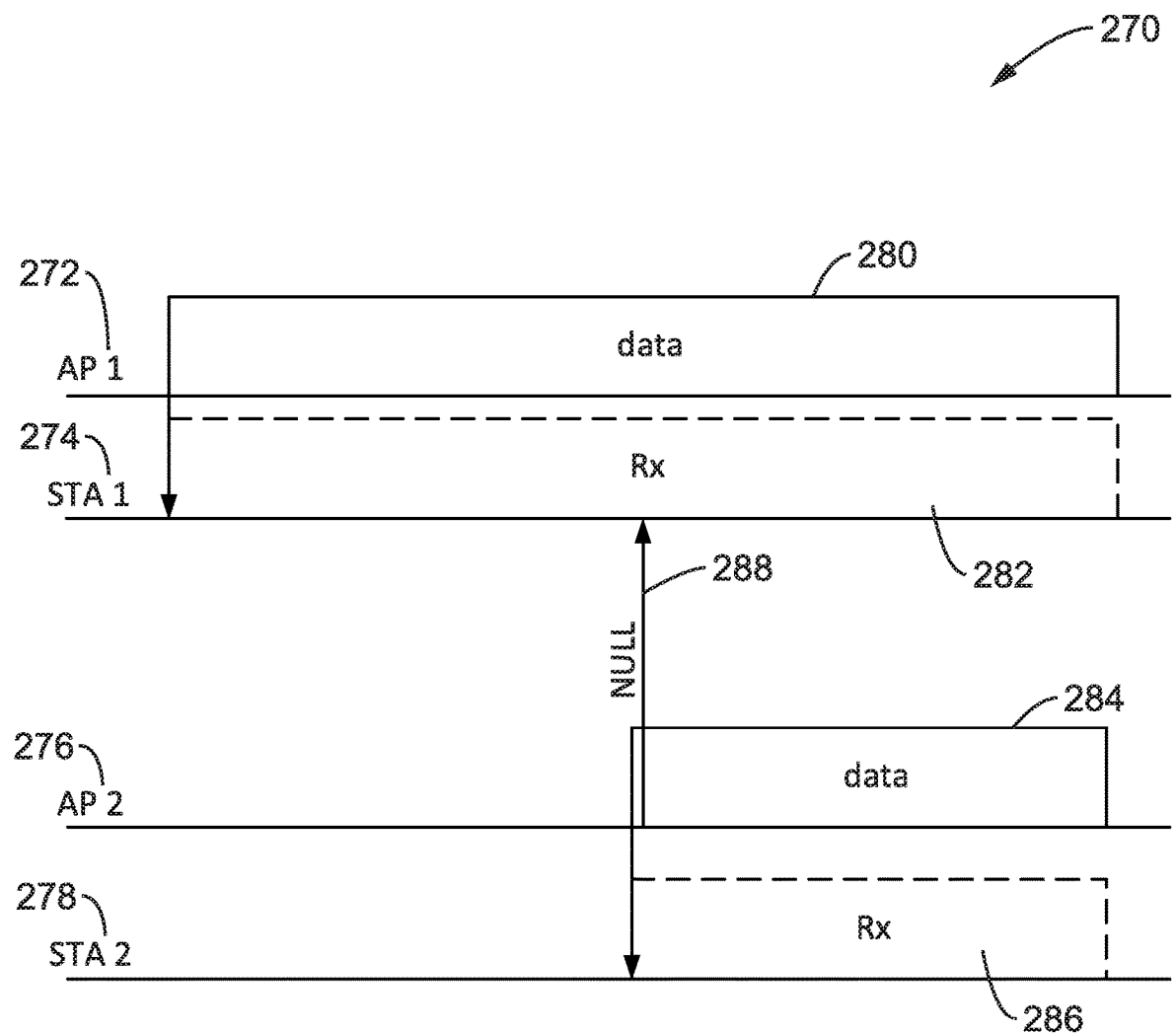
FIG. 17 is a timing diagram of a first simultaneous transmission scheme according to at least one embodiment of the present disclosure.

FIG. 17 illustrates an example embodiment 270 of a first transmission scheme for simultaneous transmission in a downlink Orthogonal Frequency Division Multiplexing (OFDM) scenario. The figure depicts interactions between AP1 272, STA1 274, AP2 276, and STA2 278. AP1 starts data packet transmission 280 which is received 282 by STA 1. In the midst of that transmission, AP2 starts transmitting a packet 284 which is received 286 by STA2 with AP2 making a null 288 towards AP1. Here, let us assume that AP2 has a channel vector to make a null 288 towards STA1. AP2 should finish its transmission before or at the end of the packet transmission of AP1. AP2 may transmit this packet without an ACK.

Several examples are provided to explain the details of this simultaneous transmission in transmission scheme 1. The formats of the preamble used in those examples are explained in Section 4.3.6. The symbols shown in the examples represent the OFDM symbols with Guard Interval (GI) as defined in IEEE 802.11. For the sake of simplicity of illustration an example is considered with an OFDM symbol duration without GI to be 12.8 µs.

Figure 18:
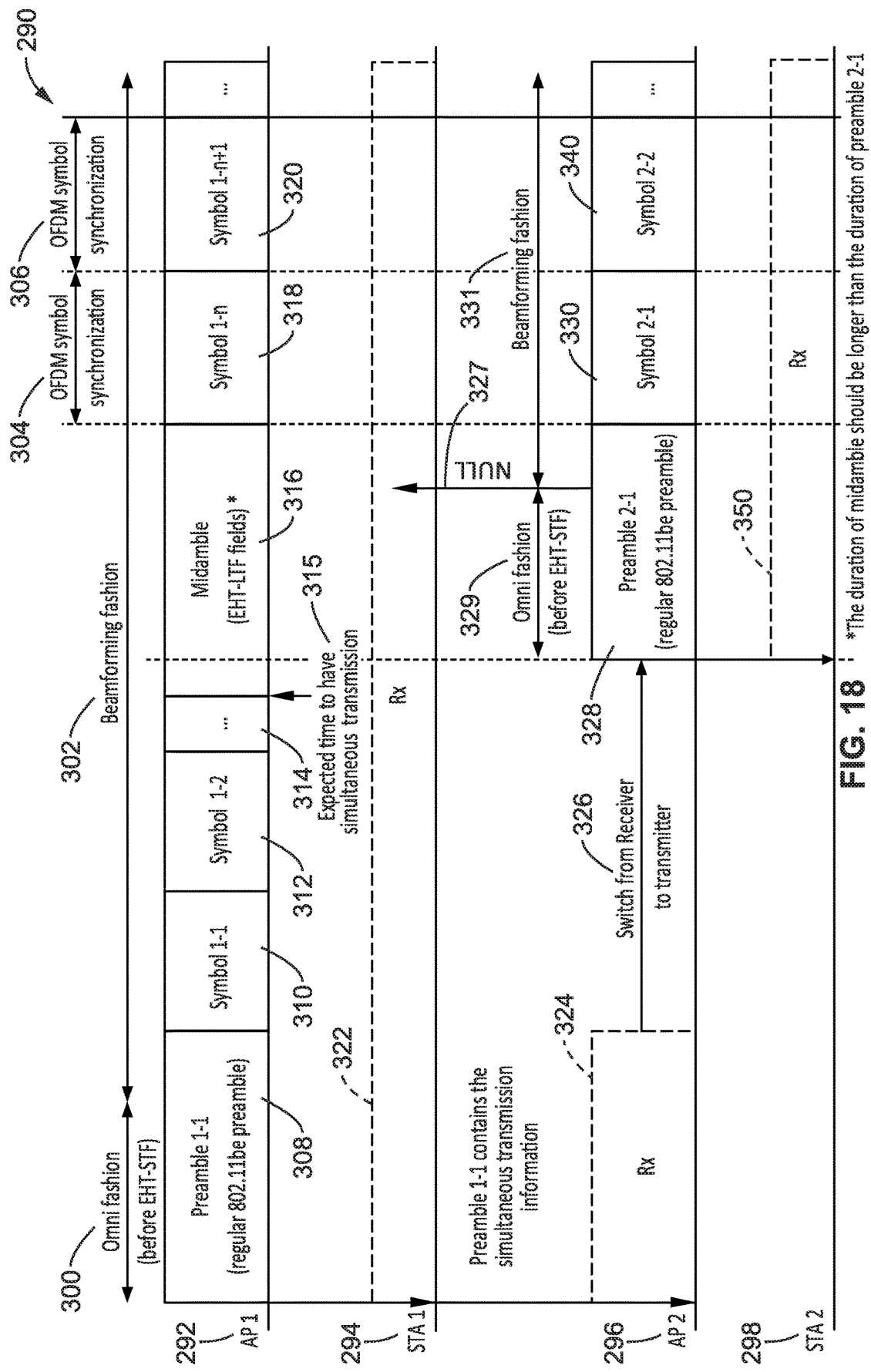
FIG. 18 is a signaling diagram showing a first example of using the first simultaneous transmission scheme according to at least one embodiment of the present disclosure.

FIG. 18 illustrates an example embodiment 290 of how the simultaneous transmission can be achieved in a transmission scheme 1 as shown in FIG. 17. The figure depicts interactions between AP1 292, STA1 294, AP2 296, and STA2 298. The symbol in the figure represents the OFDM symbol with guard interval (GI).

AP1 transmits its data packet with Preamble 1-1 308 for receipt 322 by STA1, while AP2 is seen switching from Rx mode 324 in an omni-directional manner to a transmission mode 326. The PLCP preamble part 308 before EHT-STF field is transmitted in an omni-directional manner 300. After that, the remainder of the packet can be transmitted in a beamforming manner 302. AP1 can use the regular PLCP preamble, such as Preamble 1-1, to carry the simultaneous transmission information as shown in FIG. 35 in the EHT-SIG field of the preamble as shown in FIG. 36. The format of preamble 1-1 can be as that shown in FIG. 6, whose duration is flexible. symbols are transmitted 310, 312 and so forth 314.

AP1 embeds a midamble field 316 in this data packet, which determines an expected time to have a simultaneous transmission 315. The midamble in at least one embodiment consists of several EHT-LTF fields. The duration of the midamble should be longer than the PLCP preamble 328 of AP2, depicted here as Preamble 2-1. The information of the start time of the midamble and the duration of the midamble can be set in the simultaneous transmission information of Preamble 1-1. It should be noted that the EHT-LTF fields in the midamble are not used for training the signal to mitigate the Doppler effect and are principally added to allow for simultaneous transmission. STA 1 should not use it for channel estimation.

AP1 sets the STx allowance indication field to "1" in the simultaneous transmission information of the preamble 1-1 to allow another AP to join the simultaneous transmission during its transmission time. It is possible that AP1 sets the Coord ID field to allow a specific AP, such as AP2 in this example, to join the simultaneous transmission. Other parameters of the simultaneous transmission information can be set by the EHT-SIG field of preamble 1-1 as explained in FIG. 35.

AP2 transmits preamble 2-1 328 in an omni-directional mode for receipt 350 by STA 2. AP2 receives the PLCP preamble from AP1 due to its omni-directional reception 329, and sets a null 327 toward AP1 before entering a beamforming mode 331. By decoding the simultaneous transmission information in preamble 1-1, AP2 has collected information on each of the following: (a) the GI and EHT-LTF type of AP1, wherein AP2 should use the same GI type of AP1; (b) which STA to make a NULL towards during simultaneous transmission; (c) the coordination duration of the simultaneous transmission and within which data packet of AP2 should it be transmitted; and (d) the start time and the duration of the midamble in the data packet of AP1.

AP2 joins the simultaneous transmission during the midamble period of AP1 and transmits a data packet to STA2. The PLCP preamble part before the EHT-STF field is transmitted in an omni-directional manner 329. After that, the remaining portion of the packet is transmitted in a beamforming manner 331. Meanwhile, AP2 makes a null 327 towards STA1. It should be noted that AP2 can use the regular preamble as shown in FIG. 6. The transmission of the preamble of AP2 should end at the same time as the end of the midamble of AP1.

AP2 then transmits the packet in terms of OFDM symbols, exemplified as symbols 2-1 330, and 2-2 340, and synchronizes 304, 306 its symbol boundary with AP1 symbols 1-n 318 and 1-n+1 320. It will be noted that AP2 uses the same GI of AP1 for its OFDM symbols. Since AP1 and AP2 use the same OFDM symbol, the duration of the OFDM symbol of AP1 and AP 2 is the same when they use the same GI.

In certain circumstances the midamble used in FIG. 18 is replaced by OFDM symbols without carrying data. The duration of those OFDM symbols should be longer than the PLCP preamble (i.e., Preamble 2-1) in the figure.

In certain circumstances the midamble seen in FIG. 18 is replaced by OFDM symbols that carry duplicated data. For example, the duration of the OFDM symbols could be the duplicated Symbols 1-1, 1-2, and so on. The duration of those OFDM symbols should be longer than the PLCP preamble, i.e., Preamble 2-1 in the figure.

It certain cases preamble 1-1 need not carry any simultaneous transmission information and AP2 starts the simultaneous transmission upon detecting the preamble from AP1, as based on prior agreement.

Figure 19:
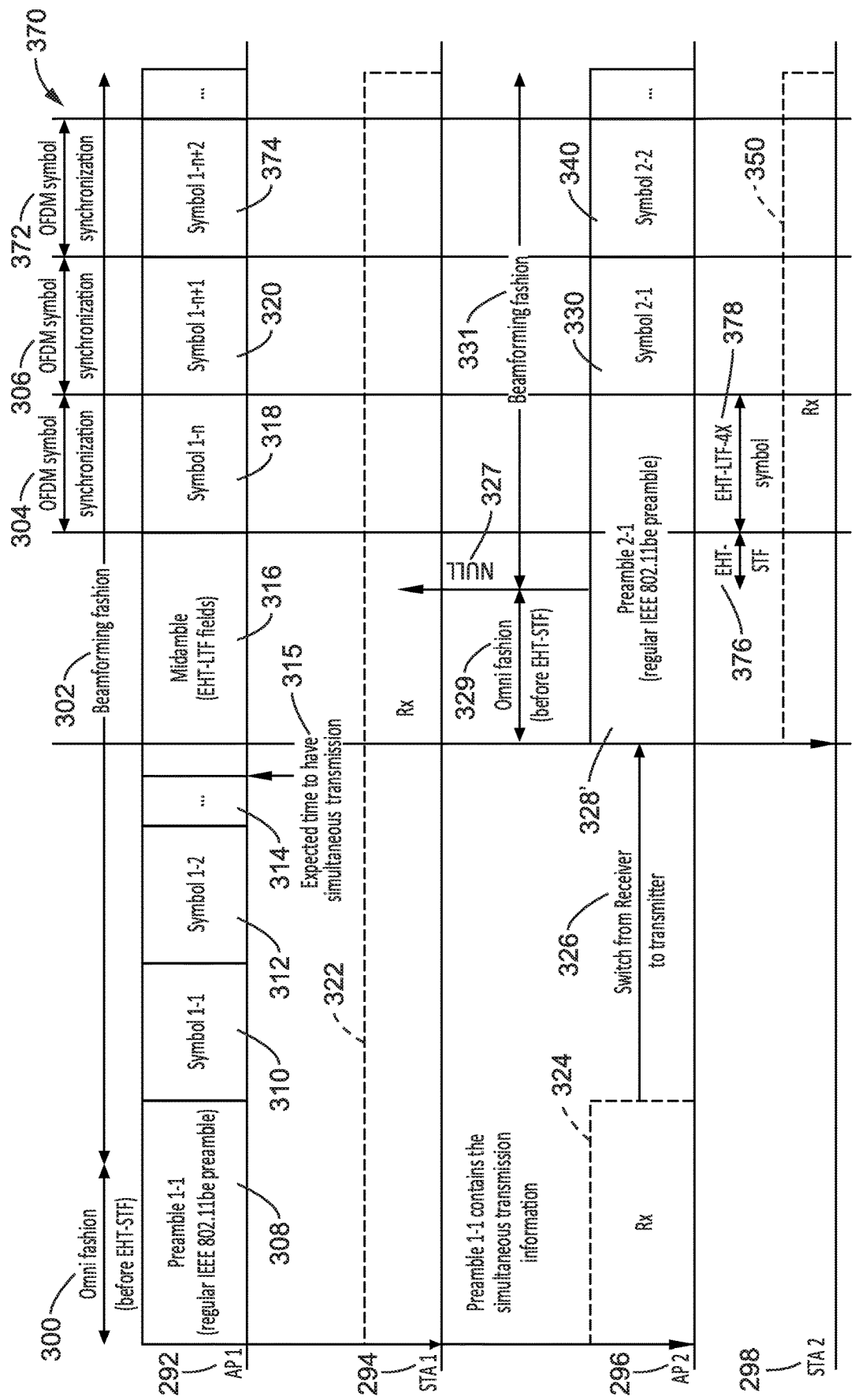
FIG. 19 is a signaling diagram showing a second example (example 2a) of using the first simultaneous transmission scheme according to at least one embodiment of the present disclosure.

FIG. 19 illustrates an example embodiment 370 as a second example (example 2a) demonstrating how simultaneous transmission can be achieved in the transmission scheme as shown in FIG. 17. The majority of elements in this figure are the same as in FIG. 18.

The symbol in the figure represents the OFDM symbol with guard interval (GI). In this example three OFDM synchronization periods are shown 304, 306, and 372, associated with AP1 Symbol 1-n 318, Symbol 1-n+1 320 and Symbol 1-+2n 374. AP2 however, only communicates two symbols as in FIG. 18 due to its longer preamble 328'. The EHT-LTF field represents the EHT long training field of the PLCP preamble defined in IEEE 802.11be protocol and the EHT-LTF-4× represents the full size of EHT-LTF field. The duration of one EHT-LTF-4× field (without GI) is the same as one OFDM symbol duration (without GI) in IEEE 802.11be, which is similar with the HE-LTF-4× defined in IEEE 802.11ax. Compared with the example shown in FIG. 18 the AP2 in this example uses EHT-LTF-4× field 378 in its PLCP preamble, i.e., Preamble 2-1, following EHT-STF 376.

AP1 transmits its data packet to STA1. During the midamble of AP1, AP2 starts transmitting its PLCP preamble part 328' to STA 2 before the EHT-STF field 376 is transmitted. Preamble 328' is seen transmitted in an omni-directional manner 329, with a null 327 preferably directed toward AP1 and/or STA1. After that, the remainder of the packet from AP2 is transmitted in a beamforming manner 331. This transmission from AP1 to STA1 is described in the following.

AP1 can use the regular IEEE 802.11be preamble as shown in FIG. 6 to carry the simultaneous transmission information FIG. 35 in the EHT-SIG field of the preamble.

AP1 can embed a midamble field 316 in its data packet. The midamble consists of several EHT-LTF fields. The information of the start time of the midamble and the type of midamble can be included in the simultaneous transmission information of Preamble 1-1 308. It should be appreciated that the EHT-LTF fields in the midamble are not utilized for training the signal to mitigate the Doppler effect and are mainly added to allow for simultaneous transmission. STA 1 should not use this EHT-LTF field for channel estimation.

AP1 sets the STx allowance indication field to "1" in the EHT-SIG field to allow another AP to join the simultaneous transmission during its transmission time. It is possible that AP1 sets the Coord ID field to allow a specific AP, e.g., AP2, to join the simultaneous transmission. Other parameters of the simultaneous transmission information can be set in the EHT-SIG field of preamble 1-1 as explained in FIG. 35.

AP2 receives 315 Preamble 1-1 from AP1 due to its omni-directional transmission. By decoding the simultaneous transmission information in the preamble, AP2 has collected information on: (a) the GI and EHT-LTF type of AP1. AP2 then makes decisions in this case to use the same GI type as AP1; (b) it determines which STA to make a null towards during simultaneous transmission so as not to interfere with that STA; (c) it determines the coordination duration of the simultaneous transmission, wherein the data packet of AP2 should be transmitted within the coordination duration; and (d) it determines the start time and the duration of the midamble in the data packet of AP1.

In this case AP2 joins the simultaneous transmission during the midamble period 316 of AP1. AP2 transmits a data packet to STA2. The PLCP preamble part before EHT-STF field 376 is transmitted in an omni-directional manner 329. After that, the remainder of the packet is transmitted in a beamforming manner 331. Meanwhile, AP2 makes a null 327 towards STA1.

(a) AP2 can use the regular preamble as shown in FIG. 6 without carrying any simultaneous transmission information. (b) The end time of the EHT-STF field should be the same as the end time of the midamble of AP1. (c) AP2 uses the EHT-LTF-4× field to synchronize the OFDM symbol boundary of AP1. When the GI of EHT-LTF-4× field is the same as the GI of the OFDM symbol of AP1, the duration of EHT-LTF-4× field of AP2 is the same as the OFDM symbol of AP1. For example, as shown in the figure, the duration of EHT-LTF-4× field of AP2 is the same as Symbol 1-n 318 of AP1. (d) In other scenarios AP2 can use more or less repetition of the LTF to guarantee that the start of the next OFDM symbol is synchronized with AP1 OFDM symbol AP2 then transmits the packet in terms of OFDM symbols by synchronizing its symbol boundary with AP1's. It will be noted that AP2 uses the same GI of AP1 for its OFDM symbols. Since AP1 and AP2 uses the same OFDM symbol, the duration of the OFDM symbol of AP1 and AP2 is the same when they use the same GI.

It is possible that preamble 1-1 does not carry any simultaneous transmission information and based on a prior agreement AP2 starts the simultaneous transmission upon detecting the preamble from AP1.

Figure 20A:
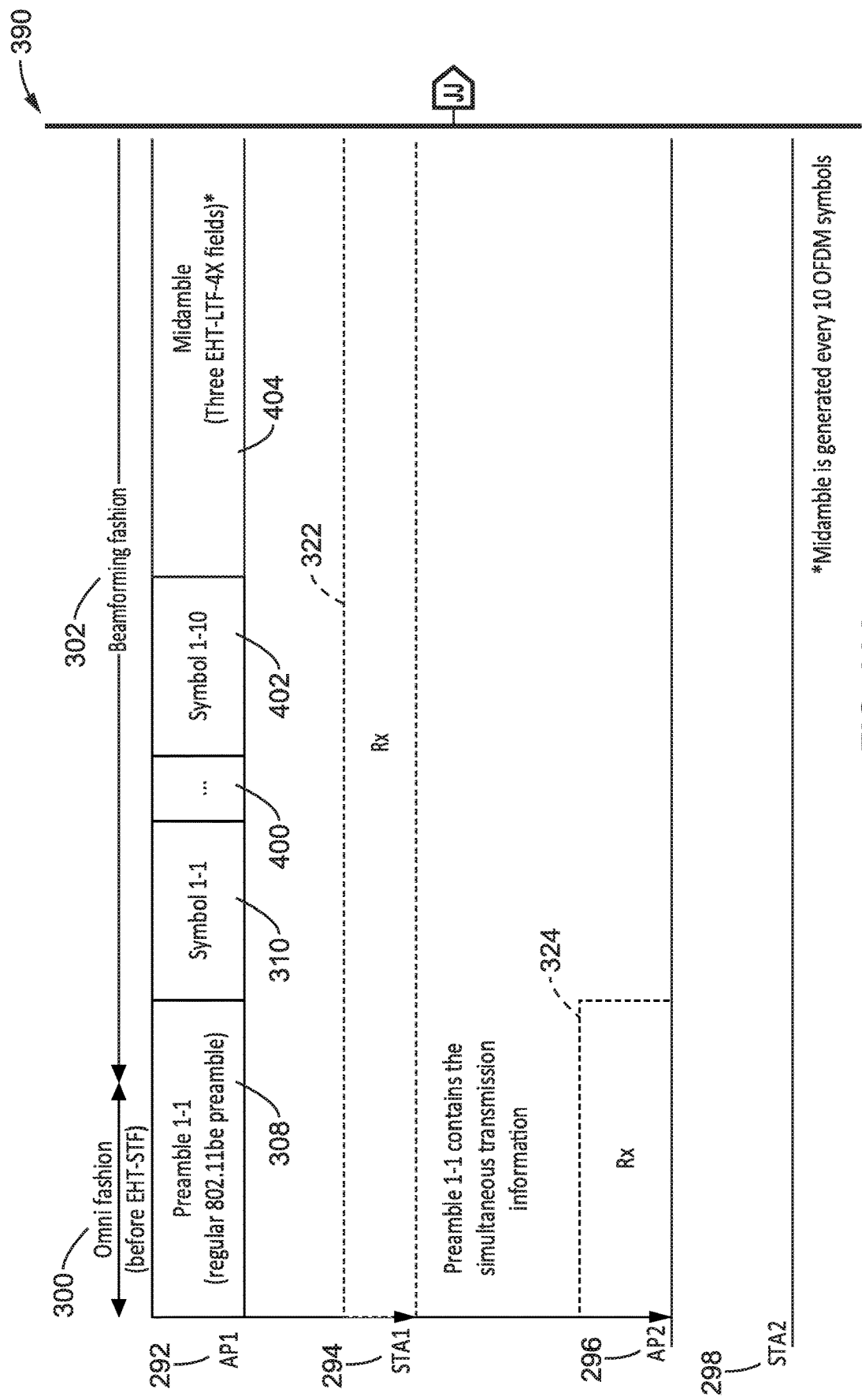
FIG. 20A through FIG. 20C are a signaling diagram of an alternative (example 2b) to the second example of using the first simultaneous transmission scheme according to at least one embodiment of the present disclosure.
Figure 20B:
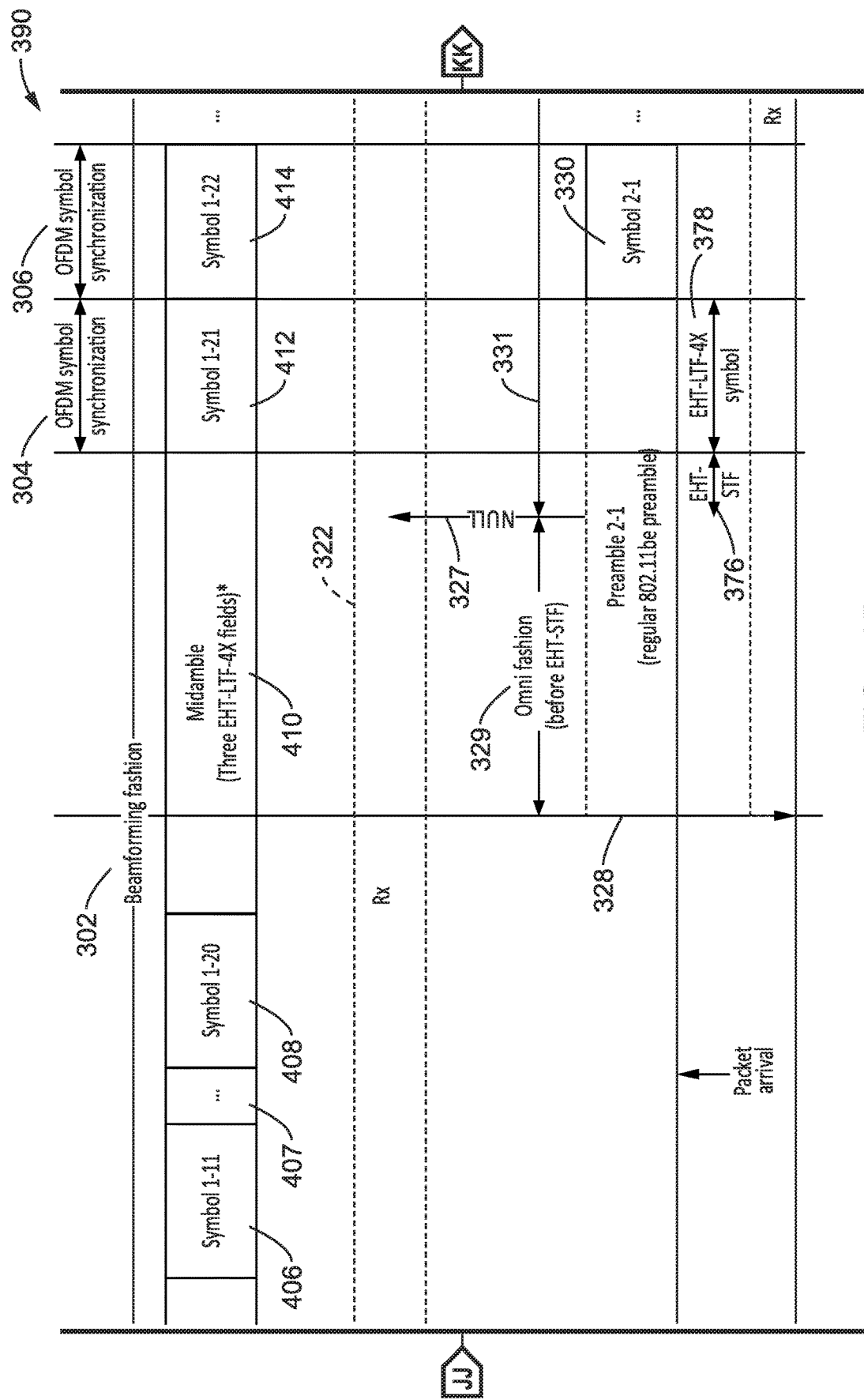
Figure 20C:
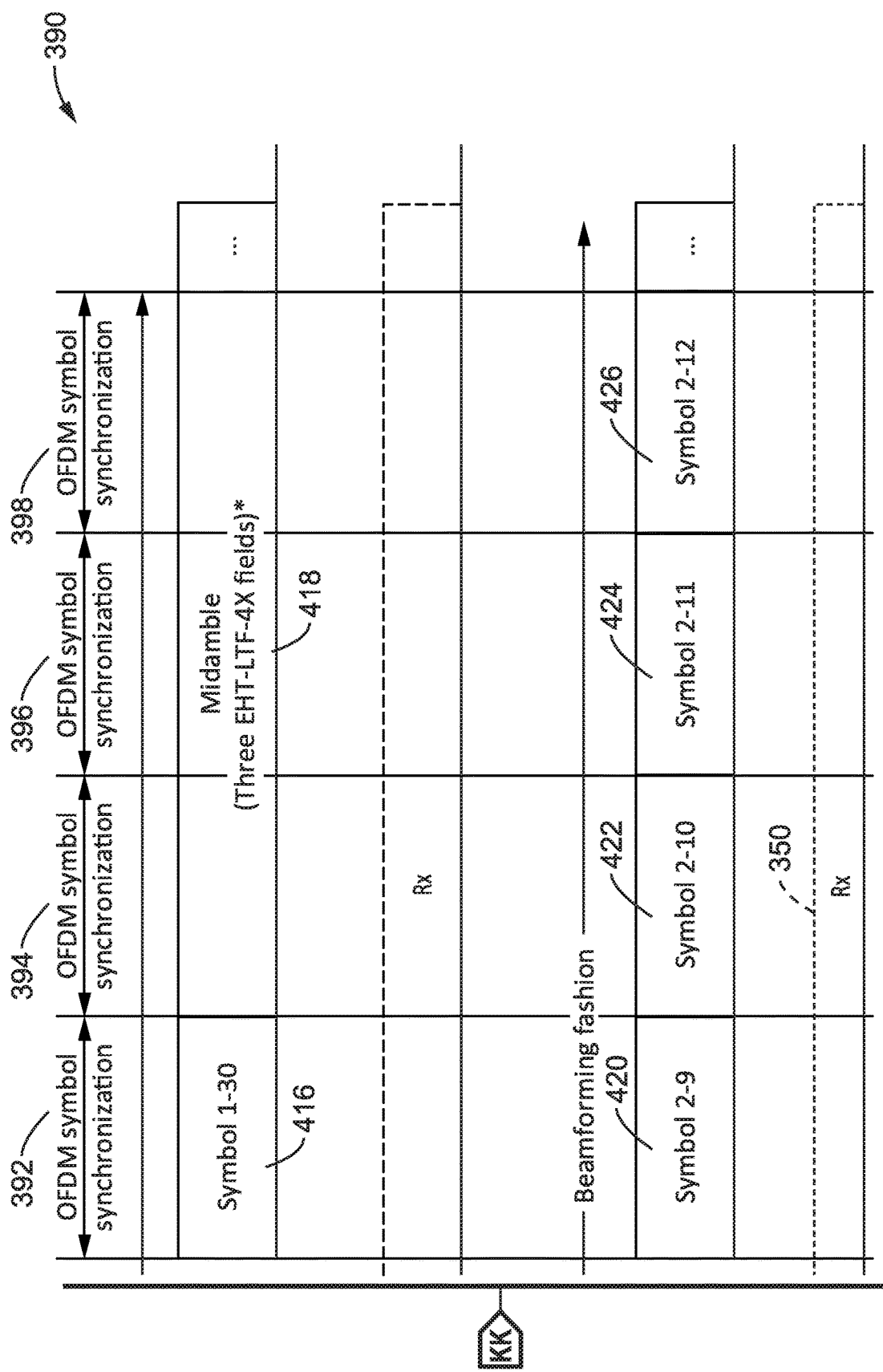

FIG. 20A through FIG. 20C illustrate another example embodiment 390 (example 2b) of an AP1 embedding a midamble periodically in its packet transmissions. The bulk of this figure contains the same elements as seen in prior FIG. 18 and FIG. 19. AP1 embeds midamble fields 404 every 10 OFDM, from Symbol 1-1 310 through additional symbols 400 to Symbol 1-10 402 in its packet transmissions. In FIG. 20B another group of symbols are seen 406 through 407 and to Symbol 1-20 408 and another midamble 410, which is followed by another set of symbols Symbol 1-21 412, Symbol 1-22 414 through to Symbol 1-30 416 preceding midamble 418. This figure also depicts additional OFDM symbol periods as exemplified by 392, 394, 396 and 398 in the figure.

AP2 can pick one midamble period to join the simultaneous transmission and start transmitting as was shown in FIG. 19. It will be seen in the figure that AP2 sends Symbols 2-1 330, through to Symbol 2-9 420, Symbol 2-10 422, Symbol 2-11 424, Symbol 2-12 426, and so forth.

Returning to the start of the figure, AP1 transmits its packet to STA1. The PLCP preamble part before the EHT-STF field is transmitted in omni-directional manner, after which the remainder of the packet is transmitted in a beamforming manner.

AP1 can use the regular IEEE 802.11be preamble as shown in FIG. 6 to carry the simultaneous transmission information FIG. 35 in the EHT-SIG field of the preamble.

AP1 can embed multiple midamble fields in this packet. The midamble consists of several EHT-LTF-4× fields. The information of the start time, the duration, and the periodic time of the midamble can be set in the simultaneous transmission information. It should be noted that the EHT-LTF fields in the midamble are not used for training the signal to mitigate the Doppler effect.

AP1 sets the STx allowance indication field to "1" in the EHT-SIG field to allow another AP to join the simultaneous transmission. It is possible that AP1 sets the Coord ID field to allow a specific AP, e.g., AP2, to join the simultaneous transmission.

AP2 receives the preamble from AP1 due to its omni-directional transmission. By decoding the simultaneous transmission information in the preamble, AP2 obtains information and makes decisions on the following: (a) AP2 determines the GI and EHT-LTF type of AP1, and in this case AP2 decides to use the same GI type of AP1; (b) AP2 determines which STA to make a null towards during simultaneous transmission; (c) AP2 determines a coordination duration of the simultaneous transmission, wherein the data packet of AP2 should be transmitted within the coordination duration; and (d) AP2 determines the start time, duration, and the periodic timing of a midamble in the data packet of AP1, and can set its timing accordingly.

When the data packet arrives at AP2, AP2 can join the simultaneous transmission during the upcoming midamble period of AP1. For example, the packet arrives at AP2 later than the end of the first midamble of AP1 but earlier than the beginning of the second midamble of AP1. AP2 starts transmitting a packet to STA2 during the second midamble of AP1. The PLCP preamble portion which occurs before EHT-STF field is transmitted in an omni-directional manner. After that, the remaining portion of the packet is transmitted in a beamforming manner; meanwhile, AP2 makes a null towards STA1.

AP2 can transmit its data packet the same as shown in FIG. 19. AP1 and AP2 use the same GI for their OFDM symbols and EHT-LTF fields. The midamble of AP1 consists of EHT-LTF-4× fields. Then the duration of the midamble from AP1 is a multiple of OFDM symbol duration periods of AP2. The EHT-LTF-4× fields in the midamble of AP1 can be synchronized with the OFDM symbols of AP2 since they have the same duration. For example, as shown in FIG. 20A through FIG. 20C, if the midamble of AP1 consists of three EHT-LTF-4× fields, it is synchronized with three OFDM symbols of AP2, i.e., symbol 2-10, 2-11, 2-12. It will be noted that the number of the EHT-LTF-4× fields in the midamble can be varied without departing from the teachings of the present disclosure.

It some situations preamble 1-1 need not carry any simultaneous transmission information, with AP2 starting its simultaneous transmission upon detecting the preamble from AP1 based on a prior agreement.

Figure 37:
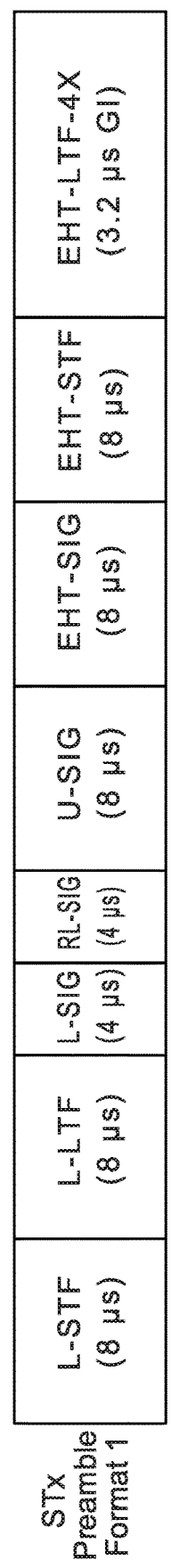
FIG. 37 is a data field diagram of a first STx preamble format according to at least one embodiment of the present disclosure.
Figure 38:
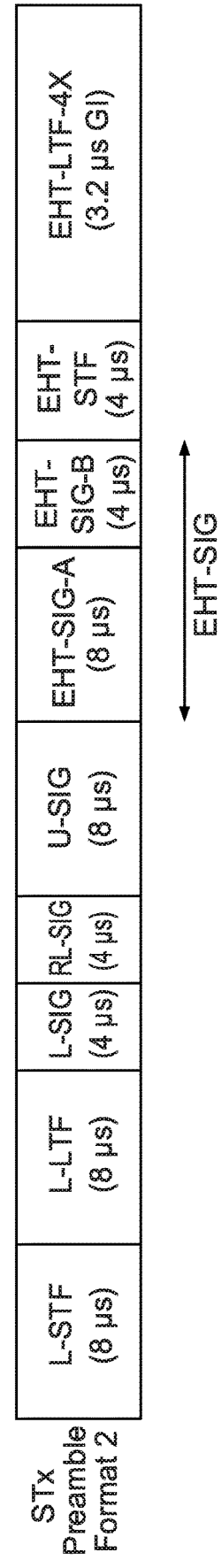
FIG. 38 is a data field diagram of a second STx preamble format according to at least one embodiment of the present disclosure.

The preamble used by AP2 in FIG. 19 can be replaced by STx preamble as shown in FIG. 37 or FIG. 38. The STx preamble has the same fields of a regular IEEE 802.11be preamble but the duration of each field is deterministic. The deterministic nature is seen by way of example in FIG. 27: the STx preamble format 1 has an 8 us L-STF field, an 8 us L-LTF field, a 4 us L-SIG field, a 4 us RL-SIG field, an 8 us U-SIG field, an 8 us EHT-SIG field, an 8 us EHT-STF field, and a 16 us EHT-LTF-4× field, thus the duration of each field is set (determined).

Figures 21A, 21B:
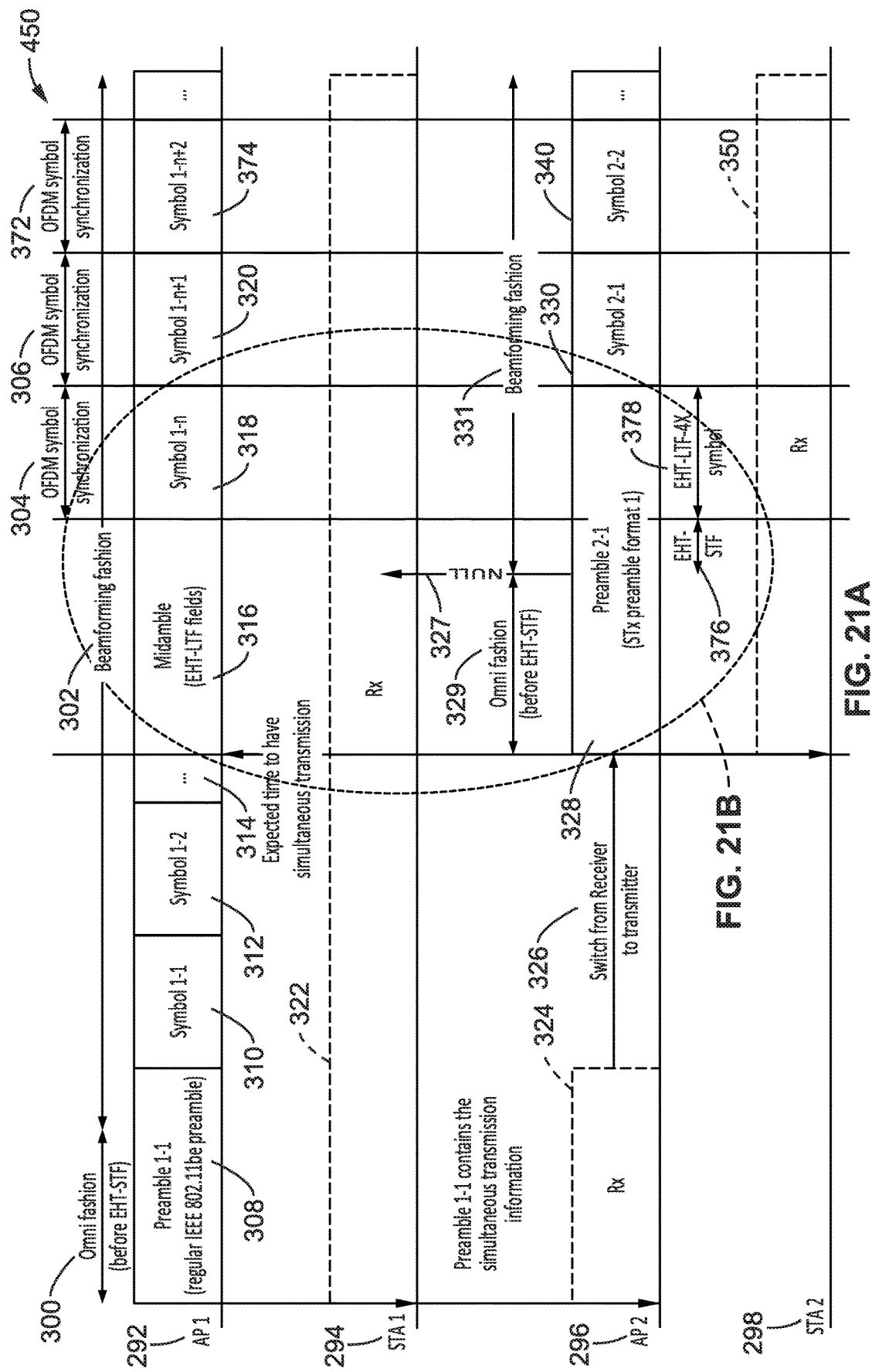
FIG. 21A and FIG. 21B are a signaling diagram of another alternative (example 2c) to the second example of using the first simultaneous transmission scheme according to at least one embodiment of the present disclosure.
Figure 21B:
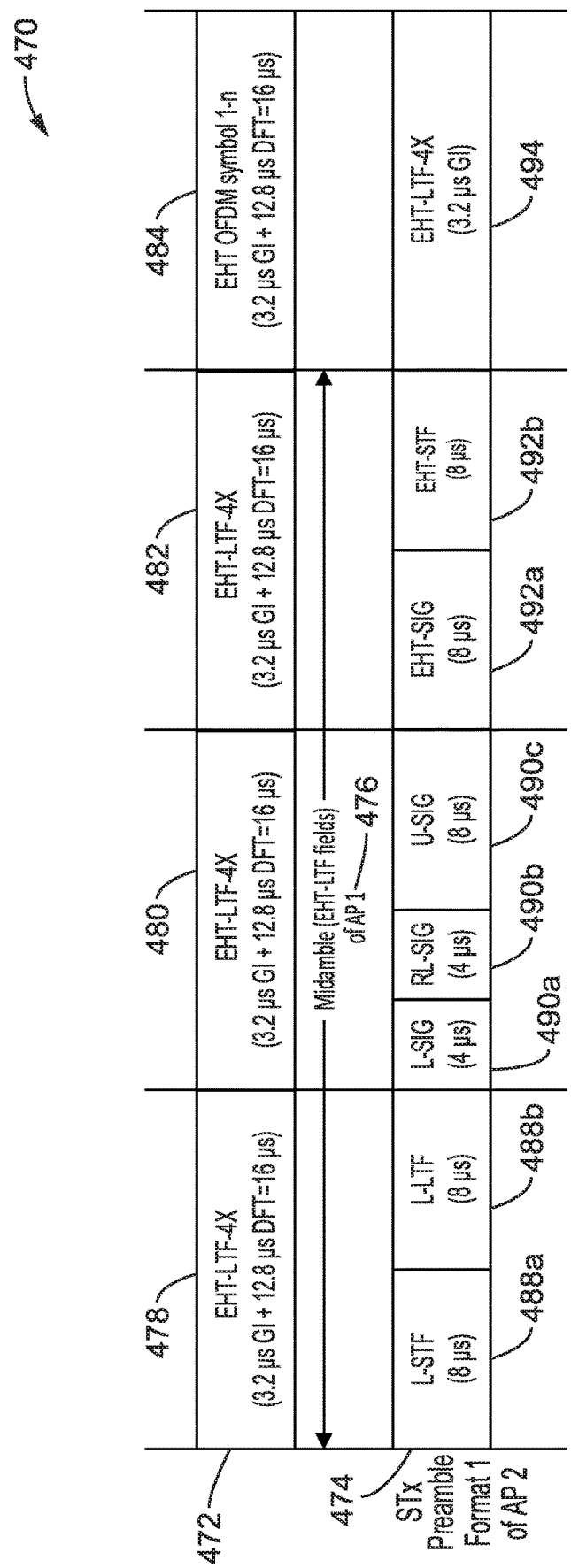

FIG. 21A through FIG. 21B illustrates an example embodiment 450, 470 (example 2c) in which AP2 uses STx preamble format 1 for its simultaneous transmission. FIG. 21A is like FIG. 19, with more detail being shown of its center portion in FIG. 21B. The details of an STx preamble format 1 is explained in FIG. 37.

The midamble 476 of AP1 as seen in FIG. 21B consists of multiple fields 472, having formats 474. The fields of the midamble are depicted in this example having three EHT-LTF-4× fields 478, 480 and 482. The duration of EHT-LTF-4× field with GI in the midamble is 16 μs. In particular, each EHT-LTF field in the midamble uses the combination of 12.8 μs EHT-LTF-4× symbol with 3.2 μs GI. As shown in the figure, the duration of three EHT-LTF of the midamble is equal to the part of Preamble 2-1 before EHT-LTF-4× field.

The first EHT-LTF-4× field in the midamble of AP1 478 has the same duration of L-STF (8 μs) 488a plus an L-LTF (8 μs) 488b in STx Preamble Format 1 of AP2. The fields are synchronized as shown in the figure. The second EHT-LTF-4× field in the midamble of AP1 480 has the same duration of L-SIG (4 μs) 490a plus RL-SIG (4 μs) 490b plus U-SIG (8 μs) 490c in the STx Preamble Format 1 of AP2. The fields are synchronized as shown in the figure. The third EHT-LTF-4× field in the midamble of AP1 482 has the same duration of EHT-SIG (8 μs) 492a plus an EHT-STF (8 μs) 492b in STx Preamble Format 1 of AP2. The fields are synchronized as shown in the figure.

An EHT-OFDM symbol interval 484 is seen (3.2 μs GI+12.8 μs DFT=16 μs) following the midamble fields, and it is exemplified using an EHT-LTF-4× format 494 (3.2 μs GI).

AP2 starts its packet transmission at the start time of the midamble of AP1 and the OFDM symbol boundaries are synchronized after that.

Figure 22A:
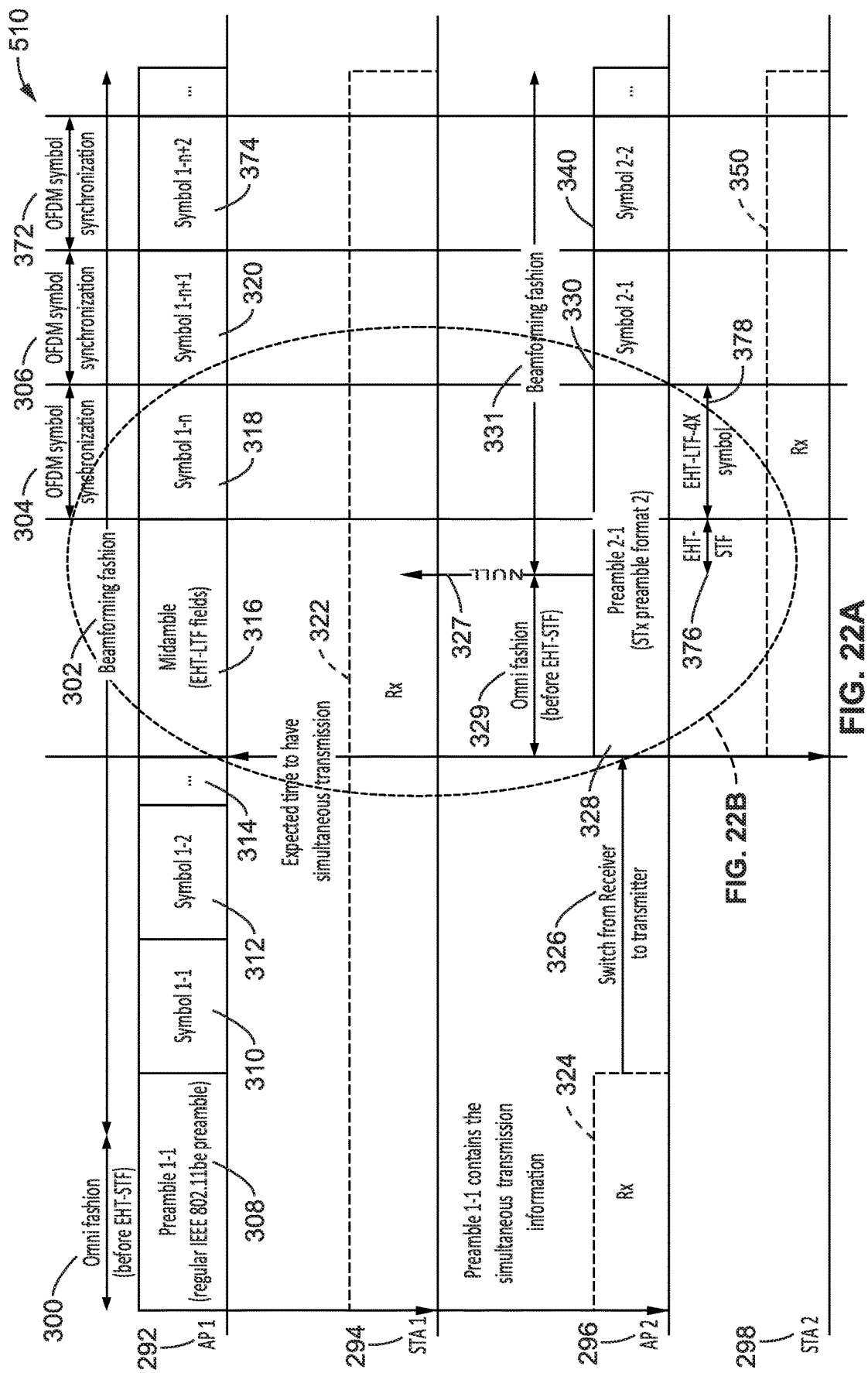
FIG. 22A and FIG. 22B are a signaling diagram of another alternative (example 2d) to the second example of using the first simultaneous transmission scheme according to at least one embodiment of the present disclosure.
Figure 22B:
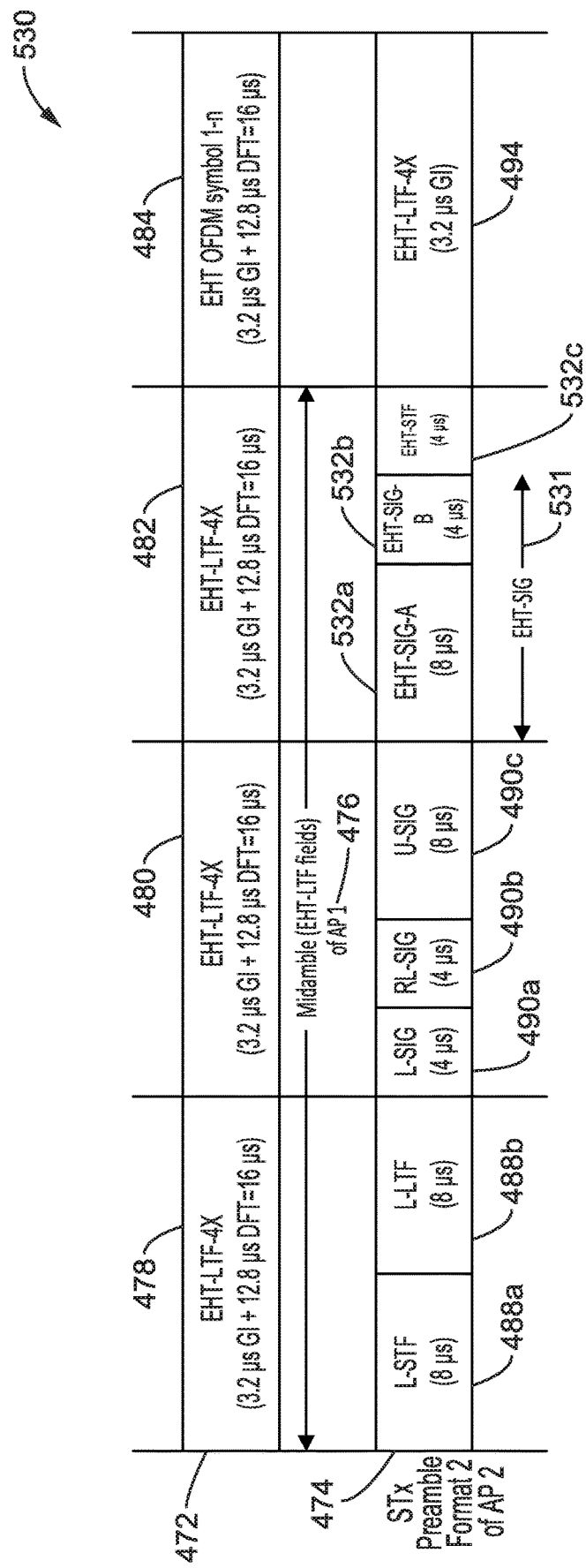

FIG. 22A and FIG. 22B illustrate another example embodiment 510, 530 for transmission scheme 1. Similar to the example shown in FIG. 21A and FIG. 21B, FIG. 22A and FIG. 22B show other options of the STx preamble format to let the midamble of AP1 have the same duration of the Preamble 2-1 part before its EHT-LTF-4× field.

The midamble 476 of AP1 as seen in FIG. 22B consists of multiple fields 472, having formats 474. The fields of the midamble are depicted in this example having three EHT-LTF-4× fields 478, 480 and 482. The duration of EHT-LTF-4× field with GI in the midamble is 16 μs. That is, each EHT-LTF field in the midamble uses the combination of 12.8 μs EHT-LTF-4× symbol with 3.2 μs GI. As shown in the figure, the duration of three EHT-LTF of the midamble is equal to the part of Preamble 2-1 before EHT-LTF-4× field.

The first EHT-LTF-4× field in the midamble of AP1 478 has the same duration of L-STF (8 μs) 488a plus an L-LTF (8 μs) 488b in STx Preamble Format 2 of AP2. The fields are synchronized as shown in the figure. The second EHT-LTF-4× field in the midamble of AP1 480 has the same duration of L-SIG (4 μs) 490a plus RL-SIG (4 μs) 490b plus U-SIG (8 μs) 490c in STx Preamble Format 2 of AP2. The fields are synchronized as shown in the figure. The third EHT-LTF-4× field in the midamble of AP1 482 has the same duration of an EHT-SIG 531, comprising an EHT-SIG-A (8 μs) 532a and an EHT-SIG-B (4 μs) 532b, plus a short EHT-STF (4 μs) 532c in STx Preamble Format 2 of AP2. The fields are synchronized as shown in the figure. It will be noted that the STx preamble formats shown in FIG. 22A and FIG. 22B are explained in FIG. 38.

FIG. 23A and FIG. 23B illustrate another example embodiment 550, 570 (example 2d) for transmission scheme 1. The midamble 552 of AP1 has the same duration of the Preamble 2-1 portion prior to its EHT-LTF-4× field, it is also possible to let the midamble consist of EHT-LTF-4× fields and EHT-STF as shown in FIG. 23A and FIG. 23B. FIG. 23A is like FIG. 22A, with more detail being shown of its midamble portion in FIG. 23B.

Figure 39:
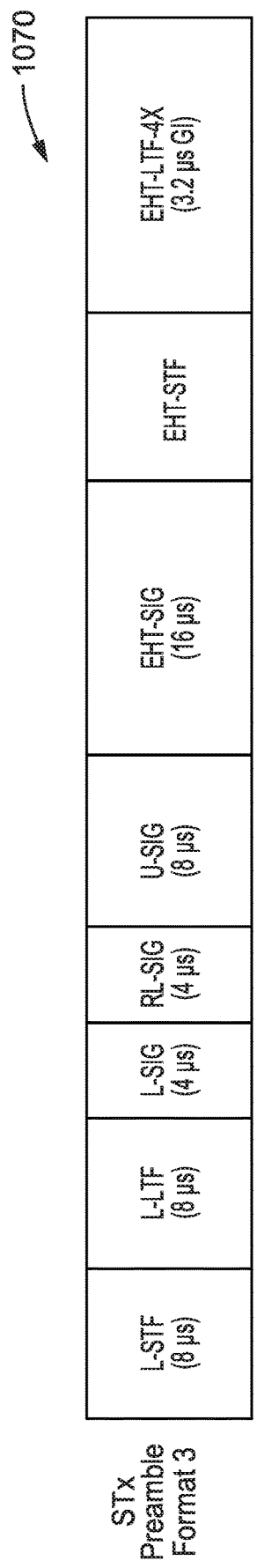
FIG. 39 is a data field diagram of a third STx preamble format according to at least one embodiment of the present disclosure.

The STx preamble 328 of AP2, i.e., Preamble 2-1, uses the format as shown in FIG. 39. The duration of the three EHT-LTF-4× fields in the midamble is the same as the duration of the fields between L-STF and EHT-SIG in Preamble 2-1. The EHT-STF fields are the same in the midamble and Preamble 2-1. Then, EHT OFDM symbol 1-n 318 can synchronize with EHT-LTF-4× symbol 378 of Preamble 2-1.

The first EHT-LTF-4× field in the midamble of AP1 478 has the same duration of L-STF (8 μs) 488a plus an L-LTF (8 μs) 488b in STx Preamble Format 3 of AP2. The fields are synchronized as shown in the figure. The second EHT-LTF-4× field in the midamble of AP1 480 has the same duration of L-SIG (4 μs) 490a plus RL-SIG (4 μs) 490b plus U-SIG (8 μs) 490c in STx Preamble Format 3 of AP2. The fields are synchronized as shown in the figure. The third EHT-LTF-4× field in the midamble of AP1 482 has the same duration of an EHT-SIG 574 (16 μs) in STx Preamble Format 3 of AP2. The third EHT-LTF-4× field in the midamble of AP1 is shown followed by an additional EHT-STF field 572, which is synchronized with the EHT-STF format 576 of STx Preamble Format 3 of AP2.

It should be appreciated that the EHT-STF in the above three examples can be replaced by other types of signal training field according to the definition of a regular IEEE 802.11be preamble. In addition the EHT-STF field can be replaced by other field types.

It should also be noted that the EHT-LTF fields in the midamble in the above three examples are not used for training the signal to mitigate the Doppler effect and are mainly added to allow simultaneous transmission. STA 1 should not the EHT-LTF training fields for use in channel estimation.

In the above three examples, it should be realized that preamble 1-1 does not need to carry any simultaneous transmission information, while based on the prior agreement AP2 can start a simultaneous transmission upon detecting the preamble from AP1.

It should be appreciated that all previously mentioned examples are provided as examples where the objective is to make the preamble fit to multiple OFDM symbols, any preamble design that includes combinations of fields which take into account that the total size of the preamble is a multiple of the size of OFDM symbol are also covered by the present disclosure.

Figure 24:
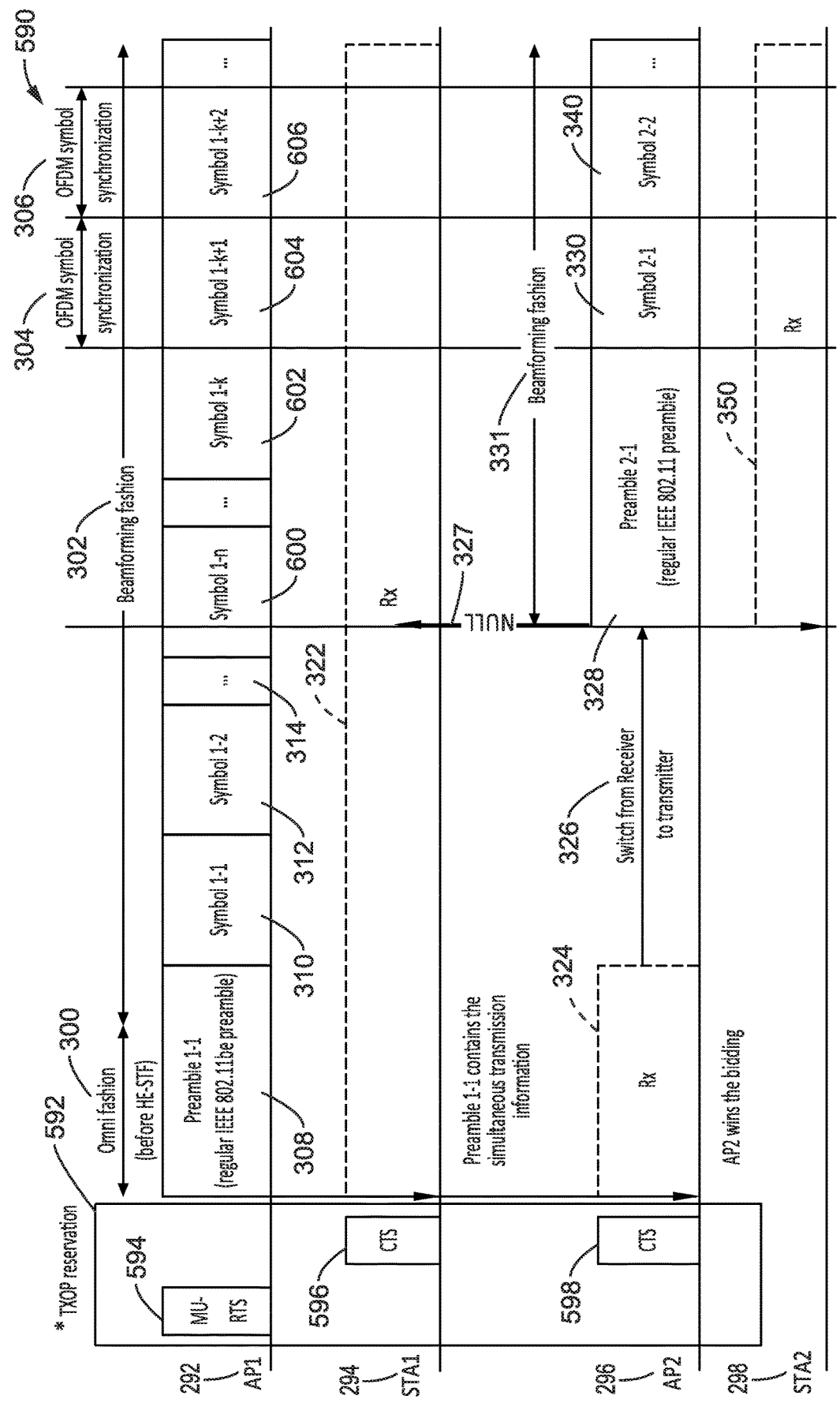
FIG. 24 is a signaling diagram showing a third example of using the first simultaneous transmission scheme according to at least one embodiment of the present disclosure.

FIG. 24 illustrates an example embodiment 590 showing how the simultaneous transmission can be achieved in the transmission scheme shown in FIG. 17 when the preamble of AP2, i.e., Preamble 2-1, is precoded. Stated another way, AP2 transmits Preamble 2-1 in a beamforming manner and makes a null towards STA1 from the beginning of its Preamble 2-1 328. The figure is very similar to FIG. 23A, but it will be seen there is no midamble, and the symbols transmitted from AP1 commence just prior to AP2 setting a null 327 and starting its preamble 2-1 328.

When AP1 starts a simultaneous transmission, it performs a reservation, seen here as a TXOP reservation 592. AP1 sends an MU-RTS frame 594 to its receiver and another AP, i.e., AP2. Then, STA1 sends CTS 596 back to AP1 to indicate it is ready to receive the packet and AP2 sends CTS 598 back to indicate it is ready to join the simultaneous transmission. The TXOP is thus reserved by the MU-RTS/CTS exchange. The format of the MU-RTS/CTS frame can be the same as in IEEE 802.11ax.

Then, AP1 can use the regular IEEE 802.11be preamble as shown in FIG. 6 to carry the simultaneous transmission information in the EHT-SIG field of the preamble as shown in FIG. 36. In the simultaneous transmission information of Preamble 1-1 308, the STx allowance indication field can be set to "1" to indicate the allowance of the simultaneous transmission. Since there is no midamble embedded in the data packet of AP1, the start time and the periodic time of the midamble are set to "0" in midamble information field.

It should be noted that if AP1 didn't receive CTS from AP2 or STA1, then the TXOP reservation fails, and AP1 will have to retransmit the MU-RTS frame.

AP1 is seen sending symbols from Symbol 1-2 312 through 314 Symbol 1-*n* 600 on through to Symbol 1-*k* 602, Symbol 1-*k*+1 604 and Symbol 1-*k*+2 606.

AP2 receives the simultaneous transmission information from Preamble 1-1 and starts transmitting in the middle of an OFDM symbol of AP1. As shown in the figure, the preamble of AP2, i.e., Preamble 2-1, can use the format as shown in FIG. 6 and starts during the duration of Symbol 1-*n* 600. However, the end time of Preamble 2-1 has to be at the end time of an OFDM symbol of AP1. Here, the end time of Preamble 2-1 is at the end time of Symbol 1-*k* 602. Then, the OFDM symbols of AP2 330, 340 can synchronize with the OFDM symbols of AP1 shown as Symbol 1-*k*+1 604 and Symbol 1-*k*+2 606.

Figure 25A:
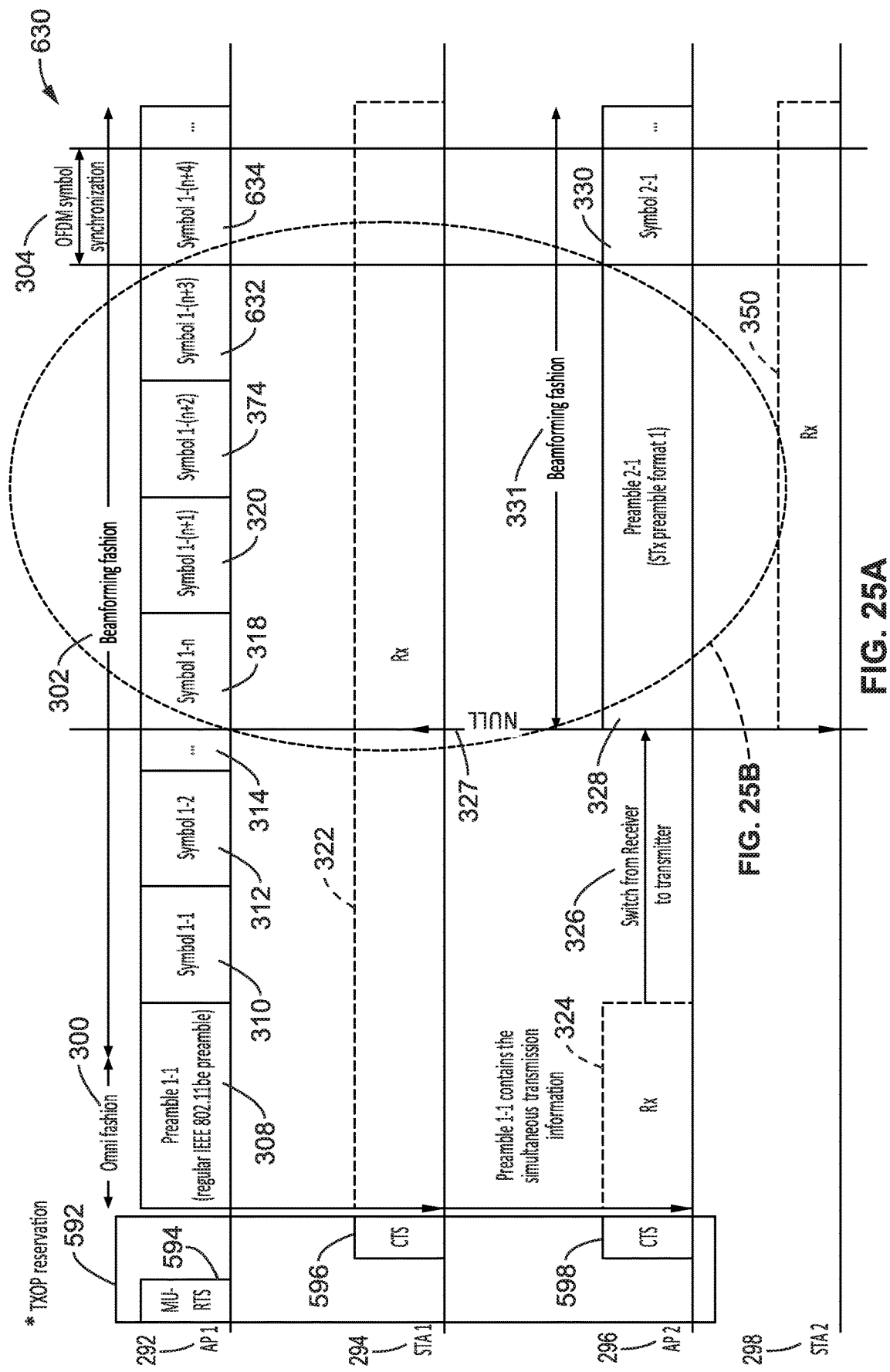

FIG. 25A and FIG. 25B illustrate an example embodiment 630, 670 demonstrating how the simultaneous transmission can be achieved in the transmission scheme as shown in FIG. 17 when the preamble of AP2, i.e., Preamble 2-1 328, is precoded. This is very similar to the example of FIG. 24, however, in the example of FIG. 25A and FIG. 25B an STx preamble format 1 is utilized instead of the regular IEEE 802.11 preamble for Preamble 2-1. It should be noted that the preamble format of AP2 can also be the one shown in FIG. 38.

As seen in FIG. 25B, the duration of the preamble of AP2 can be multiple 472 OFDM symbols exemplified as 672, 674, 676 and 678. By way of example and not limitation the formats 474 are depicted as being identical to those seen in FIG. 21B. The STx preamble used by AP2 is equal to the duration of four OFDM symbols. In FIG. 25A when AP2 starts transmitting at the beginning of one OFDM symbol, e.g., Symbol 1-*n* 318 in the figure, the OFDM symbol boundary of AP1 and AP2 will be synchronized. The symbols continue through Symbol 1-(*n*+2) 374 as in FIG. 23A then continue with Symbol 1-(*n*+3) 632, and in symbol synchronization interval 304 we see Symbol 1-(*n*+4) 634.

4.3.4. Transmission Scheme 2

FIG. 26 illustrates an example embodiment 690 of a second transmission scheme (transmission scheme 2) for simultaneous transmission in a downlink OFDM scenario when the ACK is considered (i.e., the length of the simultaneous transmission is considered to include the length of the ACK). The figure depicts interactions between AP1 272, STA1 274, AP2 276, and STA2 278. AP1 starts data packet transmission 280 to STA1, which is received 282 by STA 1. In the midst of that transmission, AP2 starts making a null 692 towards AP1 and transmitting a packet 694 for receipt 696 by STA2. Here, it is assumed that AP2 already has the channel vector to make the null towards STA1. AP2 finishes its transmission before the end of the packet transmission of AP1.

Then, STA2 transmits an ACK 700 back to AP2 before the end of the data transmission of AP1. When STA2 transmits the ACK, it also makes a null 698 towards STA1. Here again it is assume that STA2 already has the channel vector to make a null towards STA1. The transmission of the ACK from STA2 should be finished before the end of data packet transmission of AP1. After STA1 receives the packet from AP1 it sends ACK 702.

Several examples are provided to explain the details of the simultaneous transmission in transmission scheme 2. The formats of the preambles used in those examples are explained in Section 4.3.6. The symbols shown in the examples represent the OFDM symbol with guard interval (GI) as defined in IEEE 802.11ax. The OFDM symbol duration without GI is 12.8 μs in these examples.

Figure 27A:
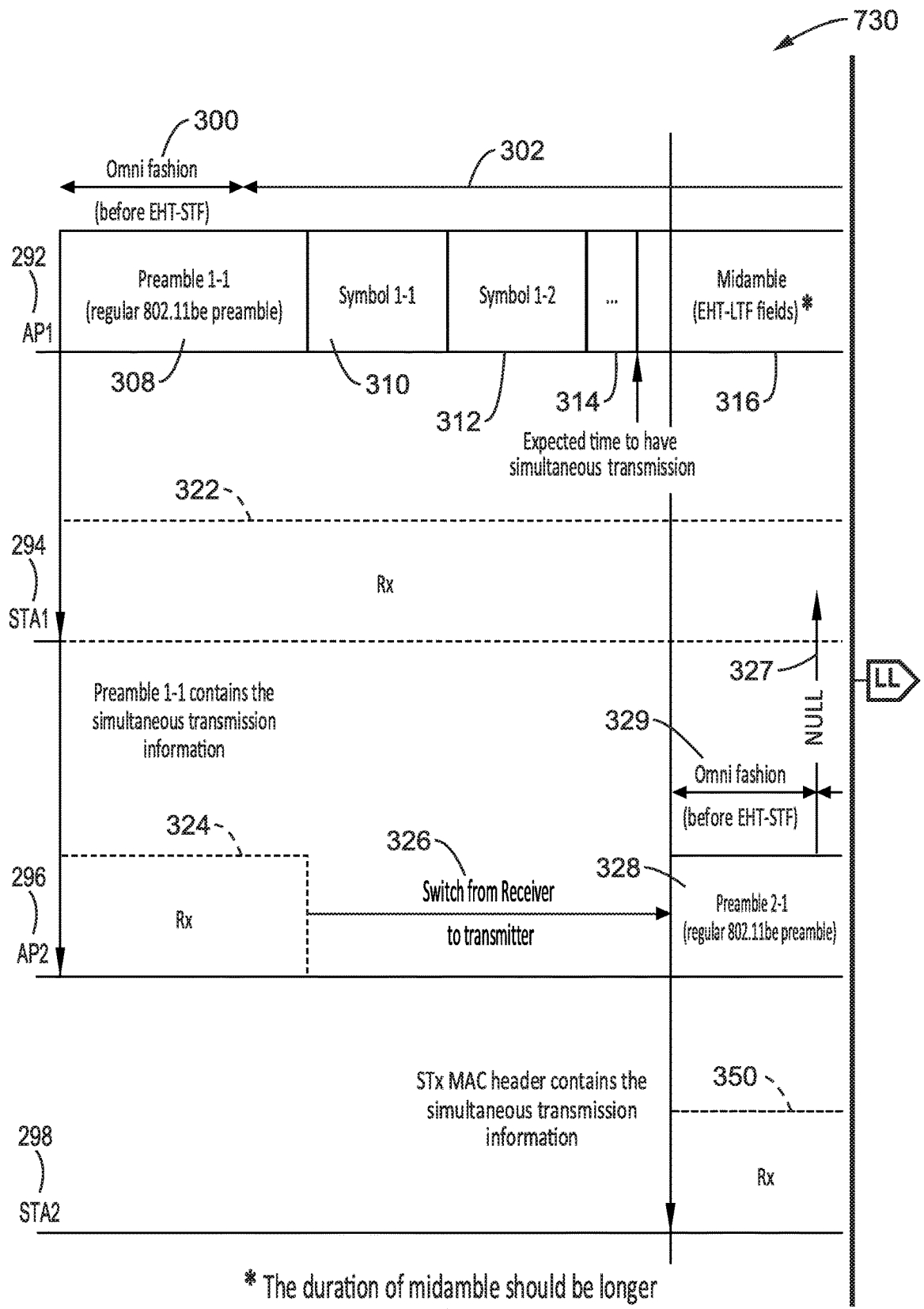
FIG. 27A through 27C are a signaling diagram showing a first example of using the second simultaneous transmission scheme according to at least one embodiment of the present disclosure.
Figure 27B:
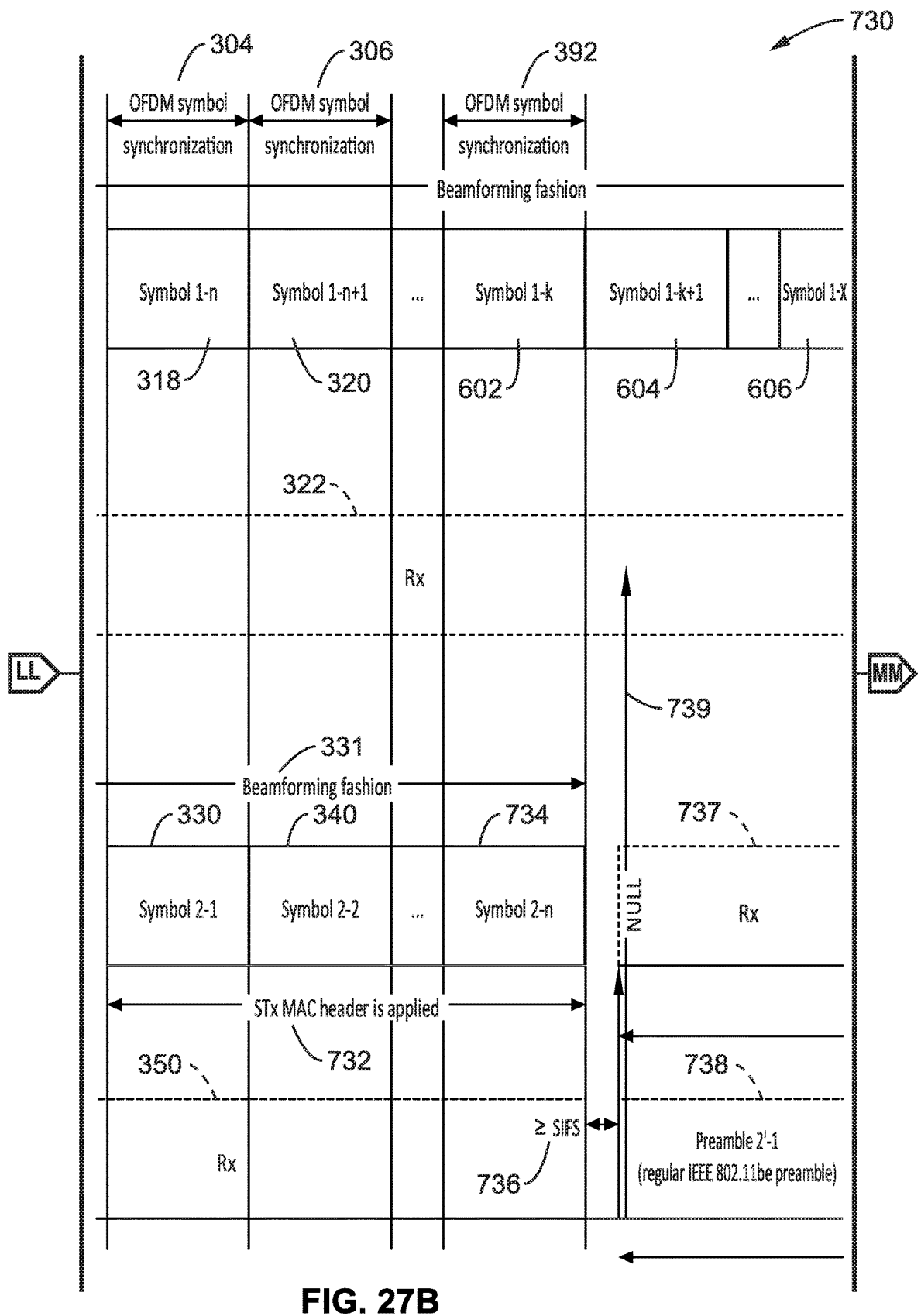
Figure 27C:
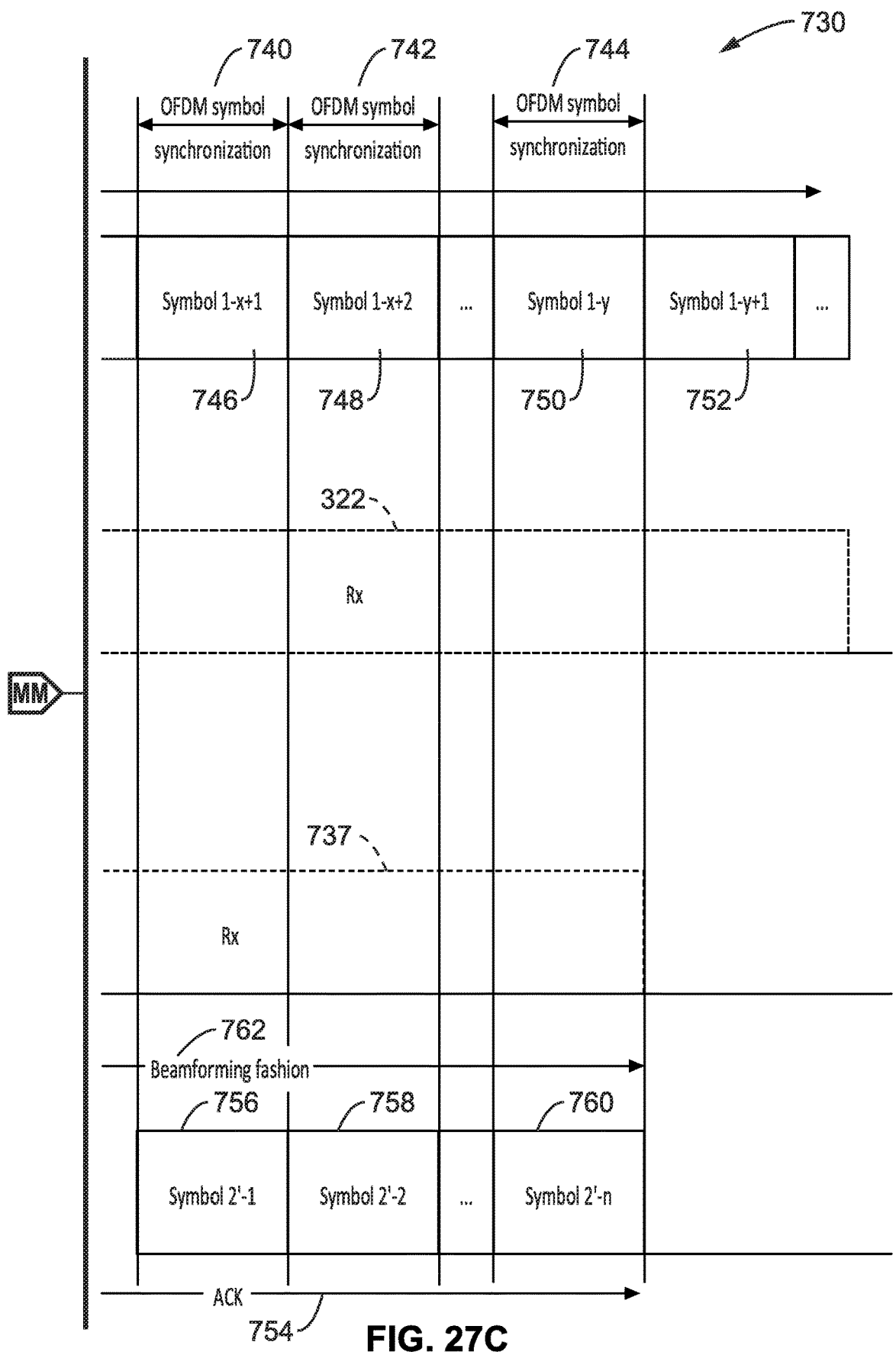

FIG. 27A through FIG. 27C illustrate an example embodiment 730 of how simultaneous transmission can be achieved in transmission scheme 2 as shown in FIG. 26. It will be noted that the bulk of elements shown in FIG. 27A through FIG. 27C were depicted in the previous figures.

AP1 starts transmitting and embeds one midamble field 316 in its data packet to allow AP2 to join the simultaneous transmission. The procedure of data packet transmission of AP2 can be the same as all the examples shown in Section 4.3.3. Here, AP2 joins the simultaneous transmission and finishes its data packet transmission as was shown in FIG. 18.

When AP2 transmits a data packet to STA2, it starts with preamble 2-1 328 and can embed the simultaneous transmission information in its MAC header 732. The format of the MAC header carrying the simultaneous transmission information is explained in FIG. 40.

STA2 receives the above simultaneous transmission information. Then, STA2 after receiving Symbol 2-*n* 734 waits at least SIFS time 736 to transmit the ACK 754, in a beamforming manner 762, back to AP2 which receives 737 the ACK. The purpose of the waiting time is to let the OFDM symbol boundary of AP1 and STA2 be synchronized. The ACK is seen starting with Preamble 2'-1 738. According to the simultaneous transmission information, no midamble can be utilized when sending the ACK.

As shown in the figure, STA2 uses a precoded Preamble 2'-1 738 for transmitting the ACK. It makes null 739 towards AP1 at the beginning of its precoded preamble. The Preamble 2'-1 738 ends at the same time of an OFDM symbol of AP1, depicted as Symbol 1-*x* 606. Then the OFDM symbol boundaries of AP1 and STA2 are synchronized. We see synchronized symbol intervals 740, 742, 744 to which AP1 is seen transmitting Symbol 1-*x*+1 746, Symbol 1-*x*+2

748 through to Symbol 1-$y$ 750 and Symbol 1-$y$+1 752, while AP2 is seen transmitting Symbol 2'-1 756, Symbol 2'-2 758 through to Symbol 2'-$n$ 760.

Figure 28A:
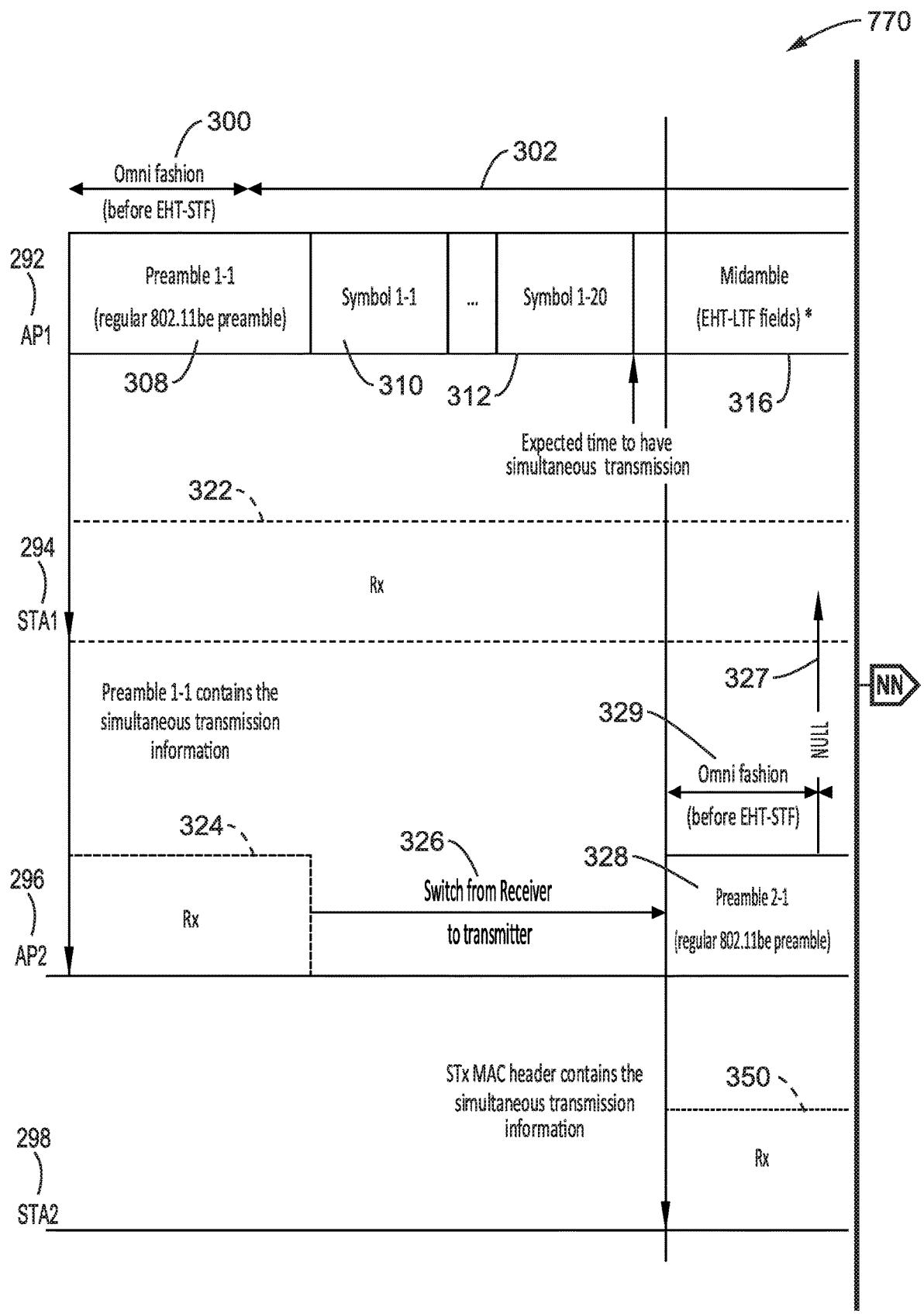
FIG. 28A through 28C are a signaling diagram of a second example of using the second simultaneous transmission scheme according to at least one embodiment of the present disclosure.
Figure 28B:
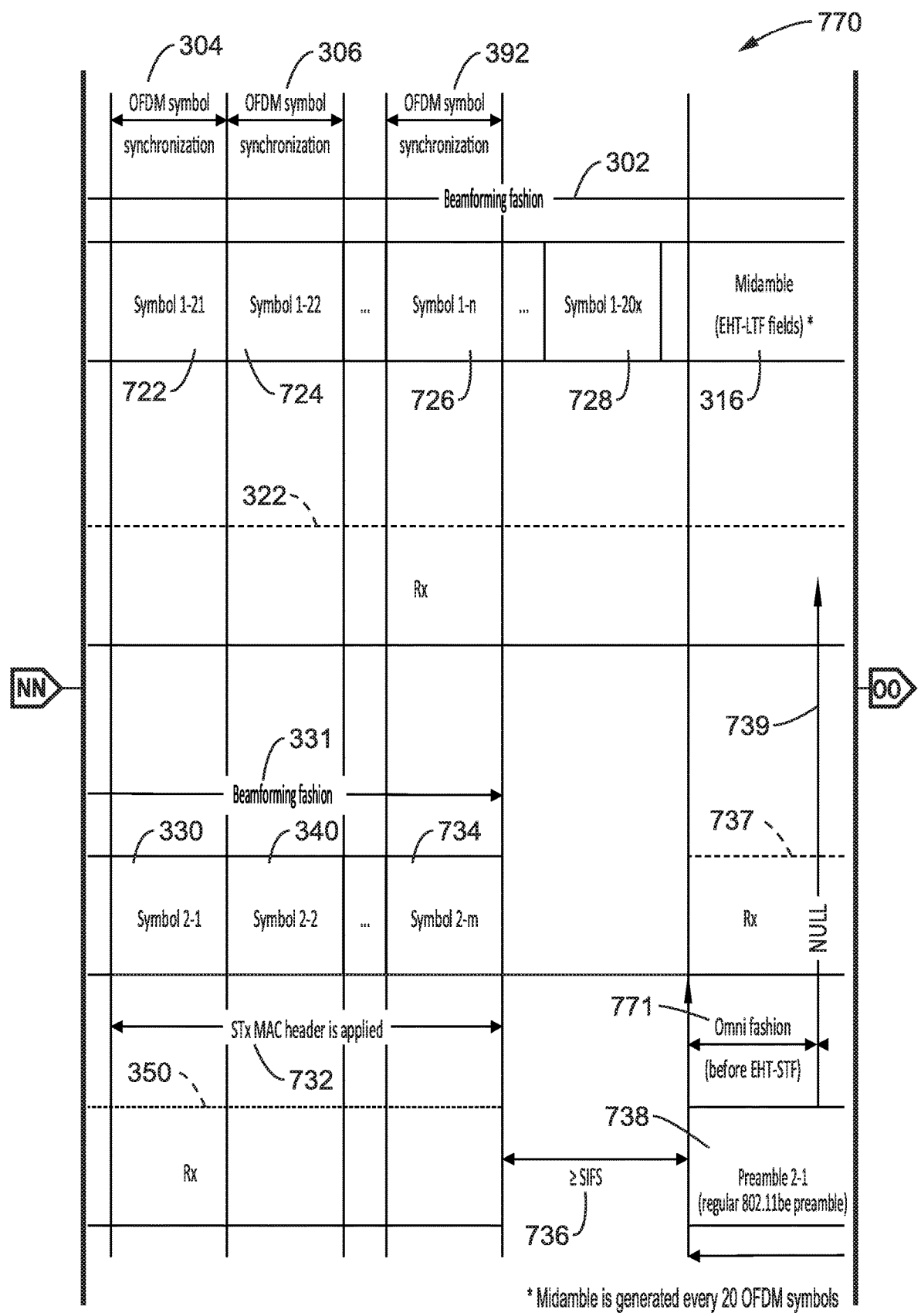
Figure 28C:
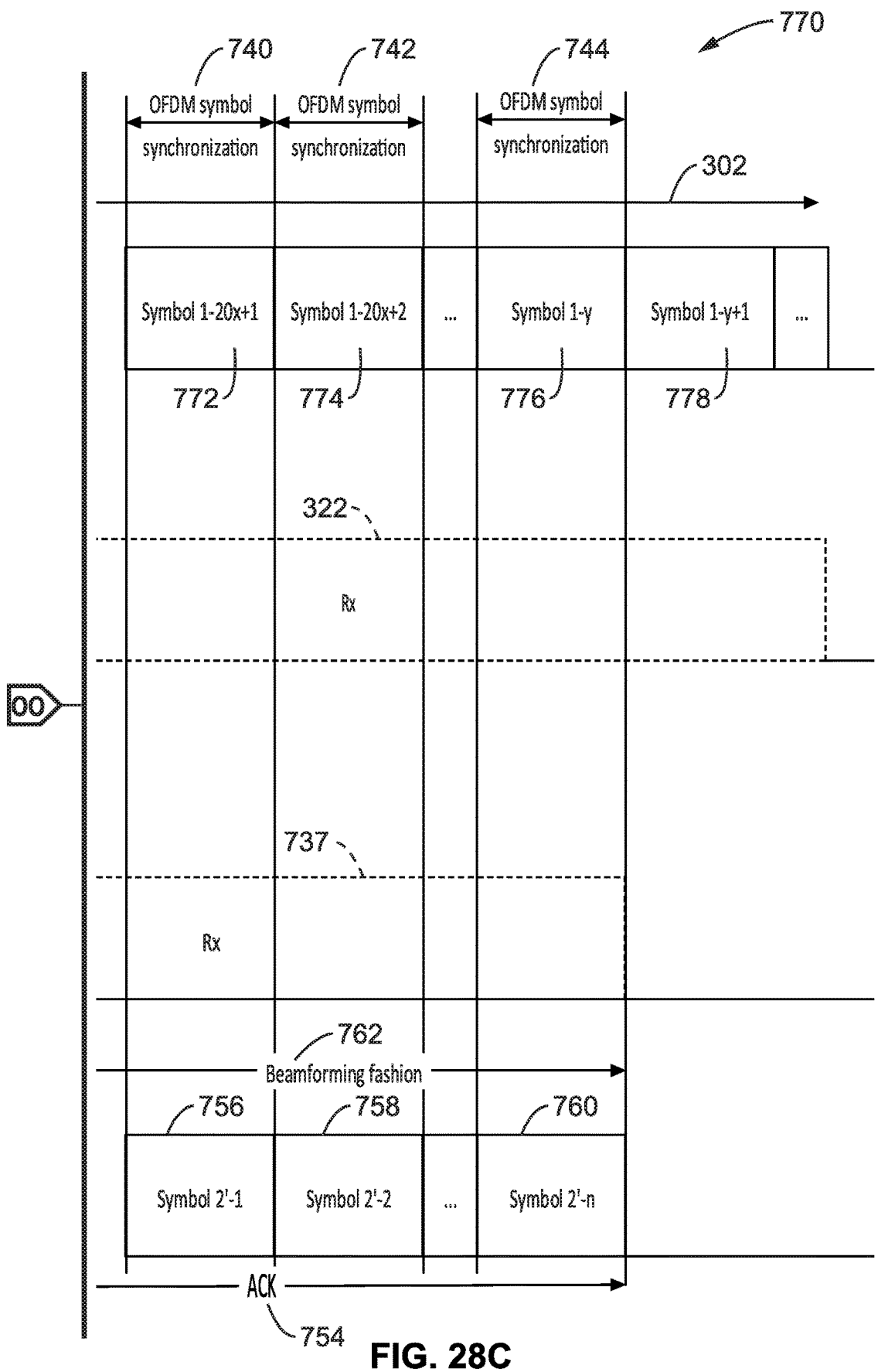

FIG. 28A through FIG. 28C illustrate a second example embodiment 770 of how the simultaneous transmission can be achieved in transmission scheme 2 as shown in FIG. 26. It should be noted that the bulk of the elements shown in FIG. 28A through FIG. 28C were depicted in the previous figures.

AP1 starts transmitting and embeds multiple midamble fields 316 in its packet to allow AP2 to join the simultaneous transmission. The procedure of data packet transmission of AP2 can be the same as all the examples shown in Section 4.3.3 when the midamble is embedded in the data packet of AP1. In this case AP2 joins the simultaneous transmission and finishes its data packet transmission as was shown in FIG. 18.

When AP2 transmits a data packet to STA2, it can embed the simultaneous transmission information in its MAC header 732. The format of the MAC header carrying the simultaneous transmission is explained in FIG. 40.

STA2 receives 350 the data packet from AP2 and learns the simultaneous transmission information in the MAC header of STA2. The midamble information of the MAC header is duplicated from AP1. The packet duration of AP1 minus the coordination duration in the MAC header represents the time difference between the start time of the transmissions of AP1 and AP2. STA2 can determine which midamble AP2 used to join the simultaneous transmission, which aids STA2 in estimating the start time of the midamble in the data packet of AP1. It can be a reference time for estimating the start time of the upcoming midamble of AP1 which STA2 can use to start transmitting ACK 754.

STA2 waits for at least the SIFS interval 736 and starts ACK transmission 754 during one midamble period of AP1. It will be noted that the procedure for transmitting the ACK can be similar to that used for transmitting the data packet.

The PLCP preamble portion is before the EHT-STF field which is transmitted in an omni-directional manner 771 by STA2. After that, the remainder of the packet is transmitted using a directional beamforming manner 762. Meanwhile STA2 makes a null 739 towards STA1. The PLCP preamble of STA2 and the midamble of AP1 should end at the same time.

STA 2 generally uses the same GI+EHT-LTF size as AP1 and AP2 in its ACK transmission. Then, the OFDM symbol boundary of STA2 and AP1 are synchronized. The synchronization is seen in FIG. 28C with synchronized OFDM intervals 740, 742 through to 744, to which AP1 is seen transmitting Symbol 1-20$x$+1 772, Symbol 1-20$x$+2 774 through to Symbol 1-$y$ 776 and Symbol 1-$y$+1 778, while AP2 is seen transmitting Symbol 2'-1 756, Symbol 2'-2 758 through to Symbol 2'-$n$ 760.

Figure 29A:
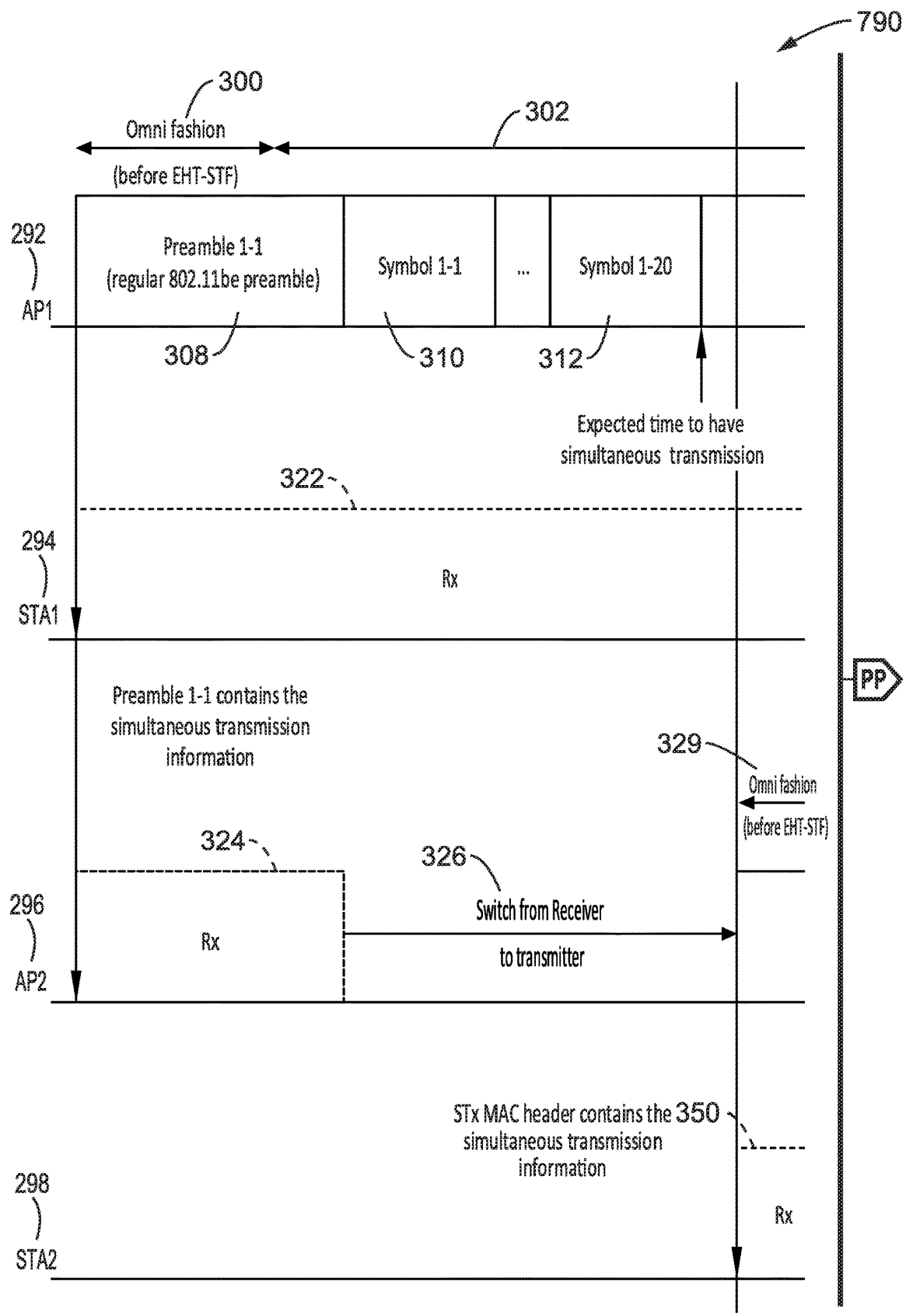
FIG. 29A through 29C are a signaling diagram of an alternative second example (example 2b) of using the second simultaneous transmission scheme according to at least one embodiment of the present disclosure.
Figure 29B:
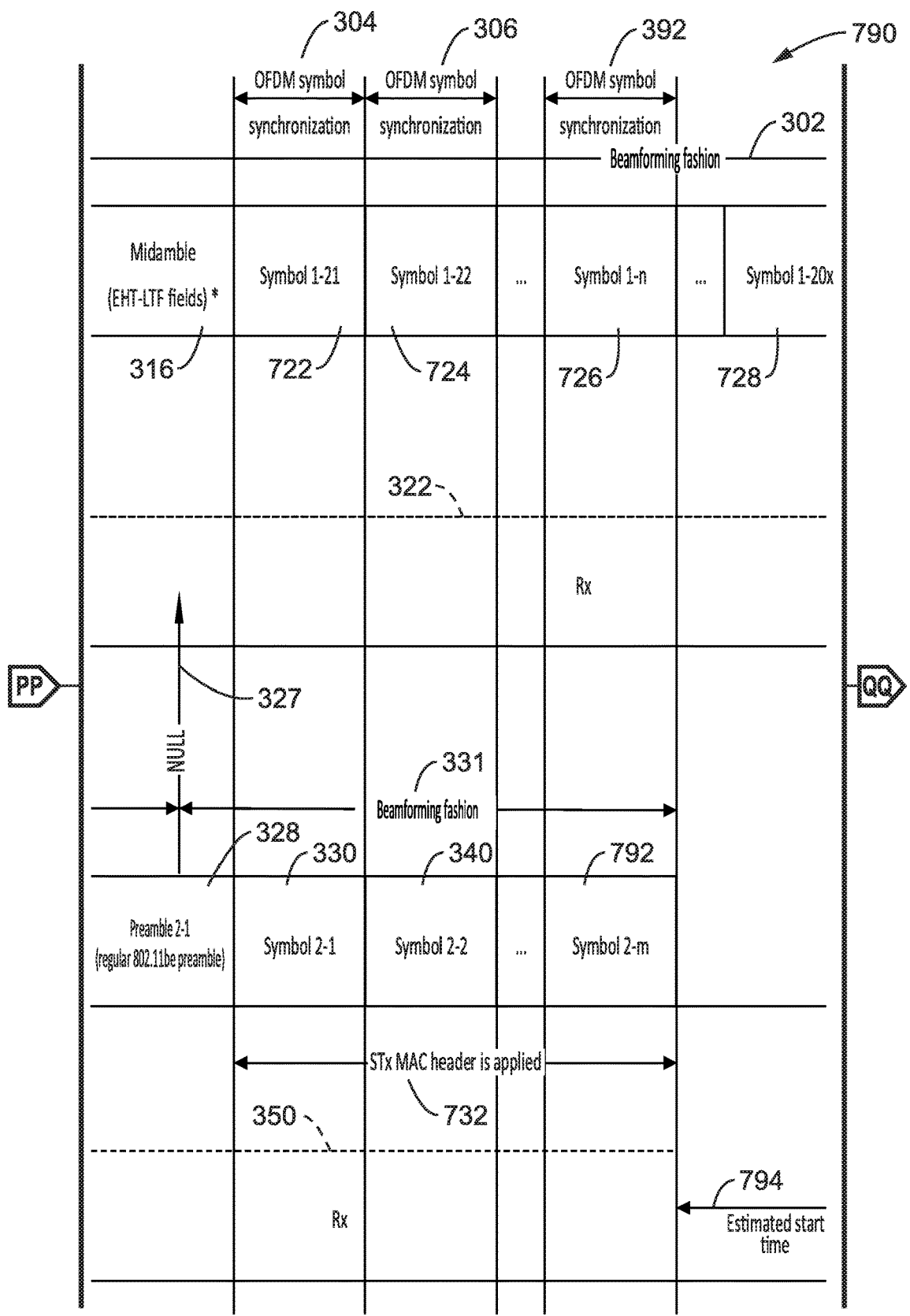
Figure 29C:
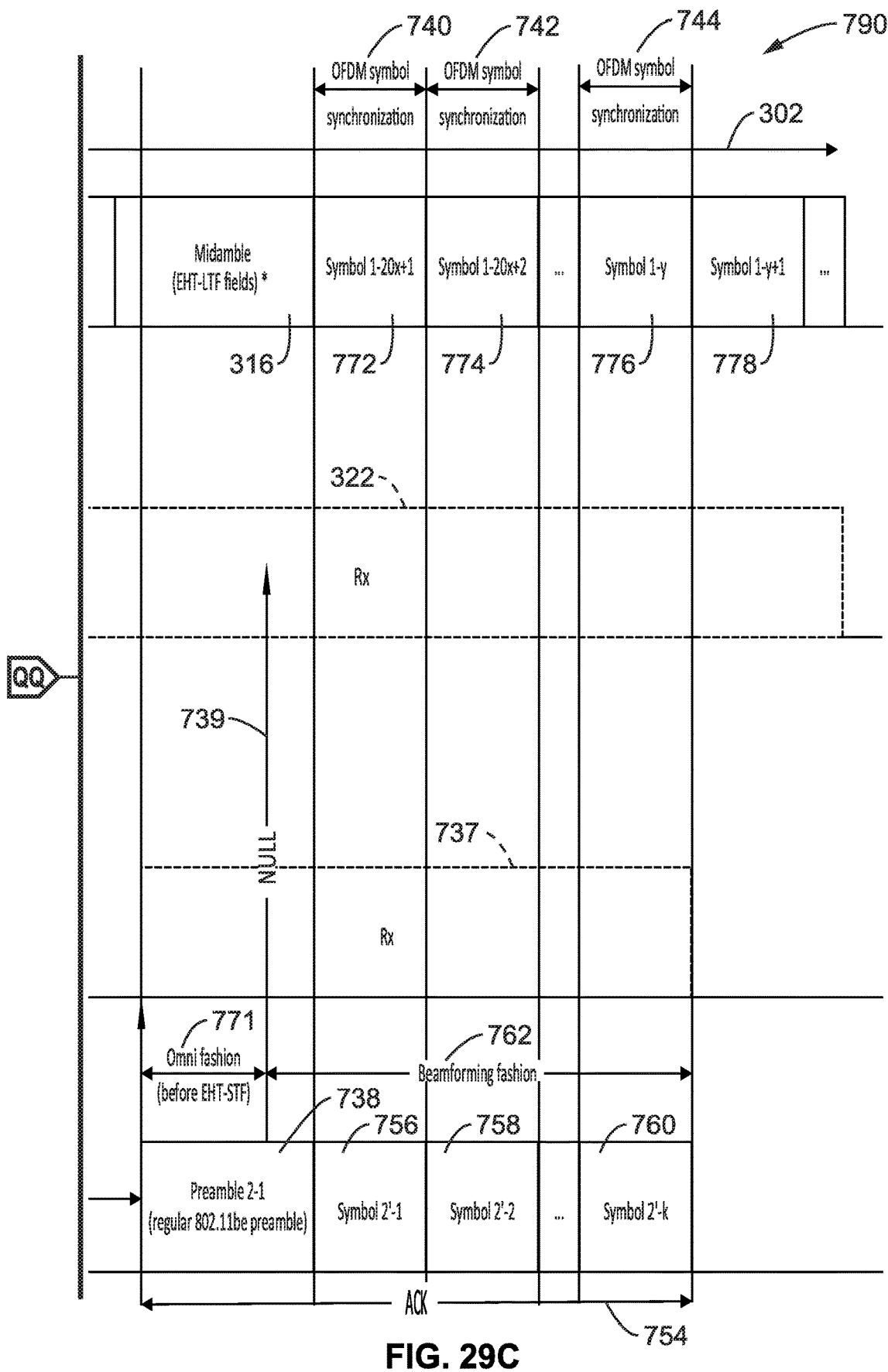

FIG. 29A through FIG. 29C illustrate an example embodiment 790 showing that it is also possible that in FIG. 28A through FIG. 28C, the ACK transmitted by STA2 is scheduled by AP2. Again, it should be noted that the bulk of the elements shown in FIG. 29A through FIG. 29C were depicted in the previous figures.

To achieve this ACK transmission, AP2 only needs to set the estimated start time 794 in the feedback info of the simultaneous transmission and sends the information through MAC header 732. This is seen after Symbol 2-$m$ 792, with a time interval of estimated start time 794 before the ACK 754 starts with Preamble 2-1 738.

Figure 30A:
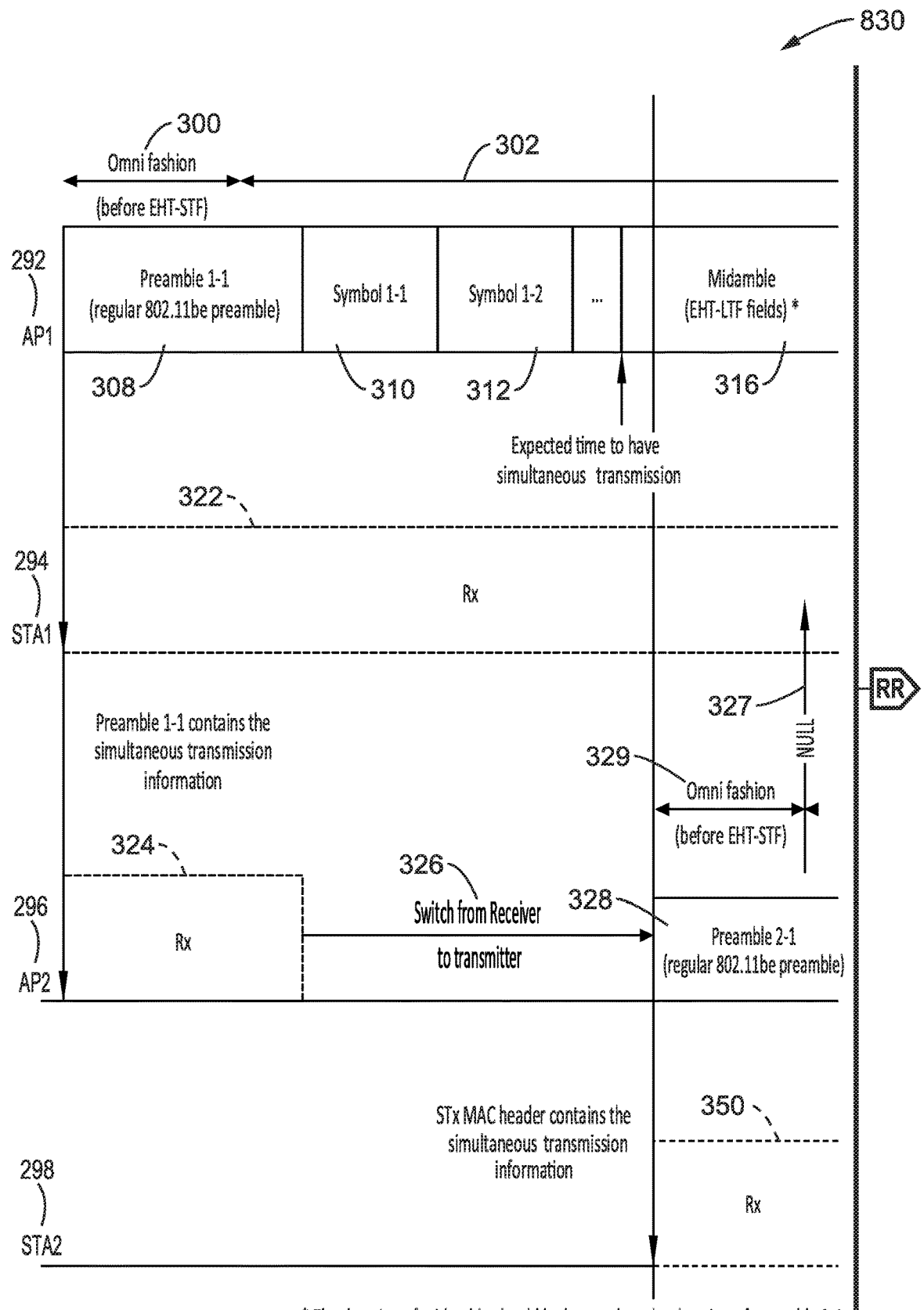
FIG. 30A through 30C are signaling diagram of a third example (example 2c) of using the second simultaneous transmission scheme according to at least one embodiment of the present disclosure.
Figure 30B:
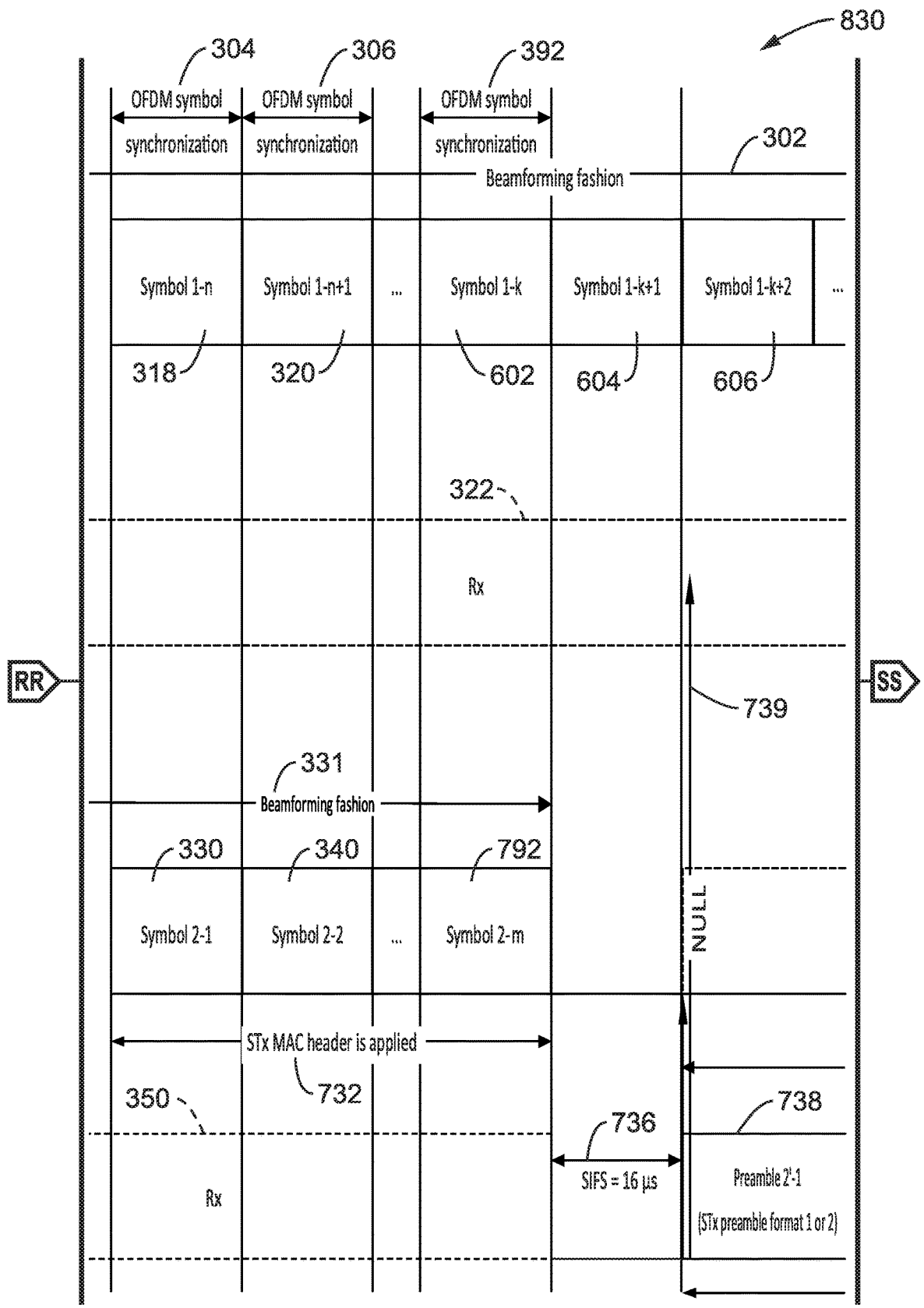
Figure 30C:
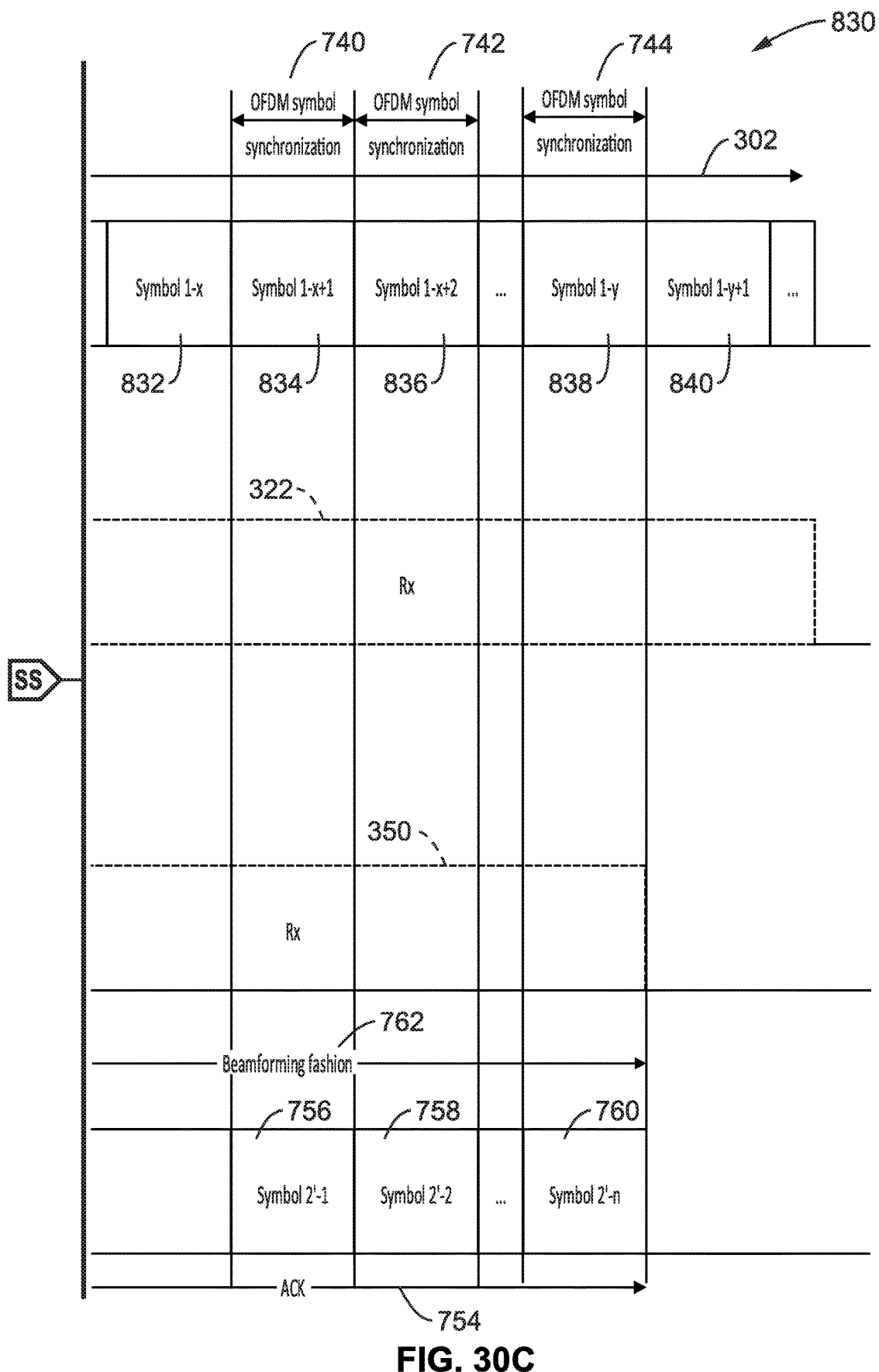

FIG. 30A through FIG. 30C illustrate a third example embodiment 830 of how the simultaneous transmission can be achieved in transmission scheme 2 as shown in FIG. 26. It should be noted that the bulk of the elements shown in FIG. 30A through FIG. 30C were depicted in the previous figures.

AP1 starts transmitting and embeds only one midamble field 316 in its packet to allow AP2 to join the simultaneous transmission. The procedure of data packet transmission of AP2 can be the same as all the examples shown in Section 4.3.3 when the midamble is embedded in the data packet of AP1. In this case AP2 joins the simultaneous transmission and finishes its data packet transmission as shown in FIG. 18.

When AP2 transmits a data packet to STA2, it can embed the simultaneous transmission information in its MAC header 732. The format of the MAC header carrying the simultaneous transmission is explained in FIG. 40.

Then, STA2 can transmit an ACK by transmitting precoded STx preamble 738. The SIFS 736 between the data packet transmission and the ACK can be set to a specific amount, in this case to 16 µs. In certain circumstances SIFS can be set to a multiple, such as a multiple of 16 µs.

The ACK 754 is transmitted at the beginning of one OFDM symbol of AP1. The format of Preamble 2'-1 738 can be as shown in FIG. 37 or FIG. 38. Preamble 2'-1 in this example has been precoded. STA2 makes a null 739 towards STA1. Symbol transmissions are synchronized as seen in FIG. 30C with synchronized OFDM intervals 740, 742 through 744, to which AP1 is seen transmitting Symbol 1-$x$ 832, Symbol 1-$x$+1 834, Symbol 1-$x$+2 836, through to Symbol 1-$y$ 838 and Symbol 1-$y$+1 840 and so forth, while AP2 is seen transmitting Symbol 2'-1 756, Symbol 2'-2 758 through to Symbol 2'-$n$ 760.

4.3.5. Transmission Scheme 3

Figure 31:
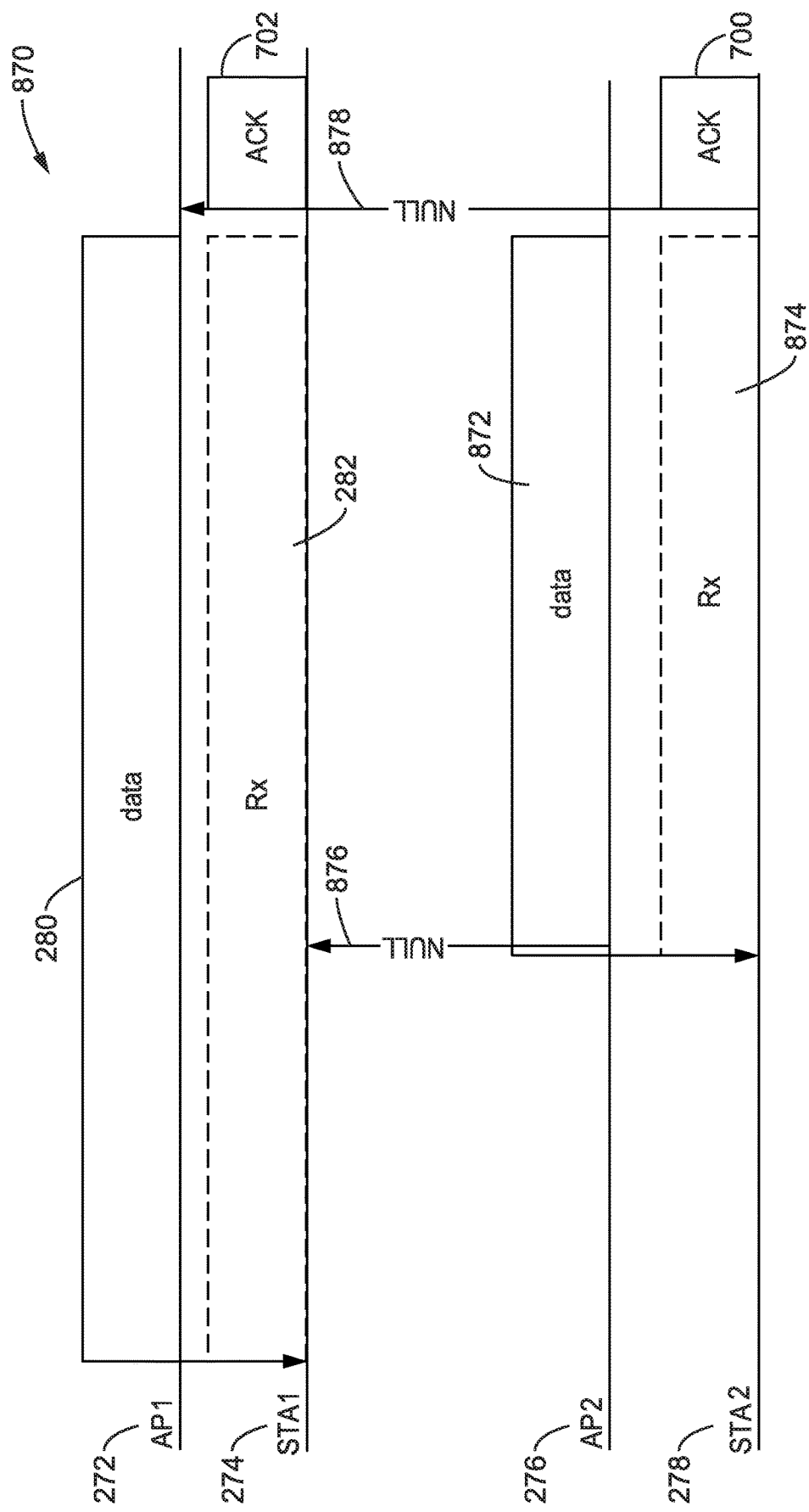
FIG. 31 is a timing diagram signaling diagram of a third simultaneous transmission scheme according to at least one embodiment of the present disclosure.

FIG. 31 illustrates a third example embodiment 870 of a simultaneous transmission in downlink OFDM scenario when the ACKs of both packet transmissions are transmitted at the same time. The figure depicts interactions between AP1 272, STA1 274, AP2 276, and STA2 278. AP1 starts data packet transmission 280 to STA1, which is received 282 by STA 1. In the midst of that transmission, AP2 starts transmitting a packet 872 which is received 874 by STA2 with AP2 at the start of which AP2 is making a null 876 towards STA1. It is assumed that AP2 already has determined a channel vector to make null towards STA1. AP2 finishes its transmission near the end of the packet transmission of AP1.

Then, STA1 and STA2 simultaneously transmit ACKs 700, 702 back to AP1 and AP2, respectively. When STA2 transmits ACK 700, it makes a null 878 towards AP1. Here, it is also assumed that STA2 has already obtained or determined the proper channel vector for making a null towards AP1.

An example is provided to explain the details of the simultaneous transmission in transmission scheme 3. The symbols shown in the examples represents the OFDM symbols with guard interval (GI) as defined in IEEE 802.11ax. The OFDM symbol duration without GI is 12.8 µs.

The type of feedback can be replaced by BA instead of ACK. This information can be included in the feedback information of the simultaneous transmission information.

Figure 32A:
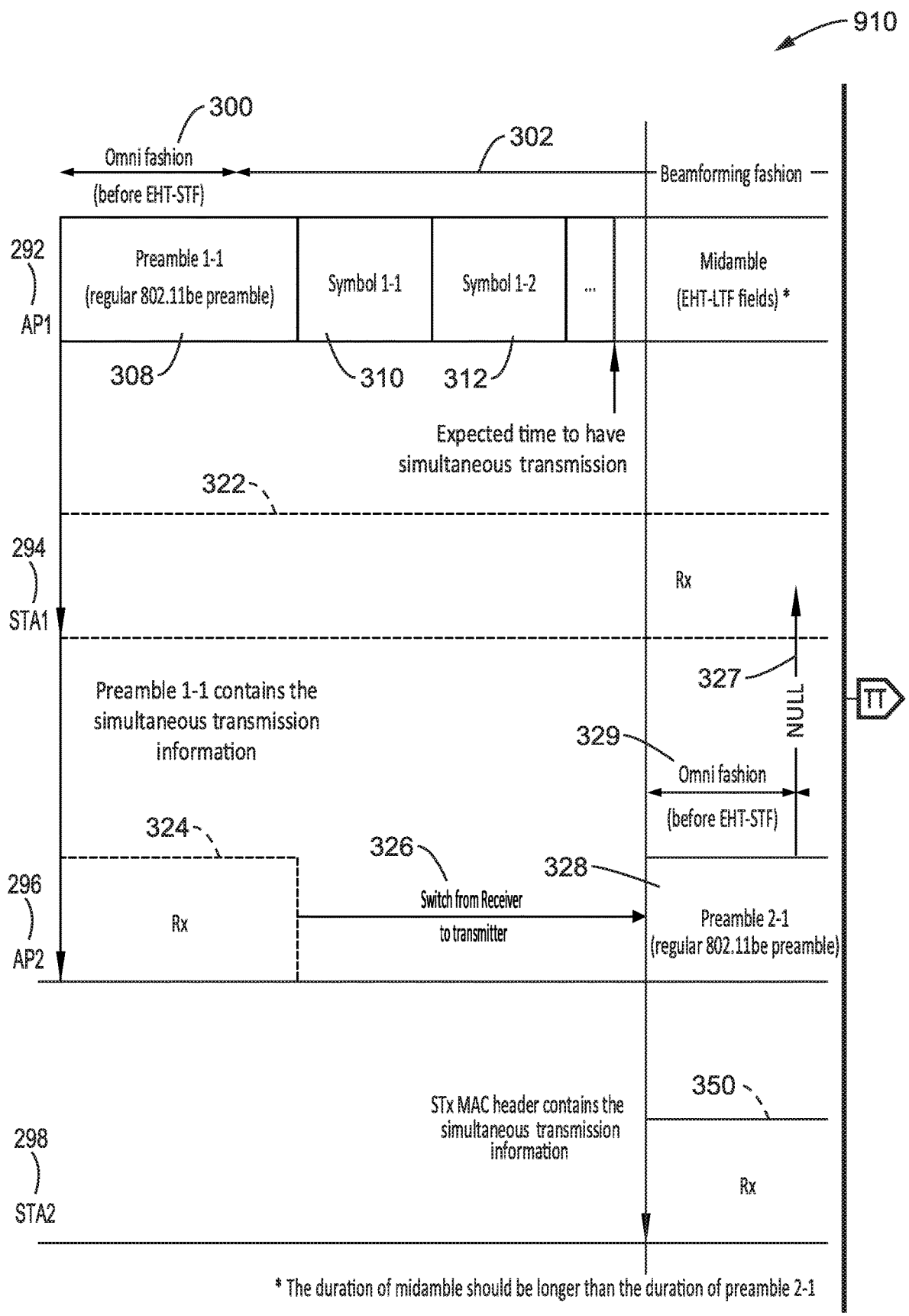
FIG. 32A through FIG. 32C are a signaling diagram of an example of using the third simultaneous transmission scheme according to at least one embodiment of the present disclosure.
Figure 32B:
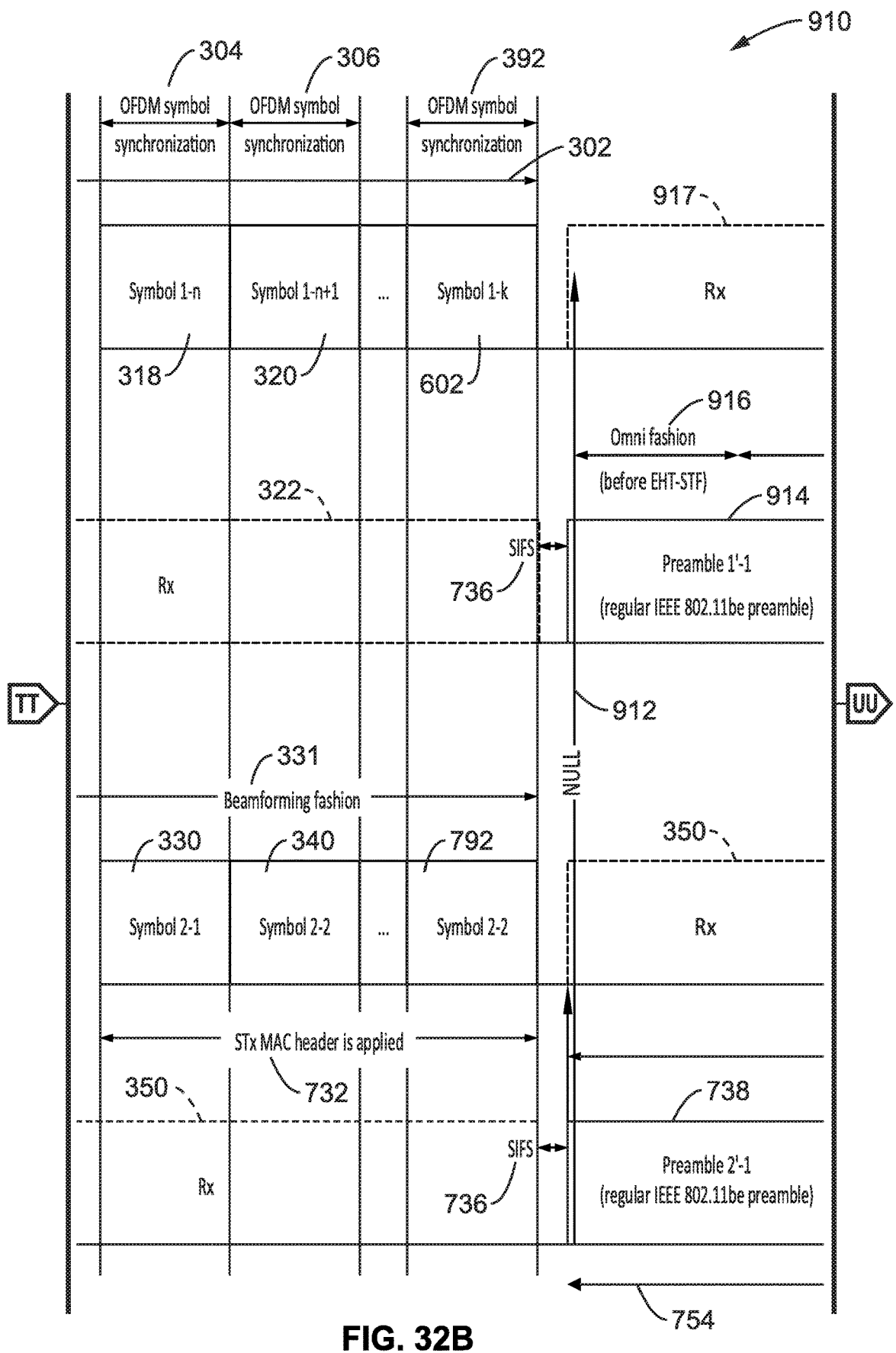
Figure 32C:
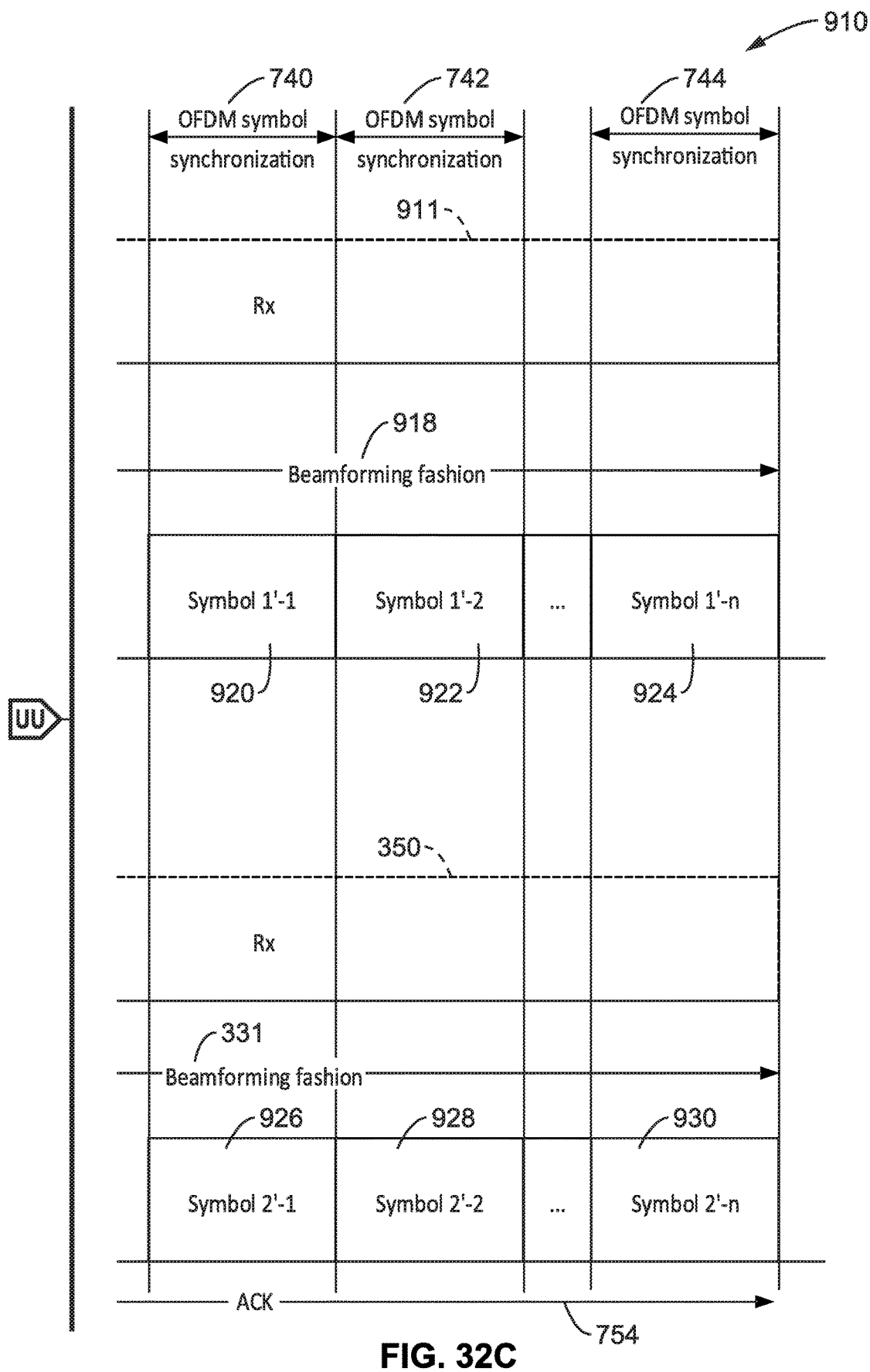

FIG. 32A through FIG. 32C illustrate an example embodiment 910 of how the simultaneous transmission can be achieved in transmission scheme 3 as shown in FIG. 31. It should be noted that the bulk of the elements shown in FIG. 32A through FIG. 32C were depicted in the previous figures.

The data packet transmissions of AP1 and AP2 can be the same as explained in Section 4.3.3. In this case AP2 joins the simultaneous transmission and finishes its data packet transmission as shown in FIG. 18.

When AP2 transmits a data packet to STA2, it can embed the simultaneous transmission information in its MAC header 732. The format of the MAC header carrying the simultaneous transmission is explained in FIG. 40.

AP1 and AP2 finish their respective data packet transmissions at the same time. Then, STA1 and STA2 can transmit an ACK simultaneously after waiting SIFS time 736. STA1 transmits an ACK in regular beamforming procedure with Preamble 1'-1 914, with a first portion in an omni-directional manner 916 and the remainder in a beamforming manner 918, to which AP1 receives 917. STA2 transmits an ACK 754 with precoded preamble 738 and makes null 912 towards AP1. The preamble format of STA1 and STA2 should be the same. Symbols are seen transmitted in the ACKs by STA 1 and STA 2. STA 1 is seen sending Symbol 1'-1 920, Symbol 1'-2 922 through to Symbol 1'-$n$ 924; while STA2 is seen sending Symbol 2'-1 926, Symbol 2'-2 928 through to Symbol 2'-$n$ 930.

In this example the regular IEEE 802.11be preamble as shown in FIG. 6 is used. It should be noted that AP2 can add padding to its data packet so that AP1 and AP2 can finish transmitting data packets at the same time as explained in FIG. 15.

4.3.6. Packet Format

FIG. 33 illustrates an example embodiment 950 of the contents of an S-Tx.request frame having the following fields. A Frame Control field indicates the type of frame. A Duration field contains NAV information used for CSMA/CA channel access. An RA field contains an address for the recipient of the frame. An Action field indicates the action which in this case is an S-Tx.request. A Traffic Type field indicates the AC or priority of the traffic. The coordinatee (the station being coordinated) sets this field to inform the coordinator of the AC or user priority of the traffic. The coordinator can use this information to decide whether to accept or reject the agreement. A Coord Start Time field indicates the start time of the coordination of the simultaneous transmission. The coordinatee sets this field to tell the coordinator the start time of the coordination. The coordinator should start to launch the first simultaneous transmission with the coordinator at the Coord Start time if the agreement is accepted.

A Coord Periodical Time field indicates the periodic time of the occurrence of the simultaneous transmission. The coordinatee sets this field to tell the coordinator that the simultaneous transmission is expected to occur every Coord Periodical Time. The coordinator is generally configured to launch the simultaneous transmission with the coordinatee every Coord Periodical Time if the agreement is accepted. A Coord duration field indicates the duration that allows simultaneous transmission every Coord periodical time. The coordinatee sets this field to tell the coordinator the expected duration of every simultaneous transmission. The coordinator should allow at least Coord duration for the simultaneous transmission every time if the agreement is accepted. Coord End Time field indicates the end time of the coordination of the simultaneous transmission. The coordinatee sets this field to tell the coordinator the end time of the coordination. The coordinator is configured to stop the simultaneous transmission with the coordinatee after the Coord End time.

FIG. 34 illustrates an example embodiment 970 of a S-Tx.reply frame. A Frame Control field indicates the type of frame. A Duration field contains NAV information used for CSMA/CA channel access. An RA field contains the address for a recipient of the frame. An Action field indicates that this is an S-Tx.reply frame. An Agreement indication field indicates whether the coordination of the simultaneous transmission is accepted or not, and can be implemented using a one-bit indication. The coordinator sets this field to first state (e.g., "1") if it accepts the simultaneous transmission request. Otherwise, the bit is set to a second state (e.g., "0") and the request is denied. The coordinatee receives this field and from it determines if the agreement is accepted or not.

A Coord ID field indicates the coordination ID of the coordinator given by the coordinatee. The coordinator generates this ID and passes it to the coordinatee. When the coordinator launches a simultaneous transmission with the Coord ID given in its data packet preamble, the coordinatee having the same Coord ID is able to join the simultaneous transmission.

A Group of STAs field indicates the MAC addresses of STAs associated with the coordinator AP. The coordinator puts its associated STAs in this field. When the coordinatee receives this field, it stores the information of the STAs. The coordinatee is able to lookup the information of STAs and identify the receiver of the coordinator when the simultaneous transmission is launched.

An Allowance (allowable) Interference Level field indicates the maximum interference level that the coordinatee can create during the simultaneous transmission. The coordinator sets this field to limit the transmission power of the coordinatee.

FIG. 35 illustrates an example embodiment 990 of simultaneous transmission information having the following fields. An STx Allowance indication field indicates whether another AP is allowed to join the simultaneous transmission. When this field is set to a first state (e.g., "1"), it indicates that some other AP is allowed to join the simultaneous transmission; otherwise, this field is set to a second state (e.g., "0"). When the coordinator sets this field in its preamble, the simultaneous transmission ID is allowed if the field is set to "1" and not allowed otherwise. When the coordinatee sets this field in its MAC header, this field can only be set to "1" to indicate the current transmission is a simultaneous transmission.

A Coord duration field indicates the allowable duration for simultaneous transmission. The coordinator sets this field in the preamble of its data packet to tell the coordinatee that the data transmission of the coordinatee has to be finished within this time. The coordinatee sets this field in the MAC header of its data packet to tell its receiver the time to end data transmissions by the coordinator. The receiver of this information from the coordinatee can determine the elapsed time since the coordinator started the data transmission, which is Packet duration minus Coord duration.

A Packet duration field indicates the duration of the data packet of the coordinator. The coordinator sets this field in the preamble of its data packet to tell the coordinatee its data packet duration. In this case, the Packet duration should be the same as Coord duration. The coordinatee sets this field in the MAC header of its data packet to tell its receiver the data packet duration of the coordinator. The receiver of this information from the coordinatee can determine the time elapsed since the coordinator started data transmission, which can be determined by calculating Packet duration minus Coord duration.

A Midamble info field includes the information of the construct of midamble and its occurrence time. The coordinator sets this field in the preamble of its data packet to tell the coordinatee the type and occurrence of the midamble. The coordinatee then can join the simultaneous transmission during the midamble. The coordinatee sets this field in the MAC header of its data packet to tell its receiver the midamble information of the coordinator. The receiver of this information from the coordinatee can utilize this information to transmit an ACK or BA.

As seen in the lower portion of FIG. 35 the Midamble information field contains the following subfields. A Midamble type subfield indicates the type of midamble. This subfield indicates whether it consists of LTF only or LTF and other type of signal training field and how many LTF fields in the midamble. For example, each value can represent one type of midamble. By way of example and not limitation, types are assigned as: 0: three EHT-LTF-4×; 1: four EHT-LTF-4×; 2: three EHT-LTF-4× with other types of signal training fields. A Start time subfield indicates the start time of the first midamble in the packet. It can be counted in terms of the number of OFDM symbols. If the start time is "0", then the midamble is not embedded in the packet. Otherwise, the start time represents the number of OFDM symbols between the preamble and the first midamble in the packet. A Periodic Time subfield indicates the periodic time of the midamble. It can be counted in terms of the number of OFDM symbols. If the periodic time is "0", then the number of midambles in the packet is no more than one. Otherwise, the periodic time represents the number of OFDM symbols between two consequent midambles in the packet.

Returning to the fields in the upper portion of the figure is a Feedback info field which indicates the feedback information of the transmission. The coordinator sets this field in the preamble of its data packet to tell the coordinatee its feedback information. The coordinatee sets this field in the MAC header of its data packet to tell its receiver how to send the feedback back. The receiver of the coordinatee should send the feedback following the feedback info from the coordinatee. The lower portion of the figure depicts the subfields in this field as follows. An ACK/BA subfield provides an indication (e.g., one-bit of information) on whether the feedback type is ACK or BA. In the example embodiment if the bit is set to a first state (e.g., "0") then feedback is ACK, otherwise if the bit is set to a second state (e.g., "1") then the feedback is Block Acknowledgement (BA). A Timeout subfield indicates a value for the ACK or BA timeout. The packet transmission fails if the feedback is not received before the timeout. An Estimated Start time subfield indicates the estimated start time of ACK transmission. This time is used when the ACK transmission is scheduled by the AP. A Precoded preamble contains an indication (e.g., one-bit indication) to show whether the preamble of ACK is precoded or not. In the example embodiment, if the bit set to a first state (e.g., "0") then the preamble for the feedback can be precoded, while if the bit is set to a second state (e.g., "1") it indicates it cannot be precoded.

Returning to the top line of FIG. 35 the remaining fields are as follows. An GI+EHT-LTF size field indicates the combination of the duration of GI (e.g., 0.8, 1.6, 3.2 µs as in IEEE 802.11ax) and the size of EHT-LTF (e.g., 1×, 2×, 4× as in IEEE 802.11ax). The coordinator sets this field in the preamble of its data packet to tell the coordinatee the combination of the duration of GI and the size of EHT-LTF used by the coordinator. The coordinatee generally utilizes the same combination. The coordinatee sets this field in the MAC header of its data packet to tell its receiver the combination of the duration of GI and the size of EHT-LTF used by the coordinator. If the ACK/BA is requested, the receiver of the coordinatee is configured to generally use the same combination in its ACK/BA transmission. A Null Towards field indicates which STA to make a NULL towards. The coordinator sets this field in the preamble of its data packet to tell the coordinatee which STA to null towards during the simultaneous transmission. The coordinatee sets this field in the MAC header of its data packet to tell its receiver which STA to null towards when the receiver transmits ACK/BA. A Coord ID field indicates the coordination ID, which identifies which AP is allowed to join the simultaneous transmission. The coordinator sets this field in the preamble of its data packet to point out the coordinatee. The AP having the same Coord ID is allowed to join the simultaneous transmission.

FIG. 36 illustrates an example embodiment 1010 depicting how simultaneous transmission information can be embedded in the EHT-SIG field of PLCP preamble.

FIG. 37 illustrates an example embodiment 1030 of a first format, (format 1), of the STx preamble, and its duration. An L-STF field indicates the non-HT short training field in IEEE 802.11be of 8 µs duration. An L-LTF field indicates the non-HT long training field in IEEE 802.11be of 8 µs duration. An L-SIG field indicates the non-HT SIGNAL field in IEEE 802.11be of 4 µs duration. An RL-SIG field indicates the repeated non-HT SIGNAL field in IEEE 802.11be of 4 µs duration. A U-SIG field indicates the EHT universal field in IEEE 802.11be of 8 µs duration. An EHT-SIG field indicates the EHT SIGNAL field in IEEE 802.11be of 8 µs duration. An EHT-STF field indicates the EHT short training field of 8 µs duration. It should be noted that this can be replaced by another type of signal training field without departing from the teachings of the present disclosure. An EHT-LTF field indicates an EHT long training field in IEEE 802.11be, and uses the combination of the EHT-LTF-4× with GI and thus has a duration of 12.8 µs plus a 3.2 µs GI for a total of 16 µs.

FIG. 38 illustrates an example embodiment 1050 of a second format (format 2), of the STx preamble. The duration of each field is shown in the figure. An L-STF field indicates the non-HT short training field in IEEE 802.11be, and has a duration of 8 µs. An L-LTF field indicates the non-HT long training field in IEEE 802.11be, and has a duration of 8 µs. An L-SIG field indicates the non-HT SIGNAL field in IEEE 802.11be, and has a duration of 4 µs. An RL-SIG field indicates the repeated non-HT SIGNAL field in IEEE 802.11be, and has a duration of 4 µs. A U-SIG field indicates the EHT universal field in IEEE 802.11be, and has a duration of 8 µs. An EHT-SIG field has two parts: an EHT-SIG-A field indicates the EHT common SIGNAL field in IEEE 802.11be, and has a duration of 8 µs, while an EHT-SIG-B field indicates the EHT user-specific SIGNAL field in IEEE 802.11be, and has a duration of 4 µs. The simultaneous transmission information as shown in FIG. 36 can be embedded in this field. An EHT-STF field indicates the EHT short training field, and has a duration of 4 µs. It should be appreciated that the EHT-STF field can be replaced by another type of signal training field without departing from the teachings of the present disclosure. An EHT-LTF field indicates a EHT long training field in IEEE 802.11be. The EHT-LTF field uses the combination of the EHT-LTF-4× with 3.2 µs GI. It should also be noted that the EHT-STF field can be replaced by other types of signal training fields.

FIG. 39 illustrates an example embodiment 1070 of a third example (format 3) of the STx preamble. The duration of each field is shown in the figure. An L-STF field indicates the non-HT short training field in IEEE 802.11be and has a duration of 8 µs. An L-LTF field indicates the non-HT long training field in IEEE 802.11be and has a duration of 8 µs. An L-SIG field indicates the non-HT SIGNAL field in IEEE 802.11be and has a duration of 4 µs. RL-SIG field indicates the repeated non-HT SIGNAL field in IEEE 802.11be and has a duration of 4 µs. U-SIG field indicates the EHT universal field in IEEE 802.11be and has a duration of 8 µs. EHT-SIG field indicates the EHT common SIGNAL field in IEEE 802.11be and has a duration of 16 µs. The format of this field can be similar with the HE-SIG-A field in the HE ER SU PPDU format of IEEE 802.11ax. EHT-STF field indicates the EHT short training field. It should be appreciated that there is no duration requirement given here for the EHT short training field, as this is expected to be the same as the EHT short training field in the midamble as shown in FIG. 23B It should be noted that this field can be replaced by some other type of signal training field. EHT-LTF field indicates an EHT long training field in IEEE 802.11be. The EHT-LTF field uses the combination of the EHT-LTF-4× with 3.2 µs GI. It should be noted that the EHT-STF field can be replaced by other types of signal training field.

FIG. 40 illustrates an example embodiment 1090 of the content of a MAC header which can be used to carry simultaneous transmission information. Such MAC header is denoted as STx MAC header, which includes the fields from Frame Control field to Simultaneous transmission information field. A Frame Control field indicates the type of frame. A Duration field contains NAV information used for CSMA/CA channel access. An RA field contains an address for the recipient of the frame. A Simultaneous transmission information field indicates the simultaneous transmission information as explained in FIG. 35. The data field (payload) of the packet can be followed by the STx MAC header.

5. General Scope of Embodiments

The enhancements described in the presented technology can be readily implemented within various wireless communication stations and their associated protocols. It should also be appreciated that communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with wireless data communication. The presented technology is non-limiting with regard to memory and computer-readable media, insofar as these are non-transitory, and thus not constituting a transitory electronic signal.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to the following:

1. An apparatus for wireless communication in a network, comprising: (a) a wireless communication circuit, as a station (STA) or access point (AP), which is configured for wirelessly communicating with at least one other of said wireless communication circuit in a Wireless Fidelity (WiFi) network configured to allow multiple access points (APs) and multiple stations (STAs); (b) at least one modem and radio-frequency (RF) circuit connected to a plurality of antennas configured for transmitting and receiving frames with neighboring of said wireless communication circuits in both omni-directional and directional modes; (c) a processor configured to control said wireless communication circuit and its at least one modem; and (d) a non-transitory memory storing instructions executable by the processor; (e) wherein said instructions, when executed by the processor, perform a communication protocol comprising: (e)(i) performing packet transmission and reception in response to the encoding and decoding of signals containing Orthogonal Frequency-Division Multiplexing (OFDM) symbols in a Carrier-Sense Multiple-Access/Collision Avoidance (CSMA/CA) Media Access Control (MAC) protocol; (e)(ii) operating as a first access point (AP) using said communication protocol in performing beamforming towards at least one station (STA) within its communication range, while nulling towards one or more other access points (APs); (e)(iii) commencing a packet transmission, as said first access point (AP), and allowing another access point (AP) using said communication protocol to transmit packet simultaneously in response to one or more steps comprising: (e)(iii)(A) performing negotiations with the other access point (AP) prior to commencing a packet transmission; (e)(iii)(B) communicating simultaneous transmission information to the other access point (AP); (e)(iii)(C) allowing the other access point (AP) to perform simultaneous transmission under the communication protocol while said packet transmission is ongoing, with the other access point (AP) configured for synchronizing its Orthogonal Frequency-Division Multiplexing (OFDM) symbol boundaries with said first access point (AP); and (e)(iii) (D) completing packet transmissions by the other access point (AP), prior to an end of packet transmission by said first access point (AP).

2. An apparatus for wireless communication in a network, comprising: (a) a wireless communication circuit, as a station (STA) or access point (AP), which is configured for wirelessly communicating with at least one other of said wireless communication circuit in a Wireless Fidelity (WiFi) network configured to allow multiple access points (APs) and multiple stations (STAs); (b) at least one modem and radio-frequency (RF) circuit connected to a plurality of antennas configured for transmitting and receiving frames with neighboring of said wireless communication circuits in both omni-directional and directional modes; (c) a processor configured to control said wireless communication circuit and its at least one modem; and (d) a non-transitory memory storing instructions executable by the processor; (e) wherein said instructions, when executed by the processor, perform a communication protocol comprising: (e)(i) performing packet transmission and reception in response to the encoding and decoding of signals containing Orthogonal Frequency-Division Multiplexing (OFDM) symbols in a Carrier-Sense Multiple-Access/Collision Avoidance (CSMA/CA) Media Access Control (MAC) protocol; (e)(ii) operating as a first access point (AP) using said communication protocol in performing beamforming towards at least one station (STA) within its communication range, while nulling towards one or more other access points (APs); (e)(iii) commencing a packet transmission, as said first access point (AP), and allowing another access point (AP) using said communication protocol to transmit packet simultaneously in response to one or more steps comprising: (e)(iii)(A) performing negotiations with the other access point (AP) prior to commencing a packet transmission; (e)(iii)(B) communicating simultaneous transmission information to the other access point (AP); (e)(iii)(C) allowing the other access point (AP) to perform simultaneous transmission under the communication protocol while said packet transmission is ongoing, with the other access point (AP) configured for synchronizing its Orthogonal Frequency-Division Multiplexing (OFDM) symbol boundaries with said first access point (AP); (e)(iii)(D) embedding simultaneous transmission information in a preamble or Medium Access Control (MAC) header by the other access point (AP) to request that the receiving station transmit back an acknowledgement; (e)(iii)(D) (1) transmitting an acknowledgement by the receiving station while said first access point is still transmitting said packet transmission, if the other access point (AP) completes its transmission before said first access point completes its packet transmission; (e)(iii)(D)(2) transmitting an acknowledgement by the receiving station with the acknowledgement from the other access point if the first access point (AP) and the other access point (AP) complete their transmissions at the same time; and (e)(iii)(D)(3) transmitting an acknowledgement by the receiving station in which it synchronizes its OFDM signal boundary with that of the first access point (AP) to protect the transmissions of the first access point (AP) from interference from the acknowledgement from the other access point (AP).

3. A method of wireless communication in a network, comprising: (a) configuring a wireless communication circuit, as a station (STA) or access point (AP), for wirelessly communicating with at least one other of said wireless communication circuit in a Wireless Fidelity (WiFi) network configured to allow multiple access points (APs) and multiple stations (STAs); (b) performing packet transmission and reception in response to the encoding and decoding of signals containing Orthogonal Frequency-Division Multiplexing (OFDM) symbols in a Carrier-Sense Multiple-Access/Collision Avoidance (CSMA/CA) Media Access Control (MAC) protocol; (c) operating as a first access point (AP) using said communication protocol in performing beamforming towards at least one station (STA) within its communication range, while nulling towards one or more other access points (APs); (d) commencing a packet transmission, as said first access point (AP), and allowing another access point (AP) using said communication protocol to transmit packet simultaneously in response to one or more steps comprising: (d)(i) performing negotiations with the other access point (AP) prior to commencing a packet transmission; (d)(ii) communicating simultaneous transmission information to the other access point (AP); (d)(iii) allowing the other access point (AP) to perform simultaneous transmission under the communication protocol while said packet transmission is ongoing, with the other access point (AP) configured for synchronizing its Orthogonal Frequency-Division Multiplexing (OFDM) symbol boundaries with said first access point (AP); and (d)(iv) completing packet transmissions by the other access point (AP), prior to an end of packet transmission by said first access point (AP).

4. Wireless communication system/apparatus performing transmission of packets, where multiple access points as a first access point (AP1) and a second access point (AP2) coexist, each AP and its associated stations (STAs) encode and decode the signal in term of OFDM symbol, the CSMA/CA, beamforming and nulling are applied to the transmission, AP2 is able to beamform towards its associated STA while nulling the received power towards one or more STAs associated with AP1, STAs associated with AP2 might have the capability to null its transmit power towards AP1 or AP1-associated STAs, comprising: (a) AP1 starts a packet transmission and allows other APs to transmit packet simultaneously with AP1. can be done through Prior negotiation with other APs; (b) sending simultaneous transmission information; (c) allowing simultaneous transmission to happen all the time as long as AP1 is not affected; (d) AP2 starts the simultaneous transmission during the ongoing transmission of AP1; (e) AP2 synchronizes its OFDM symbol boundary with APIs and makes a null towards the receiver STA of AP1; (f) AP2 finishes its transmission before the end of the transmission of AP1.

5. Wireless communication system/apparatus performing transmission of packets, where multiple access points as a first access point (AP1) and a second access point (AP2) coexist, each AP and its associated stations (STAs) encode and decode the signal in term of OFDM symbol, the CSMA/CA, beamforming and nulling are applied to the transmission, AP2 is able to beamform towards its associated STA while nulling the received power towards one or more STAs associated with AP1, STAs associated with AP2 can null their transmit power towards AP1 or AP1-associated STAs if the hardware supports it, AP2 starts the simultaneous transmission during the ongoing transmission of AP1 comprising: (a) AP2 embeds the simultaneous transmission information in its preamble or MAC header AP2 to ask its receiver STA to transmit ACK/BA back; (b) the receiver STA of AP2 transmits ACK/BA when AP1 is transmitting if AP2 finishes its transmission before the transmission of AP1; (c) the receiver STA of AP2 starts transmitting ACK/BA with AP1's ACK/BA transmission if AP1 and AP2 finish their transmissions at the same time; (d) the receiver STA of AP2 transmitting ACK/BA to AP2 synchronizes its OFDM symbol boundary with AP1's transmission to protect AP1's transmission from the interference due to AP2's ACK/BA.

6. The apparatus or method of any preceding embodiment, wherein said instructions when executed by the processor further perform one or more steps comprising performing nulling of transmit power toward one or more access points (APs) that are not currently being communicating with by a station utilizing the communication protocol under the direction of said first access point (AP).

7. The apparatus or method of any preceding embodiment, wherein said instructions when executed by the processor further perform one or more steps comprising making a null towards a receiving station of said first access point (AP) by the other access point which is performing simultaneous transmission under the communication protocol while said packet transmission is ongoing by said first access point (AP).

8. The apparatus or method of any preceding embodiment, wherein said instructions when executed by the processor further perform one or more steps comprising determining whether to allow said simultaneous transmission based on information received in response to performing a prior negotiation or agreement with the other access points (APs) under the communication protocol.

9. The apparatus or method of any preceding embodiment, wherein said instructions when executed by the processor further perform one or more steps comprising embedding simultaneous transmission information in a preamble transmitted by said first access point (AP) in commencing the packet transmission.

10. The apparatus or method of any preceding embodiment, wherein said instructions when executed by the processor further perform one or more steps comprising embedding a midamble in the packet transmission of said first access point (AP) to allow the other access point (AP) to start its simultaneous transmission by transmitting its preamble in an omni-directional manner within the midamble of said first access point (AP).

11. The apparatus or method of any preceding embodiment, wherein said instructions when executed by the processor further perform one or more steps comprising setting a duration for the midamble which is longer than a preamble of the other access point (AP).

12. The apparatus or method of any preceding embodiment, wherein said instructions when executed by the processor further perform one or more steps comprising embedding the midamble in the packet transmission of said first access point (AP) with the midamble comprising Extreme High Throughput Long Training Fields (EHT-LTFs) or EHT-LTFs plus Extreme High Throughput Short Training Fields (EHT-STFs).

13. The apparatus or method of any preceding embodiment, wherein said instructions when executed by the processor further perform one or more steps comprising periodically embedding the midamble in the packet transmission of said first access point (AP) to allow the other access point (AP) to join the simultaneous transmission at any one of the midambles.

14. The apparatus or method of any preceding embodiment, wherein said instructions when executed by the processor further perform one or more steps comprising transmitting a Ready-To-Send (RTS) to the other access point (AP), and if the other access point (AP) responds back with a Clear-To-Send (CTS), then said first access point has obtained a Transmit Opportunity (TXOP) reservation of simultaneous transmission.

15. The apparatus or method of any preceding embodiment, wherein said instructions when executed by the processor further perform one or more steps comprising utilizing an identical Guard Interval (GI) for Orthogonal Frequency-Division Multiplexing (OFDM) symbol boundary synchronization between said first access point (AP) and the other access point (AP).

16. The apparatus or method of any preceding embodiment, wherein said instructions when executed by the processor further perform one or more steps comprising precoding a preamble by the other access point (AP) to prevent interfering with said packet transmission of the first access point (AP).

17. The apparatus or method of any preceding embodiment, wherein said instructions when executed by the processor further perform one or more steps comprising synchronizing an Extreme High Throughput Long Training Field (EHT-LTF) symbol in a preamble of the other access point (AP) joining the simultaneous transmission with the Orthogonal Frequency-Division Multiplexing (OFDM) symbol of said first access point, and the other access point (AP) joining the simultaneous transmission sets its EHT-LTF to the same duration as an OFDM symbol duration of said first access point.

18. The apparatus or method of any preceding embodiment, wherein said instructions when executed by the processor further perform one or more steps comprising performing said simultaneous transmission under the communication protocol in which the other access point (AP) transmission allows a destination receiver station of to transmit an acknowledgement back to it prior to the end of packet transmission by said first access point (AP).

19. The apparatus or method of any preceding embodiment, wherein said acknowledgement comprises an ACK or a Block Acknowledgement (BA).

20. The apparatus or method of any preceding embodiment, further comprising embedding simultaneous transmission information in a preamble or one or more midambles transmitted by said first access point (AP) during its packet transmission.

21. The apparatus or method of any preceding embodiment, where AP1 deciding whether the simultaneous transmission is needed could have prior negotiation or agreement with other APs.

22. The apparatus or method of any preceding embodiment, where AP1 starting simultaneous transmission could embed the simultaneous transmission information in its preamble.

23. The apparatus or method of any preceding embodiment, where AP1 starting simultaneous transmission could embed the midamble in its packet to allow AP2 to start the simultaneous transmission and transmit its preamble in omni-directional fashion within midamble period.

24. The apparatus or method of any preceding embodiment, where AP1 starting simultaneous transmission could transmit RTS to another AP and receive CTS for the TXOP reservation of simultaneous transmission.

25. The apparatus or method of any preceding embodiment, where AP1 and AP2 having simultaneous transmission could use the same GI for OFDM symbol boundary synchronization.

26. The apparatus or method of any preceding embodiment, where AP2 joining simultaneous transmission could make its preamble precoded to prevent AP1's transmission from the interference due to AP2's preamble.

27. The apparatus or method of any preceding embodiment, where AP2 joining simultaneous transmission could start synchronizing its EHT-LTF symbol in the preamble with the OFDM symbol of AP1 by setting the EHT-LTF symbol and the OFDM symbol to the same duration.

28. The apparatus or method of any preceding embodiment, where AP2 joining simultaneous transmission could start simultaneous transmission at the beginning of any OFDM symbol of AP1 by setting the duration of the preamble to be a multiple of OFDM symbol duration, or start at the middle of an OFDMA symbol and finish at the beginning of an AP1 OFDM symbol.

29. The apparatus or method of any preceding embodiment, where the AP2 finishing its transmission could let the receiver STA of AP2 transmit ACK/BA back to AP2 before the end of the transmission of AP1.

30. The apparatus or method of any preceding embodiment, where AP1 embedding the midamble in its packet could set the duration of midamble longer than AP2's preamble.

31. The apparatus or method of any preceding embodiment, where the midamble being embedded in AP1's packet could consist of EHT-LTF fields only or EHT-LTF fields plus EHT-STF fields.

32. The apparatus or method of any preceding embodiment, where the midamble being embedded in AP1's packet periodically could allow AP2 to join the simultaneous transmission at one of the midambles.

33. The apparatus or method of any preceding embodiment, where the receiver STA of AP2 transmitting ACK/BA back to AP2 could start transmitting ACK/BA during the midamble period of APIs packet.

34. The apparatus or method of any preceding embodiment, where the receiver STA of AP2 transmitting ACK/BA back to AP2 could make its preamble precoded to protect AP1's transmission from the interference due to the preamble of ACK/BA.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
   (a) a wireless communication circuit, as a station (STA) or access point (AP), which is configured for wirelessly communicating with at least one other of the wireless communication circuit in a Wireless Fidelity (WiFi) network configured to allow multiple access points (APs) and multiple stations (STAs);
   (b) at least one modem and radio-frequency (RF) circuit connected to a plurality of antennas configured for transmitting and receiving frames with neighboring wireless communication circuits in both omni-directional and directional modes;
   (c) a processor configured to control the wireless communication circuit and its at least one modem; and
   (d) a non-transitory memory storing instructions executable by the processor;
   (e) wherein the instructions, when executed by the processor, perform a communication protocol comprising:
      (i) performing packet transmission and reception in response to encoding and decoding of signals containing Orthogonal Frequency-Division Multiplexing (OFDM) symbols in a Carrier-Sense Multiple-Access/Collision Avoidance (CSMA/CA) Media Access Control (MAC) protocol;
      (ii) operating as a first access point (AP) using the communication protocol in performing beamforming towards at least one station (STA) within its communication range, while nulling towards one or more other access points (APs);
      (iii) commencing a packet transmission, as the first access point (AP), and allowing another access point (AP) using the communication protocol to transmit packet simultaneously in response to one or more steps comprising:
         (A) performing negotiations with the other access point (AP) prior to commencing a packet transmission;
         (B) communicating simultaneous transmission information to the other access point (AP);
         (C) allowing the other access point (AP) to perform simultaneous transmission under the communication protocol while the packet transmission is ongoing, with the other access point (AP) configured for synchronizing its Orthogonal Frequency-Division Multiplexing (OFDM) symbol boundaries with the first access point (AP); and
         (D) completing packet transmissions by the other access point (AP), prior to an end of packet transmission by the first access point (AP).

2. The apparatus of claim 1, wherein the instructions when executed by the processor further perform one or more steps comprising performing nulling of transmit power toward one or more access points (APs) that are not currently being communicating with by a station utilizing the communication protocol under the direction of the first access point (AP).

3. The apparatus of claim 1, wherein the instructions when executed by the processor further perform one or more steps comprising making a null towards a receiving station of the first access point (AP) by the other access point which is performing simultaneous transmission under the communication protocol while the packet transmission is ongoing by the first access point (AP).

4. The apparatus of claim 1, wherein the instructions when executed by the processor further perform one or more steps comprising determining whether to allow the simultaneous transmission based on information received in response to performing a prior negotiation or agreement with the other access points (APs) under the communication protocol.

5. The apparatus of claim 1, wherein the instructions when executed by the processor further perform one or more steps comprising embedding simultaneous transmission information in a preamble transmitted by the first access point (AP) in commencing the packet transmission.

6. The apparatus of claim 1, wherein the instructions when executed by the processor further perform one or more steps comprising embedding a midamble in the packet transmission of the first access point (AP) to allow the other access point (AP) to start its simultaneous transmission by transmitting its preamble in an omni-directional manner within the midamble of the first access point (AP).

7. The apparatus of claim 6, wherein the instructions when executed by the processor further perform one or more steps comprising setting a duration for the midamble which is longer than a preamble of the other access point (AP).

8. The apparatus of claim 6, wherein the instructions when executed by the processor further perform one or more steps comprising embedding the midamble in the packet transmission of the first access point (AP) with the midamble comprising Extreme High Throughput Long Training Fields (EHT-LTFs) or EHT-LTFs plus Extreme High Throughput Short Training Fields (EHT-STFs).

9. The apparatus of claim 6, wherein the instructions when executed by the processor further perform one or more steps comprising periodically embedding the midamble in the packet transmission of the first access point (AP) to allow the other access point (AP) to join the simultaneous transmission at any one of the midambles.

10. The apparatus of claim 1, wherein the instructions when executed by the processor further perform one or more steps comprising transmitting a Ready-To-Send (RTS) to the other access point (AP), and if the other access point (AP) responds back with a Clear-To-Send (CTS), then the first access point has obtained a Transmit Opportunity (TXOP) reservation of simultaneous transmission.

11. The apparatus of claim 1, wherein the instructions when executed by the processor further perform one or more steps comprising utilizing an identical Guard Interval (GI) for Orthogonal Frequency-Division Multiplexing (OFDM) symbol boundary synchronization between the first access point (AP) and the other access point (AP).

12. The apparatus of claim 1, wherein the instructions when executed by the processor further perform one or more steps comprising precoding a preamble by the other access point (AP) to prevent interfering with the packet transmission of the first access point (AP).

13. The apparatus of claim 1, wherein the instructions when executed by the processor further perform one or more steps comprising synchronizing an Extreme High Throughput Long Training Field (EHT-LTF) symbol in a preamble of the other access point (AP) joining the simultaneous transmission with the Orthogonal Frequency-Division Multiplexing (OFDM) symbol of the first access point, and the other access point (AP) joining the simultaneous transmission sets its EHT-LTF to the same duration as an OFDM symbol duration of the first access point.

14. The apparatus of claim 1, wherein the instructions when executed by the processor further perform one or more steps comprising performing the simultaneous transmission under the communication protocol in which the other access point (AP) transmission allows a destination receiver station of to transmit an acknowledgement back to it prior to the end of packet transmission by the first access point (AP).

15. The apparatus of claim 14, wherein the acknowledgement comprises an Acknowledgement (ACK) or a Block Acknowledgement (BA).

16. An apparatus for wireless communication in a network, comprising:

(a) a wireless communication circuit, as a station (STA) or access point (AP), which is configured for wirelessly communicating with at least one other of the wireless communication circuit in a Wireless Fidelity (WiFi) network configured to allow multiple access points (APs) and multiple stations (STAs);

(b) at least one modem and radio-frequency (RF) circuit connected to a plurality of antennas configured for transmitting and receiving frames with neighboring of the wireless communication circuits in both omni-directional and directional modes;

(c) a processor configured to control the wireless communication circuit and its at least one modem; and (d) a non-transitory memory storing instructions executable by the processor;

(e) wherein the instructions, when executed by the processor, perform a communication protocol comprising:

(i) performing packet transmission and reception in response to the encoding and decoding of signals containing Orthogonal Frequency-Division Multiplexing (OFDM) symbols in a Carrier-Sense Multiple-Access/Collision Avoidance (CSMA/CA) Media Access Control (MAC) protocol;

(ii) operating as a first access point (AP) using the communication protocol in performing beamforming towards at least one station (STA) within its communication range, while nulling towards one or more other access points (APs);

(iii) commencing a packet transmission, as the first access point (AP), and allowing another access point (AP) using the communication protocol to transmit packet simultaneously in response to one or more steps comprising:

(A) performing negotiations with the other access point (AP) prior to commencing a packet transmission;

(B) communicating simultaneous transmission information to the other access point (AP);

(C) allowing the other access point (AP) to perform simultaneous transmission under the communication protocol while the packet transmission is ongoing, with the other access point (AP) configured for synchronizing its Orthogonal Frequency-Division Multiplexing (OFDM) symbol boundaries with the first access point (AP);

(D) embedding simultaneous transmission information in a preamble or Medium Access Control (MAC) header by the other access point (AP) to request that the receiving station transmit back an acknowledgement;

(1) transmitting an acknowledgement by the receiving station while the first access point is still transmitting the packet transmission, if the other access point (AP) completes its transmission before the first access point completes its packet transmission;

(2) transmitting an acknowledgement by the receiving station with the acknowledgement from the other access point if the first access point (AP) and the other access point (AP) complete their transmissions at the same time; and (3) transmitting an acknowledgement by the receiving station in which it synchronizes its OFDM signal boundary with that of the first access point (AP) to protect the transmissions of the first access point (AP) from interference from the acknowledgement from the other access point (AP).

17. The apparatus of claim 16, wherein the instructions when executed by the processor further perform one or more steps comprising starting an acknowledgement transmission by the receiving station of the other access point (AP) during a midamble period within the packet transmission of the first access point (AP).

18. The apparatus of claim 16, wherein the instructions when executed by the processor further perform one or more steps comprising starting an acknowledgement transmission by the receiving station of the other access point (AP), wherein a preamble of the acknowledgement transmission is precoded to protect the packet transmission of the first access point (AP).

19. A method of wireless communication in a network, comprising:
(a) configuring a wireless communication circuit, as a station (STA) or access point (AP), for wirelessly communicating with at least one other of the wireless communication circuit in a Wireless Fidelity (WiFi) network configured to allow multiple access points (APs) and multiple stations (STAs);
(b) performing packet transmission and reception in response to the encoding and decoding of signals containing Orthogonal Frequency-Division Multiplexing (OFDM) symbols in a Carrier-Sense Multiple-Access/Collision Avoidance (CSMA/CA) Media Access Control (MAC) protocol;
(c) operating as a first access point (AP) using the communication protocol in performing beamforming towards at least one station (STA) within its communication range, while nulling towards one or more other access points (APs);
(d) commencing a packet transmission, as the first access point (AP), and allowing another access point (AP) using the communication protocol to transmit packet simultaneously in response to one or more steps comprising:
  (i) performing negotiations with the other access point (AP) prior to commencing a packet transmission;
  (ii) communicating simultaneous transmission information to the other access point (AP);
  (iii) allowing the other access point (AP) to perform simultaneous transmission under the communication protocol while the packet transmission is ongoing, with the other access point (AP) configured for synchronizing its Orthogonal Frequency-Division Multiplexing (OFDM) symbol boundaries with the first access point (AP); and
  (iv) completing packet transmissions by the other access point (AP), prior to an end of packet transmission by the first access point (AP).

20. The method of claim 19, further comprising embedding simultaneous transmission information in a preamble or one or more midambles transmitted by the first access point (AP) during its packet transmission.

* * * * *